US011336602B1

(12) United States Patent
Crook et al.

(10) Patent No.: US 11,336,602 B1
(45) Date of Patent: May 17, 2022

(54) DIALOG STATE TRACKING FOR ASSISTANT SYSTEMS

(71) Applicant: Facebook Technologies, LLC, Menlo Park, CA (US)

(72) Inventors: Paul Anthony Crook, Newcastle, WA (US); Baiyang Liu, Bellevue, WA (US); Rajen Subba, San Carlos, CA (US)

(73) Assignee: Facebook Technologies, LLC., Menlo Park, CA (US)

( * ) Notice: Subject to any disclaimer, the term of this patent is extended or adjusted under 35 U.S.C. 154(b) by 0 days.

(21) Appl. No.: 16/389,634

(22) Filed: Apr. 19, 2019

Related U.S. Application Data

(60) Provisional application No. 62/660,876, filed on Apr. 20, 2018.

(51) Int. Cl.
*H04L 12/58* (2006.01)
*G06N 7/00* (2006.01)
(Continued)

(52) U.S. Cl.
CPC .......... *H04L 51/18* (2013.01); *G06F 16/3329* (2019.01); *G06N 7/005* (2013.01); *G06Q 50/01* (2013.01); *H04L 51/32* (2013.01)

(58) Field of Classification Search
CPC ..... G10L 15/005; G10L 15/063; G10L 15/22; G10L 15/26; G10L 15/1815;
(Continued)

(56) References Cited

U.S. PATENT DOCUMENTS

| | | | |
|---|---|---|---|
| 5,872,850 | A | 2/1999 | Klein et al. |
| 3,026,424 | A | 2/2000 | Circenis |

(Continued)

FOREIGN PATENT DOCUMENTS

| | | |
|---|---|---|
| AU | 2017203668 | 1/2018 |
| CN | 107909061 A | 4/2018 |

(Continued)

OTHER PUBLICATIONS

U.S. Appl. No. 14/593,723, filed Jan. 9, 2015, Colin Patrick Treseler.

(Continued)

*Primary Examiner* — Dhairya A Patel
*Assistant Examiner* — Sandarva Khanal
(74) *Attorney, Agent, or Firm* — Baker Botts L.L.P.

(57) ABSTRACT

In one embodiment, a method includes, by one or more computing systems, receiving, from a client system, an input in a multi-turn message thread, parsing the input to identify a plurality of hypothesis dialog states associated with the input, generating a plurality of functions corresponding to the plurality of hypothesis dialog states, calculating a plurality of probability scores for the plurality of functions, respectively, based on a prior dialog state associated with the message thread and a current user context, wherein each probability score represents a likelihood that the respective function is associated with an intended dialog state, and storing the plurality of functions if each of the probability scores is below a threshold probability score, wherein the plurality of functions is stored as a hierarchical set of functions that is used as the prior dialog state in response to a next input in the message thread.

18 Claims, 18 Drawing Sheets

600

610 Receive, from a client system, a first input in a multi-turn message thread

620 Parse the first input to identify a first plurality of hypothesis dialog states associated with the first input 630 Generate a first plurality of functions corresponding to the first plurality of hypothesis dialog states 640 Caluclate a first plurality of probability scores for the first plurality of functions, respectively, based on a prior dialog state associated with the message thread and a current user context, wherein each probability score represents a likelihood that the respective function is associated with an intended dialog state 650 Store the first plurality of functions if each of the probability scores is below a threshold probability score, wherein the first plurality of functions is stored as a hierarchical set of functions that is used as the prior dialog state in response to a next input in the message thread

(51) Int. Cl.

| | |
|---|---|
| ***G06Q 50/00*** | (2012.01) |
| ***G06F 16/332*** | (2019.01) |
| ***H04L 51/18*** | (2022.01) |
| ***H04L 51/52*** | (2022.01) |

(58) Field of Classification Search

CPC ................ G10L 15/1822; G10L 17/22; G10L 2015/223; G10L 2015/227; G10L 2015/228; G10L 2015/0636; G06F 2203/0381; G06F 16/3329; G06F 16/3334; G06F 40/30; G06F 16/24578; G06F 16/335; G06F 16/73; G06F 16/738; G06F 16/90332; G06F 40/00; G06F 40/20; G06F 40/35; G06F 40/205; G06F 40/295; G06F 40/40; G06Q 50/01; G06N 3/006; G06N 20/00; G06N 7/005; G06N 7/006; H04L 51/16; H04L 51/18; H04L 51/32; H04M 2201/40; H04M 2203/355; H04M 3/5166; Y10S 707/99934

See application file for complete search history.

(56) References Cited

U.S. PATENT DOCUMENTS 6,233,575 B1 5/2001 Agrawal et al.
6,243,761 B1 6/2001 Mogul et al.
6,510,451 B2 1/2003 Wu et al.
6,578,025 B1 6/2003 Pollack et al.
6,665,640 B1 12/2003 Bennett et al.
6,901,364 B2 5/2005 Nguyen et al.
6,968,333 B2 11/2005 Abbott et al.
6,990,513 B2 1/2006 Belfiore et al.
7,069,215 B1 6/2006 Bangalore et al.
7,080,004 B2 7/2006 Wang et al.
7,124,123 B1 10/2006 Roskind
7,158,678 B2 1/2007 Nagel
7,397,912 B2 7/2008 Aasman
7,467,087 B1 12/2008 Gillick et al.
7,624,007 B2 11/2009 Bennett
7,702,508 B2 4/2010 Bennett
8,027,451 B2 9/2011 Arendsen
8,112,275 B2 2/2012 Kennewick et al.
8,190,627 B2 5/2012 Platt et al.
8,195,468 B2 6/2012 Weider et al.
8,504,349 B2 8/2013 Manu et al.
8,560,564 B1 10/2013 Hoelzle
8,619,767 B2 12/2013 Ohashi
8,677,377 B2 3/2014 Cheyer
8,817,951 B2 8/2014 Goffin et al.
8,868,592 B1 10/2014 Weininger et al.
8,935,192 B1 1/2015 Ventilla
8,938,394 B1 1/2015 Faaborg et al.
8,983,383 B1 3/2015 Haskin
8,995,981 B1 3/2015 Aginsky et al.
9,026,145 B1 5/2015 Duleba et al.
9,154,739 B1 10/2015 Nicolaou
9,171,341 B1 10/2015 Trandal et al.
9,177,291 B2 11/2015 Martinazzi et al.
9,195,436 B2 11/2015 Mytkowicz et al.
9,251,471 B2 2/2016 Pinckney et al.
9,299,059 B1 3/2016 Marra
9,304,736 B1 4/2016 Whiteley
9,338,242 B1 5/2016 Suchland
9,338,493 B2 5/2016 Van Os
9,344,338 B2 5/2016 Quillen et al.
9,367,806 B1 6/2016 Cosic
9,390,724 B2 7/2016 List
9,418,658 B1 8/2016 David
9,443,527 B1 9/2016 Watanabe et al.
9,472,206 B2 10/2016 Ady
9,479,931 B2 10/2016 Ortiz
9,508,341 B1 11/2016 Parlikar et al.
9,576,574 B2 2/2017 van Os
9,639,608 B2 5/2017 Freeman
9,659,577 B1 5/2017 Langhammer
9,660,950 B2 5/2017 Archibong et al.
9,686,577 B2 6/2017 Tseng et al.
9,720,955 B1 8/2017 Cao et al.
9,747,895 B1 8/2017 Jansche
9,785,717 B1 10/2017 DeLuca
9,792,281 B2 10/2017 Sarikaya
9,824,321 B2 11/2017 Raghunathan et al.
9,858,925 B2 1/2018 Gruber
9,865,260 B1 1/2018 Vuskovic
9,875,233 B1 1/2018 Tomkins
9,875,741 B2 1/2018 Gelfenbeyn
9,881,077 B1 1/2018 Alfonseca et al.
9,886,953 B2 2/2018 Lemay
9,916,753 B2 3/2018 Aginsky et al.
9,959,328 B2 5/2018 Jain et al.
9,986,394 B1 5/2018 Taylor et al.
9,990,591 B2 6/2018 Gelfenbeyn
10,042,032 B2 8/2018 Scott
10,109,273 B1 10/2018 Rajasekaram et al.
10,127,220 B2 11/2018 Pellegarda et al.
10,133,613 B2 11/2018 Surti et al.
10,134,395 B2 11/2018 Typrin
10,162,886 B2 12/2018 Wang et al.
10,199,051 B2 2/2019 Binder
10,220,303 B1 3/2019 Schmidt et al.
10,229,680 B1 3/2019 Gillespie et al.
10,241,752 B2 3/2019 Lemay
10,255,365 B2 4/2019 Campbell et al.
10,262,062 B2 4/2019 Chang et al.
10,276,170 B2 4/2019 Gruber
10,348,658 B2 7/2019 Rodriguez et al.
10,387,464 B2 8/2019 Weston et al.
10,409,818 B1 9/2019 Hayes et al.
10,418,032 B1 9/2019 Mohajer et al.
10,462,422 B1 10/2019 Harrison et al.
10,467,282 B2 11/2019 Shorman et al.
10,482,182 B1 11/2019 Jankowski, Jr.
10,504,513 B1 12/2019 Gray et al.
10,511,808 B2 12/2019 Harrison et al.
10,515,625 B1 12/2019 Metallinou et al.
10,574,613 B2 2/2020 Leiba et al.
10,579,688 B2 3/2020 Green
10,600,406 B1 3/2020 Shapiro et al.
10,649,985 B1 5/2020 Cornell, Jr. et al.
10,679,008 B2 6/2020 Dubey et al.
10,719,786 B1 7/2020 Treseler et al.
10,761,866 B2 9/2020 Liu et al.
10,762,903 B1 9/2020 Kahan et al.
10,782,986 B2 9/2020 Martin
10,810,256 B1 10/2020 Goldberg et al.
10,841,249 B2 11/2020 Lim et al.
10,854,206 B1 12/2020 Liu et al.
10,855,485 B1 12/2020 Zhou et al.
10,878,337 B2 12/2020 Katsuki et al.
10,896,295 B1 1/2021 Shenoy
10,949,616 B1 3/2021 Shenoy et al.
10,957,329 B1 3/2021 Liu et al.
10,958,599 B1 3/2021 Penov et al.
10,977,258 B1 4/2021 Liu et al.
10,978,056 B1 4/2021 Challa et al.
11,009,961 B2 5/2021 Moscarillo
11,038,974 B1 6/2021 Koukoumidis et al.
11,042,554 B1 6/2021 Balakrishnan et al.
11,086,858 B1 8/2021 Koukoumidis et al.
11,159,767 B1 10/2021 Kamisetty et al.
2001/0036297 A1 11/2001 Ikegami et al.
2002/0015480 A1 2/2002 Daswani et al.
2002/0111917 A1 8/2002 Hoffman et al.
2002/0141621 A1 10/2002 Lane
2002/0152067 A1 10/2002 Viikki et al.
2002/0165912 A1 11/2002 Wenocur et al.
2003/0005174 A1 1/2003 Coffman et al.
2003/0046083 A1 3/2003 Devinney, Jr. et al.
2003/0126330 A1 7/2003 Balasuriya
2003/0182125 A1 9/2003 Phillips et al.
2003/0220095 A1 11/2003 Engelhart
2004/0019487 A1 1/2004 Kleindienst

(56) References Cited

U.S. PATENT DOCUMENTS

2004/0075690 A1 4/2004 Cirne
2004/0085162 A1 5/2004 Agarwal et al.
2004/0098253 A1* 5/2004 Balentine ................ G10L 15/22 704/215
2004/0186819 A1 9/2004 Baker
2004/0230572 A1 11/2004 Omoigui
2004/0236580 A1 11/2004 Bennett
2005/0004907 A1 1/2005 Bruno et al.
2005/0135595 A1 6/2005 Bushey et al.
2005/0144284 A1 6/2005 Ludwig et al.
2005/0149327 A1 7/2005 Roth et al.
2006/0047617 A1 3/2006 Bacioiu et al.
2006/0294546 A1 12/2006 Ro et al.
2007/0028264 A1 2/2007 Lowe
2007/0124147 A1 5/2007 Gopinath et al.
2007/0124263 A1 5/2007 Katariya et al.
2007/0136058 A1 6/2007 Jeong et al.
2007/0185712 A1 8/2007 Jeong et al.
2007/0239454 A1 10/2007 Paek et al.
2007/0270126 A1 11/2007 Forbes et al.
2007/0300224 A1 12/2007 Aggarwal et al.
2008/0015864 A1 1/2008 Ross et al.
2008/0028036 A1 1/2008 Slawson et al.
2008/0095187 A1 4/2008 Jung et al.
2008/0107255 A1 5/2008 Geva et al.
2008/0178126 A1 7/2008 Beeck et al.
2008/0209577 A1 8/2008 Vrielink et al.
2008/0222142 A1 9/2008 O'Donnell
2008/0240379 A1 10/2008 Maislos
2008/0300884 A1 12/2008 Smith
2008/0313162 A1 12/2008 Bahrami et al.
2009/0007127 A1 1/2009 Roberts et al.
2009/0070113 A1 3/2009 Gupta et al.
2009/0119581 A1 5/2009 Velusamy
2009/0150322 A1 6/2009 Bower et al.
2009/0178011 A1 7/2009 Ording et al.
2009/0191521 A1 7/2009 Paul et al.
2009/0228439 A1 9/2009 Manolescu et al.
2009/0265299 A1 10/2009 Hadad et al.
2009/0282033 A1 11/2009 Alshawi
2009/0326945 A1 12/2009 Tian
2010/0064345 A1 3/2010 Bentley et al.
2010/0125456 A1 5/2010 Weng et al.
2010/0138215 A1* 6/2010 Williams ................ G10L 15/22 704/9
2010/0138224 A1 6/2010 Bedingfield, Sr.
2010/0199320 A1 8/2010 Ramanathan et al.
2010/0217794 A1 8/2010 Strandell et al.
2010/0217837 A1 8/2010 Ansari et al.
2010/0241431 A1* 9/2010 Weng ...................... G06F 3/038 704/257
2010/0299329 A1 11/2010 Emanuel et al.
2010/0306191 A1 12/2010 LeBeau et al.
2010/0306249 A1 12/2010 Hill et al.
2011/0040751 A1 2/2011 Chandrasekar et al.
2011/0078615 A1 3/2011 Bier
2011/0119216 A1 5/2011 Wigdor
2011/0137918 A1 6/2011 Yasrebi et al.
2011/0153324 A1 6/2011 Ballinger et al.
2011/0153423 A1 6/2011 Elvekrog et al.
2011/0153863 A1 6/2011 Khan et al.
2011/0161348 A1 6/2011 Oron
2011/0184768 A1 7/2011 Norton et al.
2011/0246383 A1 10/2011 Gibson et al.
2011/0264522 A1 10/2011 Chan et al.
2012/0022872 A1 1/2012 Gruber et al.
2012/0023120 A1 1/2012 Kanefsky
2012/0030301 A1 2/2012 Herold et al.
2012/0053945 A1* 3/2012 Gupta ..................... G10L 15/22 704/256
2012/0069131 A1 3/2012 Abelow
2012/0078889 A1 3/2012 Chu-Carroll et al.
2012/0078891 A1 3/2012 Brown et al.
2012/0081303 A1 4/2012 Cassar et al.
2012/0101806 A1 4/2012 Davis et al.
2012/0101865 A1 4/2012 Zhakov
2012/0109858 A1 5/2012 Makadia et al.
2012/0159507 A1 6/2012 Kwon et al.
2012/0159635 A1 6/2012 He et al.
2012/0163224 A1 6/2012 Long
2012/0179453 A1 7/2012 Ghani et al.
2012/0179481 A1 7/2012 Patel et al.
2012/0179633 A1 7/2012 Ghani et al.
2012/0179694 A1 7/2012 Sciacca et al.
2012/0190386 A1 7/2012 Anderson
2012/0205436 A1 8/2012 Thomas et al.
2012/0232885 A1 9/2012 Barbosa et al.
2012/0245944 A1 9/2012 Gruber et al.
2012/0246191 A1 9/2012 Xiong
2012/0254188 A1 10/2012 Koperski et al.
2012/0265528 A1 10/2012 Gruber
2012/0278164 A1 11/2012 Spivack et al.
2012/0290950 A1 11/2012 Rapaport et al.
2012/0294477 A1 11/2012 Yang et al.
2012/0297294 A1 11/2012 Scott et al.
2012/0303356 A1 11/2012 Boyle et al.
2012/0311126 A1 12/2012 Jadallah et al.
2013/0035930 A1 2/2013 Ferrucci et al.
2013/0046544 A1 2/2013 Kay et al.
2013/0054631 A1 2/2013 Govani et al.
2013/0073387 A1 3/2013 Heath
2013/0073389 A1 3/2013 Heath
2013/0073400 A1 3/2013 Heath
2013/0073473 A1 3/2013 Heath
2013/0117832 A1 5/2013 Gandhi et al.
2013/0191250 A1 7/2013 Bradley et al.
2013/0194193 A1 8/2013 Kawalkar
2013/0204813 A1 8/2013 Master et al.
2013/0226892 A1 8/2013 Ehsani et al.
2013/0238332 A1 9/2013 Chen
2013/0246521 A1 9/2013 Schacht et al.
2013/0254139 A1 9/2013 Lei
2013/0262752 A1 10/2013 Talagala et al.
2013/0265218 A1 10/2013 Moscarillo
2013/0268624 A1 10/2013 Yagiura
2013/0268839 A1 10/2013 Lefebvre
2013/0275138 A1 10/2013 Gruber
2013/0275164 A1 10/2013 Gruber
2013/0275441 A1 10/2013 Agrawal et al.
2013/0277564 A1 10/2013 Teshima et al.
2013/0289999 A1 10/2013 Hymel
2013/0290205 A1 10/2013 Bonmassar et al.
2013/0346077 A1 12/2013 Mengibar et al.
2014/0012926 A1 1/2014 Narayanan et al.
2014/0032659 A1 1/2014 Marini et al.
2014/0039895 A1* 2/2014 Aravamudan ........ G06F 16/683 704/257
2014/0040748 A1 2/2014 Lemay et al.
2014/0074483 A1 3/2014 Van Os
2014/0074934 A1 3/2014 Van Hoff et al.
2014/0104177 A1 4/2014 Ouyang et al.
2014/0108307 A1 4/2014 Raghunath et al.
2014/0108453 A1* 4/2014 Venkataraman ...... G06F 16/907 707/774
2014/0108989 A1 4/2014 Bi et al.
2014/0115410 A1 4/2014 Kealy et al.
2014/0129266 A1 5/2014 Perl et al.
2014/0143879 A1 5/2014 Milman et al.
2014/0164506 A1 6/2014 Tesch
2014/0195371 A1 7/2014 Kageyama et al.
2014/0207860 A1 7/2014 Wang et al.
2014/0225931 A1 8/2014 Plagemann et al.
2014/0236591 A1 8/2014 Yue et al.
2014/0244712 A1 8/2014 Walters et al.
2014/0255887 A1 9/2014 Xu et al.
2014/0258191 A1 9/2014 Gubin et al.
2014/0280001 A1 9/2014 Stein
2014/0280017 A1 9/2014 Indarapu et al.
2014/0282276 A1 9/2014 Drucker et al.
2014/0282956 A1 9/2014 Kennedy et al.
2014/0297284 A1 10/2014 Gruber et al.
2014/0310470 A1 10/2014 Rash et al.
2014/0310614 A1 10/2014 Jones
2014/0358539 A1 12/2014 Rao et al.

(56) References Cited

U.S. PATENT DOCUMENTS

2014/0358890 A1 12/2014 Chen et al.
2014/0365216 A1 12/2014 Gruber et al.
2014/0365919 A1 12/2014 Shaw et al.
2014/0379340 A1 12/2014 Timem et al.
2015/0006286 A1 1/2015 Liu et al.
2015/0012524 A1 1/2015 Heymans et al.
2015/0032504 A1 1/2015 Elango et al.
2015/0058720 A1 2/2015 Smadja et al.
2015/0073907 A1 3/2015 Purves et al.
2015/0078613 A1 3/2015 Forutanpour et al.
2015/0079554 A1 3/2015 Lee et al.
2015/0081321 A1 3/2015 Jain
2015/0081674 A1 3/2015 Ali et al.
2015/0082229 A1 3/2015 Ouyang et al.
2015/0088665 A1 3/2015 Karlsson
2015/0095033 A1* 4/2015 Boies .................. G10L 15/1815 704/257
2015/0100524 A1 4/2015 Pantel et al.
2015/0142420 A1* 5/2015 Sarikaya ................. G06F 40/35 704/9
2015/0142447 A1 5/2015 Kennewick et al.
2015/0142704 A1 5/2015 London
2015/0149182 A1 5/2015 Kalns et al.
2015/0154001 A1 6/2015 Knox et al.
2015/0169284 A1 6/2015 Quast et al.
2015/0169744 A1 6/2015 Walkingshaw et al.
2015/0170050 A1 6/2015 Price
2015/0179168 A1 6/2015 Hakkani-Tur
2015/0186156 A1 7/2015 Prown et al.
2015/0199715 A1 7/2015 Caron et al.
2015/0207765 A1 7/2015 Brantingham et al.
2015/0220777 A1 8/2015 Kauffmann et al.
2015/0220888 A1 8/2015 Iyer
2015/0227519 A1 8/2015 Clark et al.
2015/0228275 A1* 8/2015 Watanabe ............... G10L 15/22 704/275
2015/0242525 A1 8/2015 Perlegos
2015/0242787 A1 8/2015 Bernstein et al.
2015/0248476 A1 9/2015 Weissinger et al.
2015/0256636 A1 9/2015 Spivack et al.
2015/0278691 A1 10/2015 Xia et al.
2015/0278922 A1 10/2015 Isaacson et al.
2015/0286747 A1 10/2015 Anastasakos et al.
2015/0331853 A1* 11/2015 Palmonari ............... G06F 40/40 704/9
2015/0332672 A1 11/2015 Akbacak et al.
2015/0339303 A1 11/2015 Perlegos
2015/0347375 A1 12/2015 Tremblay et al.
2015/0348543 A1 12/2015 Zhao et al.
2015/0363393 A1* 12/2015 Williams ................ G10L 15/22 704/8
2015/0373565 A1 12/2015 Safavi
2015/0379426 A1 12/2015 Steele et al.
2015/0379568 A1 12/2015 Balasubramanian et al.
2015/0379981 A1 12/2015 Balasubramanian et al.
2016/0004862 A1 1/2016 Almehmadi et al.
2016/0019290 A1* 1/2016 Ratnaparkhi ....... G06F 16/9024 707/743
2016/0037311 A1 2/2016 Cho
2016/0042249 A1 2/2016 Babenko et al.
2016/0048527 A1 2/2016 Li
2016/0063118 A1 3/2016 Campbell et al.
2016/0063553 A1 3/2016 Pesochinsky
2016/0092598 A1 3/2016 Mishra
2016/0093298 A1 3/2016 Naik et al.
2016/0098482 A1 4/2016 Moon et al.
2016/0110381 A1 4/2016 Chen et al.
2016/0117360 A1 4/2016 Kunc et al.
2016/0163311 A1* 6/2016 Crook .................. G10L 15/065 704/275
2016/0170989 A1 6/2016 Bishop et al.
2016/0173568 A1 6/2016 Penilla et al.
2016/0188565 A1* 6/2016 Robichaud .......... G06F 16/3329 704/9
2016/0188671 A1 6/2016 Gupta et al.
2016/0188727 A1 6/2016 Waibel et al.
2016/0188730 A1 6/2016 Delli Santi et al.
2016/0196491 A1 7/2016 Chandrasekaran et al.
2016/0203002 A1 7/2016 Kannan et al.
2016/0203238 A1 7/2016 Cherniavskii et al.
2016/0210363 A1 7/2016 Rambhia
2016/0210963 A1* 7/2016 Kim .................... G10L 15/1822
2016/0217124 A1 7/2016 Sari et al.
2016/0219078 A1 7/2016 Porras et al.
2016/0225370 A1 8/2016 Kannan
2016/0253630 A1 9/2016 Oliveri et al.
2016/0255082 A1 9/2016 Rathod
2016/0261545 A1 9/2016 Bastide et al.
2016/0269472 A1 9/2016 Byron et al.
2016/0292582 A1 10/2016 Kozloski et al.
2016/0306505 A1 10/2016 Vigneras et al.
2016/0307571 A1 10/2016 Mizumoto et al.
2016/0308799 A1 10/2016 Schubert et al.
2016/0320853 A1 11/2016 Lien et al.
2016/0328096 A1 11/2016 Tran
2016/0336006 A1 11/2016 Levit et al.
2016/0336008 A1 11/2016 Menezes et al.
2016/0364382 A1 12/2016 Sarikaya
2016/0371378 A1 12/2016 Fan et al.
2016/0372116 A1 12/2016 Summerfield
2016/0378849 A1 12/2016 Myslinski
2016/0378861 A1 12/2016 Eledath
2016/0379213 A1 12/2016 Isaacson et al.
2016/0381220 A1 12/2016 Kurganov
2017/0019362 A1 1/2017 Kim et al.
2017/0025117 A1 1/2017 Hong
2017/0026318 A1 1/2017 Daniel et al.
2017/0034112 A1 2/2017 Perlegos
2017/0061294 A1 3/2017 Weston et al.
2017/0061956 A1* 3/2017 Sarikaya ................ G06N 3/006
2017/0091168 A1 3/2017 Bellegarda
2017/0091171 A1* 3/2017 Perez ...................... G06F 40/35
2017/0092264 A1 3/2017 Hakkani-Tur et al.
2017/0098236 A1 4/2017 Lee et al.
2017/0125012 A1 5/2017 Kanthak et al.
2017/0132019 A1 5/2017 Karashchuk
2017/0132688 A1 5/2017 Freund et al.
2017/0139938 A1 5/2017 Balasubramanian et al.
2017/0147676 A1 5/2017 Jaidka et al.
2017/0147696 A1 5/2017 Evnine
2017/0148073 A1 5/2017 Nomula et al.
2017/0169013 A1 6/2017 Sarikaya et al.
2017/0169354 A1 6/2017 Diamanti et al.
2017/0177715 A1 6/2017 Chang et al.
2017/0178626 A1 6/2017 Gruber et al.
2017/0180276 A1 6/2017 Gershony et al.
2017/0185375 A1 6/2017 Martel et al.
2017/0188101 A1 6/2017 Srinivasaraghavan
2017/0193390 A1 7/2017 Weston et al.
2017/0206271 A1 7/2017 Jain
2017/0206405 A1 7/2017 Molchanov et al.
2017/0221475 A1 8/2017 Bruguier et al.
2017/0235360 A1 8/2017 George-Svahn
2017/0235726 A1 8/2017 Wang et al.
2017/0235740 A1 8/2017 Seih et al.
2017/0243107 A1 8/2017 Jolley et al.
2017/0249059 A1 8/2017 Houseworth
2017/0255536 A1 9/2017 Weissinger et al.
2017/0263242 A1 9/2017 Nagao
2017/0270180 A1 9/2017 State
2017/0270919 A1 9/2017 Parthasarathi et al.
2017/0270929 A1 9/2017 Aleksic et al.
2017/0278514 A1 9/2017 Mathias et al.
2017/0286401 A1 10/2017 He et al.
2017/0287474 A1 10/2017 Maergner et al.
2017/0293834 A1 10/2017 Raison et al.
2017/0295114 A1 10/2017 Goldberg et al.
2017/0308589 A1 10/2017 Liu et al.
2017/0344645 A1 11/2017 Appel et al.
2017/0351786 A1 12/2017 Quattoni et al.
2017/0353469 A1 12/2017 Selekman
2017/0357637 A1 12/2017 Nell et al.
2017/0357661 A1 12/2017 Hornkvist et al.

(56) References Cited

U.S. PATENT DOCUMENTS

2017/0358293 A1 12/2017 Chua et al.
2017/0358304 A1 12/2017 Castillo Sanchez et al.
2017/0359707 A1 12/2017 Diaconu
2017/0364563 A1 12/2017 Gao et al.
2017/0366479 A1 12/2017 Ladha et al.
2018/0013699 A1 1/2018 Sapoznik et al.
2018/0018562 A1 1/2018 Jung
2018/0018987 A1 1/2018 Zass
2018/0040020 A1 2/2018 Kurian et al.
2018/0047091 A1 2/2018 Ogden et al.
2018/0052824 A1 2/2018 Ferrydiansyah et al.
2018/0054523 A1 2/2018 Zhang et al.
2018/0061401 A1 3/2018 Sari et al.
2018/0061419 A1 3/2018 Melendo Casado et al.
2018/0062862 A1 3/2018 Lu et al.
2018/0067638 A1 3/2018 Klein et al.
2018/0082191 A1 3/2018 Pearmain et al.
2018/0083894 A1 3/2018 Fung et al.
2018/0088663 A1 3/2018 Zhang et al.
2018/0088677 A1 3/2018 Zhang et al.
2018/0089164 A1 3/2018 Iida et al.
2018/0096071 A1 4/2018 Green
2018/0096072 A1 4/2018 He
2018/0101893 A1 4/2018 Dagan et al.
2018/0107917 A1 4/2018 Hewavitharana
2018/0108358 A1 4/2018 Humphreys et al.
2018/0115598 A1 4/2018 Shariat et al.
2018/0121508 A1 5/2018 Halstvedt
2018/0146019 A1 5/2018 Chen et al.
2018/0150551 A1 5/2018 Wang et al.
2018/0150739 A1 5/2018 Wu
2018/0157759 A1 6/2018 Zheng et al.
2018/0157981 A1 6/2018 Albertson et al.
2018/0165723 A1 6/2018 Wright et al.
2018/0189628 A1 7/2018 Kaufmann et al.
2018/0189629 A1 7/2018 Yatziv
2018/0196854 A1 7/2018 Burks
2018/0210874 A1 7/2018 Fuxman et al.
2018/0218428 A1 8/2018 Xie et al.
2018/0232435 A1* 8/2018 Papangelis .......... G06F 16/3329
2018/0239837 A1 8/2018 Wang
2018/0240014 A1 8/2018 Strope et al.
2018/0246953 A1 8/2018 Oh et al.
2018/0260086 A1 9/2018 Leme et al.
2018/0260856 A1 9/2018 Balasubramanian et al.
2018/0268298 A1 9/2018 Johansen et al.
2018/0287968 A1 10/2018 Koukoumidis et al.
2018/0293221 A1 10/2018 Finkelstein et al.
2018/0293484 A1 10/2018 Wang et al.
2018/0301151 A1 10/2018 Mont-Reynaud et al.
2018/0329512 A1 11/2018 Liao et al.
2018/0329998 A1 11/2018 Thomson et al.
2018/0330280 A1 11/2018 Erenrich et al.
2018/0330714 A1 11/2018 Paulik et al.
2018/0330737 A1 11/2018 Paulik et al.
2018/0332118 A1 11/2018 Phipps et al.
2018/0341871 A1 11/2018 Maitra et al.
2018/0349962 A1 12/2018 Adderly et al.
2018/0350144 A1 12/2018 Rathod
2018/0350377 A1 12/2018 Karazoun
2018/0367483 A1 12/2018 Rodriguez et al.
2019/0005024 A1 1/2019 Somech et al.
2019/0007208 A1 1/2019 Surla et al.
2019/0034406 A1 1/2019 Singh et al.
2019/0035390 A1 1/2019 Howard et al.
2019/0065588 A1 2/2019 Lin et al.
2019/0073363 A1 3/2019 Perez et al.
2019/0080698 A1 3/2019 Miller
2019/0082221 A1 3/2019 Jain et al.
2019/0087491 A1 3/2019 Bax
2019/0095500 A1 3/2019 Pandey et al.
2019/0104093 A1 4/2019 Lim et al.
2019/0121907 A1 4/2019 Brunn et al.
2019/0132265 A1 5/2019 Nowak-Przygodzki et al.
2019/0139150 A1 5/2019 Brownhill et al.
2019/0146647 A1 5/2019 Ramchandran et al.
2019/0149489 A1 5/2019 Akbulut et al.
2019/0156204 A1 5/2019 Bresch et al.
2019/0156206 A1 5/2019 Graham et al.
2019/0163691 A1 5/2019 Brunet et al.
2019/0171655 A1 6/2019 Psota et al.
2019/0182195 A1 6/2019 Avital et al.
2019/0205368 A1 7/2019 Wang et al.
2019/0205464 A1 7/2019 Zhao et al.
2019/0206412 A1 7/2019 Li et al.
2019/0213490 A1 7/2019 White et al.
2019/0237068 A1 8/2019 Canim et al.
2019/0242608 A1 8/2019 Laftchiev et al.
2019/0258710 A1 8/2019 Biyani et al.
2019/0266185 A1 8/2019 Rao et al.
2019/0281001 A1 9/2019 Miller et al.
2019/0311036 A1 10/2019 Shanmugam et al.
2019/0311301 A1 10/2019 Pyati
2019/0311710 A1 10/2019 Eraslan et al.
2019/0313054 A1 10/2019 Harrison et al.
2019/0318729 A1 10/2019 Chao et al.
2019/0318735 A1 10/2019 Chao et al.
2019/0324527 A1 10/2019 Presant et al.
2019/0324553 A1 10/2019 Liu et al.
2019/0324780 A1 10/2019 Zhu et al.
2019/0325042 A1 10/2019 Yu et al.
2019/0325081 A1 10/2019 Liu et al.
2019/0325084 A1 10/2019 Peng et al.
2019/0325864 A1 10/2019 Anders et al.
2019/0327330 A1 10/2019 Natarajan et al.
2019/0327331 A1 10/2019 Natarajan et al.
2019/0332946 A1 10/2019 Han et al.
2019/0348033 A1 11/2019 Chen et al.
2019/0361408 A1 11/2019 Tokuchi
2019/0385051 A1 12/2019 Wabgaonkar et al.
2020/0012681 A1 1/2020 McInerney et al.
2020/0027443 A1 1/2020 Raux
2020/0045119 A1 2/2020 Weldemariam et al.
2020/0081736 A1 3/2020 Gopalan et al.
2020/0104427 A1 4/2020 Long et al.
2020/0175990 A1 6/2020 Fanty
2020/0184959 A1 6/2020 Yasa et al.
2020/0382449 A1 12/2020 Taylor et al.
2020/0388282 A1 12/2020 Secker-Walker et al.
2020/0410012 A1 12/2020 Moon et al.
2021/0117214 A1 4/2021 Presant et al.
2021/0117479 A1 4/2021 Liu et al.
2021/0117623 A1 4/2021 Aly et al.
2021/0117624 A1 4/2021 Aghajanyan et al.
2021/0117681 A1 4/2021 Poddar et al.
2021/0117712 A1 4/2021 Huang et al.
2021/0117780 A1 4/2021 Malik et al.
2021/0118440 A1 4/2021 Peng et al.
2021/0118442 A1 4/2021 Poddar et al.
2021/0119955 A1 4/2021 Penov et al.
2021/0120206 A1 4/2021 Liu et al.

FOREIGN PATENT DOCUMENTS

EP 2530870 12/2012
EP 3122001 1/2017
KR 20070043673 A 4/2007
KR 101350712 B1 1/2014
WO WO 2012/116241 8/2012
WO 2012116241 A3 11/2012
WO 2014190297 A1 11/2014
WO 2016065020 A2 4/2016
WO WO 2016/195739 12/2016
WO WO 2017/053208 3/2017
WO 2017112003 A1 6/2017
WO WO 2017/116488 7/2017
WO 2017129149 A1 8/2017
WO 2018067402 A1 4/2018

OTHER PUBLICATIONS

U.S. Appl. No. 15/808,638, filed Nov. 9, 2017, Ryan Brownhill.
U.S. Appl. No. 15/953,957, filed Apr. 16, 2018, Kemal El Moujahid.

(56) References Cited

OTHER PUBLICATIONS

U.S. Appl. No. 15/966,455, filed Apr. 30, 2018, Scott Martin.
U.S. Appl. No. 15/967,193, filed Apr. 30, 2018, Davide Testuggine.
U.S. Appl. No. 15/967,239, filed Apr. 30, 2018, Vivek Natarajan.
U.S. Appl. No. 15/967,279, filed Apr. 30, 2018, Fuchun Peng.
U.S. Appl. No. 15/967,290, filed Apr. 30, 2018, Fuchun Peng.
U.S. Appl. No. 15/967,342, filed Apr. 30, 2018, Vivek Natarajan.
U.S. Appl. No. 16/011,062, filed Jun. 18, 2018, Jinsong Yu.
U.S. Appl. No. 16/025,317, filed Jul. 2, 2018, Sonal Gupta.
U.S. Appl. No. 16/036,827, filed Jul. 16, 2018, Emmanouil Koukoumidis.
U.S. Appl. No. 16/038,120, filed Jul. 17, 2018, Jason Schissel.
U.S. Appl. No. 16/048,049, filed Jul. 27, 2018, Markku Salkola.
U.S. Appl. No. 16/048,072, filed Jul. 27, 2018, Markku Salkola.
U.S. Appl. No. 16/048,101, filed Jul. 27, 2018, Markku Salkola.
U.S. Appl. No. 16/053,600, filed Aug. 2, 2018, Vivek Natarajan.
U.S. Appl. No. 16/057,414, filed Aug. 7, 2018, Jeremy Gillmor Kahn.
U.S. Appl. No. 16/103,775, filed Aug. 14, 2018, Zheng Zhou.
U.S. Appl. No. 16/107,601, filed Aug. 21, 2018, Rajesh Krishna Shenoy.
U.S. Appl. No. 16/107,847, filed Aug. 21, 2018, Rajesh Krishna Shenoy.
U.S. Appl. No. 16/118,169, filed Aug. 30, 2018, Baiyang Liu.
U.S. Appl. No. 16/121,393, filed Sep. 4, 2018, Zheng Zhou.
U.S. Appl. No. 16/127,173, filed Sep. 10, 2018, Zheng Zhou.
U.S. Appl. No. 16/129,638, filed Sep. 12, 2018, Vivek Natarajan.
U.S. Appl. No. 16/135,752, filed Sep. 19, 2018, Xiaohu Liu.
U.S. Appl. No. 16/150,069, filed Oct. 2, 2018, Jiedan Zhu.
U.S. Appl. No. 16/150,184, filed Oct. 2, 2018, Francislav P. Penov.
U.S. Appl. No. 16/151,040, filed Oct. 3, 2018, Brian Nelson.
U.S. Appl. No. 16/168,536, filed Oct. 23, 2018, Benoit F. Dumoulin.
U.S. Appl. No. 16/176,081, filed Oct. 31, 2018, Anusha Balakrishnan.
U.S. Appl. No. 16/176,312, filed Oct. 31, 2018, Emmanouil Koukoumidis.
U.S. Appl. No. 16/182,542, filed Nov. 6, 2018, Michael Robert Hanson.
U.S. Appl. No. 16/183,650, filed Nov. 7, 2018, Xiaohu Liu.
U.S. Appl. No. 16/192,538, filed Nov. 15, 2018, Emmanouil Koukoumidis.
U.S. Appl. No. 16/222,923, filed Dec. 17, 2018, Jason Schissel.
U.S. Appl. No. 16/222,957, filed Dec. 17, 2018, Emmanouil Koukoumidis.
U.S. Appl. No. 16/229,828, filed Dec. 21, 2018, Xiaohu Liu.
U.S. Appl. No. 16/247,439, filed Jan. 14, 2019, Xiaohu Liu.
U.S. Appl. No. 16/264,173, filed Jan. 31, 2019, Ashwini Challa.
U.S. Appl. No. 16/376,832, filed Apr. 5, 2019, Honglei Liu.
U.S. Appl. No. 16/389,769, filed Apr. 19, 2019, Honglei Liu.
U.S. Appl. No. 16/389,634, filed Apr. 19, 2019, Paul Anthony Crook.
U.S. Appl. No. 16/389,738, filed Apr. 19, 2019, Fuchun Peng.
U.S. Appl. No. 16/389,728, filed Apr. 19, 2019, William Crosby Presant.
U.S. Appl. No. 16/388,130, filed Apr. 18, 2019, Xiaohu Liu.
U.S. Appl. No. 16/389,708, filed Apr. 19, 2019, William Crosby Presant.
U.S. Appl. No. 16/434,010, filed Jun. 6, 2019, Sergiu Dogaru.
U.S. Appl. No. 62/660,876, filed Apr. 20, 2018, Anuj Kumar.
U.S. Appl. No. 62/675,090, filed May 22, 2018, Michael Robert Hanson.
U.S. Appl. No. 62/747,628, filed Oct. 18, 2018, Honglei Liu.
U.S. Appl. No. 62/749,608, filed Oct. 23, 2018, Ashwini Challa.
U.S. Appl. No. 62/750,746, filed Oct. 25, 2018, Honglei Liu.
Mari Ostendorf, et al.: Human Language Technology: Opportunities and Challenges, IEEE International Conference on Acoustics, Speech, and Signal Processing, Mar. 23, 2005.
Adam Poliak, et al.: Efficient, Compositional, Order-Sensitive n-gram Embeddings, Proceedings of the 15th Conference of the European Chapter of the Association for Computational Linguistics: vol. 2, Short Papers, pp. 503-508, Valencia, Spain, Apr. 3-7, 2017.
Chris Dyer, et al.: Recurrent Neural Network Grammars, Proceedings of NAACL-HLT 2016, pp. 199-209, San Diego, California, Jun. 12-17, 2016.
Overview of Language Technology, https://www.dfki.de/lt/lt-general.php, Feb. 15, 2018.
Jim Glass: A Brief Introduction to Automatic Speech Recognition, http://www.cs.columbia.edu/~mcollins/6864/slides/asr.pdf, Feb. 15, 2018.
Speech Synthesis, https://en.wikipedia.org/wiki/Speech_synthesis, Feb. 15, 2018.
Natural-language Understanding, https://en.wikipedia.org/wiki/Natural-language_understanding, Feb. 15, 2018.
Conversational AI and the Road Ahead, https://techcrunch.com/2017/02/25/conversational-ai-and-the-road-ahead/, Feb. 15, 2018.
What is Conversational AI? https://blog.salemove.com/what-is-conversational-ai/, Feb. 15, 2018.
Question Answering, https://en.wikipedia.org/wiki/Question_answering, Feb. 15, 2018.
Dialog Manager, https://en.wikipedia.org/wiki/Dialog_manager, Feb. 15, 2018.
Dialog Management, https://tutorials.botsfloor.com/dialog-manasement-799c20a39aad, Feb. 15, 2018.
Steeve Huang, Word2Vec and FastText Word Embedding with Gensim, https://towardsdatascience.com/word-embedding- with-word2vec-and-fasttext-a209cld3e12c, Mar. 13, 2018.
Ashwini Challa, et al.: Generate, Filter, and Rank: Grammaticality Classification for Production-Ready NLG Systems, arXiv: 1904.03279, Apr. 9, 2019.
Honglei Liu, et al.: Explore-Exploit: A Framework for Interactive and Online Learning, arXiv: 1812.00116, Dec. 1, 2018.
Turniški, Filip, et al. "Analysis of 3G and 4G download throughput in pedestrian zones." 2016 International Symposium Elmar, IEEE, Sep. 12, 2016.
Dubin, Ran, et al. "Adaptation Logic for HTTP Dynamic Adaptive Streaming using Geo-Predictive Crowdsourcing," arXiv preprint arXiv: 1602.02030, Feb. 5, 2016.
Chat Extensions, https://developers.facebook.com/docs/messenger-platform/guides/chat-extensions, Apr. 18, 2017.
Google Allo Makes Conversations Eeasier, Productive, and more Expressive, https://www.trickyways.com/2016/05/google-allo-makes-conversations-eeasier-productive-expressive/, May 19, 2016.
European search report received from the European Patent Office for European Patent Application No. 18201683.2-1222, dated Feb. 4, 2019.
European search report received from the European Patent Office for European Patent Application No. 18201685.7-1222, dated Feb. 4, 2019.
European search report received from the European Patent Office for European Patent Application No. 18201805.1-1222, dated Feb. 4, 2019.
European search report received from the European Patent Office for European Patent Application No. 18201808.5-1222, dated Feb. 4, 2019.
European search report received from the European Patent Office for European Patent Application No. 18201820.0-1222, dated Feb. 5, 2019.
European search report received from the European Patent Office for European Patent Application No. 18201826.7-1222, dated Feb. 4, 2019.
European search report received from the European Patent Office for European Patent Application No. 18203627.7-1222, dated Feb. 5, 2019.
European search report received from the European Patent Office for European Patent Application No. 18203675.6-1222, dated Feb. 5, 2019.
European search report received from the European Patent Office for European Patent Application No. 19155094.6-1218, dated Mar. 19, 2019.
Bang J., et al., "Example-Based Chat-Oriented Dialogue System With Personalized Long-Term Memory," International Conference on Big Data and Smart Computing (BIGCOMP), Jeju, South Korea, 2015, pp. 238-243.

(56) References Cited

OTHER PUBLICATIONS

Chen Y.N., et al., "Matrix Factorization with Domain Knowledge and Behavioral Patterns for Intent Modeling," NIPS Workshop on Machine Learning for SLU and Interaction, 2015, pp. 1-7.
Co-Pending U.S. Appl. No. 16/135,752, filed Sep. 19, 2018, 80 pages.
Co-Pending U.S. Appl. No. 16/150,184, inventors Francislav; P. Penov et al., filed Oct. 2, 2018, 78 pages.
Csaky R.K., "Deep Learning Based Chatbot Models," Budapest University of Technology and Economics, Nov. 2017, 69 pages, Retrieved from the Internet: URL: https://www.researchgate.net/?publication/323587007_Deep_Learning_Based_Chatbot_Models.
Golovin D., et al., "Google Vizier: A Service for Black-Box Optimization," Proceedings of the 23rd ACM International Conference on Knowledge Discovery and Data Mining, Aug. 13-17, 2017, vol. 23, pp. 1487-1495.
Draw your Business with Social Bots, Digital Marketing Institute, Nov. 20, 2017, 14 pages, Retrieved from the Internet: URL: https://digitalmarketinginstitute.com/blog/grow-your-business-with-social-bots.
Guo D.Z., et al., "Joint Semantic Utterance Classification and Slot Filling With Recursive Neural Networks," IEEE Spoken Language Technology Workshop (SLT), 2014, pp. 554-559.
Hazen J.T., et al., "Pronunciation Modeling using a Finite-State Transducer Representation," Speech Communication, vol. 46, 2005, pp. 189-203.
Huang Z., et al., "Bidirectional LSTM-CRF Models for Sequence Tagging," arXiv preprint, arXiv:1508.01991, 2015, 10 pages.
International Search Report and Written Opinion for International Application No. PCT/US2018/033116, dated Jan. 17, 2019, 10 Pages.
International Search Report and Written Opinion for International Application No. PCT/US2018/034604, dated Jan. 18, 2019, 13 Pages.
International Search Report and Written Opinion for International Application No. PCT/US2018/038396, dated Jan. 21, 2019, 13 Pages.
International Search Report and Written Opinion for International Application No. PCT/US2018/039268, dated Jan. 18, 2019, 14 Pages.
International Search Report and Written Opinion for International Application No. PCT/US2018/042906, dated Feb. 27, 2019, 10 Pages.
International Search Report and Written Opinion for International Application No. PCT/US2018/045177, dated Jan. 16, 2019, 15 Pages.
International Search Report and Written Opinion for International Application No. PCT/US2018/049568, dated Feb. 11, 2019, 25 Pages.
International Search Report and Written Opinion for International Application No. PCT/US2018/054322, dated Feb. 8, 2019, 15 Pages.
International Search Report and Written Opinion for International Application No. PCT/US2019/028187, dated Aug. 12, 2019, 11 Pages.
International Search Report and Written Opinion for International Application No. PCT/US2019/028387, dated Aug. 21, 2019, 12 Pages.
Komer B., et al., "Hyperopt-Sklearn: Automatic Hyperparameter Configuration for Scikit-Leam," Proceedings of the 13th Python in Science Conference, 2014, vol. 13, pp. 34-40.
Leung K.W-T., et al., "Deriving Concept-Based User Profiles from Search Engine Logs," IEEE Transactions on Knowledge and Data Engineering, Jul. 2010, vol. 22 (7), pp. 969-982.
Li T., et al., "Ease.ml: Towards Multi-tenant Resource Sharing for Machine Learning Workloads," arXiv: 1708.07308v1, Aug. 24, 2017, pp. 1-17.
Light M., et al., "Personalized Multimedia Information Access," Communications of the Association for Computing Machinery, May 2002, vol. 45 (5), pp. 54-59.
Mesnil G., et al., "Using Recurrent Neural Networks for Slot Filling in Spoken Language Understanding," IEEE/ACM Transactions on Audio, Speech, and Language Processing, Mar. 2015, vol. 23 (3), pp. 530-539.
Mun H., et al., "Accelerating Smart Speaker Service with Content Prefetching and Local Control," In IEEE 17th Annual Consumer Communications & Networking Conference (CCNC), 2020, 6 pages.
Nanas N., et al., "Multi-topic Information Filtering with a Single User Profile," Springer-Verlag Berlin Germany, SETN, LNAI 3025, 2004, pp. 400-409.
Ren H., et al., "Dialog State Tracking using Conditional Random Fields," Proceedings of the SIGDIAL Conference, Association for Computational Linguistics, 2013, pp. 457-461.
So C.F., et al., "Ontological User Profiling and Language Modeling for Personalized Information Services," 2009 IEEE International Conference on e-Business Engineering, Macau, China, 2009, pp. 559-564.
Sood A., et al., "Topic-Focused Summarization of Chat Conversations," ECIR, LNCS 7814, Springer-Verlag, Berlin, Germany, 2013, pp. 800-803.
Tepper N., et al., "Collabot: Personalized Group Chat Summarization," In Proceedings of the Eleventh ACM International Conference on Web Search and Data Mining, Feb. 5, 2018, pp. 771-774.
U.S. Appl. No. 62/660,879, inventor Anuj; Kumar, filed Apr. 20, 2018.
Wang W., et al., "Rafiki: Machine Learning as an Analytics Service System," arXiv: 1804.06087v1, Apr. 17, 2018, pp. 1-13.
Wang X., et al., "Exploration in Interactive Personalized Music Recommendation: A Reinforcement Learning Approach," ACM Transactions on Multimedia Computing, Communications, and Applications, arXiv: 1311.6355v1, Oct. 2013, vol. 2 (3), pp. 1-24.
Candito M.H., et al., "Can the TAG Derivation Tree Represent a Semantic Graph? An Answer in the Light of Meaning—Text Theory," Proceedings of the Fourth International Workshop on Tree Adjoining Grammars and Related Frameworks (TAG+ 4), 1998, 04 pages.
Chen Y.N., et al., "Knowledge as a Teacher Knowledge-Guided Structural Attention Networks," arXiv preprint arXiv 1609.03286, 2016, 12 pages.
Co-Pending U.S. Appl. No. 15/953,957, inventors Kemal; El Moujahid et al., filed Apr. 16, 2018.
Co-Pending U.S. Appl. No. 16/173,155, inventors Emmanouil; Koukoumidis et al., filed Oct. 29, 2018.
Co-Pending U.S. Appl. No. 16/557,055, inventor Moon; Seungwhan, filed Aug. 30, 2019.
Co-Pending U.S. Appl. No. 16/659,070, inventor Huang; Lisa Xiaoyi, filed Oct. 21, 2019.
Co-Pending U.S. Appl. No. 16/659,203, inventor Huang; Lisa Xiaoyi, filed Oct. 21, 2019.
Co-Pending U.S. Appl. No. 16/659,419, inventor Huang; Lisa Xiaoyi, filed Oct. 21, 2019.
Co-Pending U.S. Appl. No. 16/741,630, inventor Crook; Paul Anthony, filed Jan. 13, 2020.
Co-Pending U.S. Appl. No. 16/742,769, inventor Liu; Xiaohu, filed Jan. 14, 2020.
Co-Pending U.S. Appl. No. 16/790,497, inventor Gao; Yang, filed Feb. 13, 2020.
Co-Pending U.S. Appl. No. 16/815,960, inventor Malik; Kshitiz, filed Mar. 11, 2020.
Co-Pending U.S. Appl. No. 16/842,366, inventors Sravani; Kamisetty et al., filed Apr. 7, 2020.
Co-Pending U.S. Appl. No. 16/914,966, inventor Behar; Noam Yakob, filed Jun. 29, 2020.
Co-Pending U.S. Appl. No. 16/917,664, inventor Liu; Xiaohu, filed Jun. 30, 2020.
Co-Pending U.S. Appl. No. 16/921,665, inventor Liu; Honglei, filed Jul. 6, 2020.
Co-Pending U.S. Appl. No. 16/998,423, inventors Armen; Aghajanyan et al., filed Aug. 20, 2020.
Co-Pending U.S. Appl. No. 17/006,260, inventors William; Presant et al., filed Aug. 28, 2020.
Co-Pending U.S. Appl. No. 17/006,339, inventors Shivani; Poddar et al., filed Aug. 28, 2020.

(56) References Cited

OTHER PUBLICATIONS

Co-Pending U.S. Appl. No. 17/006,377, inventors Shivani; Poddar et al., filed Aug. 28, 2020.
Co-Pending U.S. Appl. No. 17/009,542, inventor Kottur; Satwik, filed Sep. 1, 2020.
Co-Pending U.S. Appl. No. 17/035,253, inventor Khemka; Piyush, filed Sep. 28, 2020.
Co-Pending U.S. Appl. No. 17/120,013, inventor Botros; Fadi, filed Dec. 11, 2020.
Co-Pending U.S. Appl. No. 17/136,636, inventor Greenberg; Michael, filed Dec. 29, 2020.
Co-Pending U.S. Appl. No. 17/139,363, inventor Cheng; Daniel Manhon, filed Dec. 31, 2020.
Co-Pending U.S. Appl. No. 17/186,459, inventor Liu; Bing, filed Feb. 26, 2021.
Co-Pending U.S. Appl. No. 17/336,716, inventor Chaland; Christophe, filed Jun. 2, 2021.
Co-Pending U.S. Appl. No. 17/351,501, inventor Sethi; Pooja, filed Jun. 18, 2021.
Co-Pending U.S. Appl. No. 17/391,765, inventor Pu; Yiming, filed Aug. 2, 2021.
Co-Pending U.S. Appl. No. 17/394,096, inventor Wang; Emily, filed Aug. 4, 2021.
Co-Pending U.S. Appl. No. 17/394,159, inventor Santoro; Elizabeth Kelsey, filed Aug. 4, 2021.
Co-Pending U.S. Appl. No. 17/407,922, inventor Pu; Yiming, filed Aug. 20, 2021.
Co-Pending U.S. Appl. No. 17/504,276, inventor Kottur; Satwik, filed Oct. 18, 2021.
Co-Pending U.S. Appl. No. 17/512,478, inventor Chen; Zhiyu, filed Oct. 27, 2021.
Co-Pending U.S. Appl. No. 17/512,508, inventor Vincent; Joshuah, filed Oct. 27, 2021.
Co-Pending U.S. Appl. No. 16/173,155, filed Oct. 29, 2018, 79 pages.
Co-Pending U.S. Appl. No. 62/660,879, inventor Anuj; Kumar, filed Apr. 20, 2018.
Jebman E., et al., "DJ-MC: A Reinforcement-Learning Agent for Music Playlist Recommendation," ArXiv, 2015, pp. 1-9.
McInerney J., et al., "Explore, Exploit and Explain: Personalizing Explainable Recommendations with Bandits," RecSys '18: Proceedings of the 12th ACM Conference on Recommender Systems, Sep. 2018, vol. 12, pp. 31-39.
U.S. Appl. No. 62/923,342, inventors Michael; Robert Hanson et al., filed Oct. 18, 2019.
Mahajan D., et al., "LogUCB: An Explore-Exploit Algorithm for Comments Recommendation," Proceedings of the 21st ACM International Conference on Information and Knowledge Management (CIKM '12), 2012, pp. 6-15.
Moon T., et al., "Online Learning for Recency Search Ranking Using Real-Time User Feedback," Proceedings of the 19th ACM International Conference on Information and Knowledge Management (CIKM '10), 2010, pp. 1501-1504.
Vanchinathan H.P., et al., "Explore-Exploit in Top-N Recommender Systems via Gaussian Processes," Proceedings of the 8th ACM Conference on Recommender systems (ReeSys '14), 2014, pp. 225-232.
Wong Y.W., et al., "Scalable Attribute-Value Extraction from Semi-Structured Text," IEEE International Conference on Data Mining Workshops, 2009, pp. 302-307.

* cited by examiner

600

DIALOG STATE TRACKING FOR ASSISTANT SYSTEMS

PRIORITY

This application claims the benefit, under 35 U.S.C. § 119(e), of U.S. Provisional Patent Application No. 62/660,876, filed 20 Apr. 2018, which is incorporated herein by reference.

TECHNICAL FIELD

This disclosure generally relates to databases and file management within network environments, and in particular relates to hardware and software for smart assistant systems.

BACKGROUND

An assistant system can provide information or services on behalf of a user based on a combination of user input, location awareness, and the ability to access information from a variety of online sources (such as weather conditions, traffic congestion, news, stock prices, user schedules, retail prices, etc.). The user input may include text (e.g., online chat), especially in an instant messaging application or other applications, voice, images, motion, or a combination of them. The assistant system may perform concierge-type services (e.g., making dinner reservations, purchasing event tickets, making travel arrangements) or provide information based on the user input. The assistant system may also perform management or data-handling tasks based on online information and events without user initiation or interaction. Examples of those tasks that may be performed by an assistant system may include schedule management (e.g., sending an alert to a dinner date that a user is running late due to traffic conditions, update schedules for both parties, and change the restaurant reservation time). The assistant system may be enabled by the combination of computing devices, application programming interfaces (APIs), and the proliferation of applications on user devices.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. profile/news feed posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, the assistant system may assist a user to obtain information or services. The assistant system may enable the user to interact with it with multi-modal user input (such as voice, text, image, video, motion) in stateful and multi-turn conversations to get assistance. The assistant system may create and store a user profile comprising both personal and contextual information associated with the user. In particular embodiments, the assistant system may analyze the user input using natural-language understanding. The analysis may be based on the user profile for more personalized and context-aware understanding. The assistant system may resolve entities associated with the user input based on the analysis. In particular embodiments, the assistant system may interact with different agents to obtain information or services that are associated with the resolved entities. The assistant system may generate a response for the user regarding the information or services by using natural-language generation. Through the interaction with the user, the assistant system may use dialog management techniques to manage and forward the conversation flow with the user. In particular embodiments, the assistant system may further assist the user to effectively and efficiently digest the obtained information by summarizing the information. The assistant system may also assist the user to be more engaging with an online social network by providing tools that help the user interact with the online social network (e.g., creating posts, comments, messages). The assistant system may additionally assist the user to manage different tasks such as keeping track of events. In particular embodiments, the assistant system may proactively execute tasks that are relevant to user interests and preferences based on the user profile without a user input. In particular embodiments, the assistant system may check privacy settings to ensure that accessing a user's profile or other user information and executing different tasks are permitted subject to the user's privacy settings.

In particular embodiment, the assistant system may track the dialog state and perform updates to the dialog state through the application of functions that encode the update to the dialog states. During typical interactions (e.g., conversations), either between (i) a person and the assistant system or (ii) multiple people with the assistant system as a bystander or active participant, the assistant system may track the interactions using dialog states. In particular embodiments, the dialog state may comprise one or more intents and one or more slots. As an example and not by way of limitation, during a conversation between a user and the assistant system, if a user asks "What is the weather today?" the assistant system may determine the dialog state as comprising the intent [IN:get_weather("location")] and slot [SL:location("current location")]. After determining these as the most likely intended intents and slots, a query may be generated and executed by the assistant system with respect to the current dialog state (i.e., querying weather information for a current geographic location associated with the querying user). Prior to executing a query, there may be ambiguity and uncertainty that may be due to input errors and natural uncertainty inherent in language and other input modalities. As an example and not by way of limitation, a user input may include noise (e.g., typos in a text input, background noise in an audio input), the input may include grammatical errors or colloquialisms, or the input may reference unknown or ambiguous terms. These errors and uncertainties may cause the assistant system to misinterpret or misidentify what was said in an input. In particular embodiments, the assistant architecture may comprise a dialog state tracking module and an action selector that are coupled together in such a way that the dialog manager may be retrained from scratch to test alternative uncertainty representations. In addition, in particular embodiments, the assistant architecture may make switching between alternative dialog state tracking implementations technologically challenging at runtime. As such, in particular embodiments, an improved assistant architecture may help improve the assistant system's ability to handle ambiguity and uncertainty. In particular embodiments, to handle the ambiguity and uncertainty associated with the user input, the assistant system may generate multiple dialog state frames to contain different dialog states (e.g., different combinations of intents and slots) that may be applied to the current dialog state. In particular embodiments, the dialog state frames may correspond to various hypothesis dialog states. In particular embodiments, the assistant system may also generate various functions to change or update the dialog states. After generation of these functions, the assistant system may continue to track the dialog state and generate a subsequent set of functions to be applied to the previous round of functions, thus creating a hierarchical set of functions from an initial dialog state. In particular embodiments, the hierarchical set of functions may be a function tree. In particular embodiments, after determining when to apply one or more generated functions, the assistant system may apply the functions and perform a system action (e.g., execute query, perform an action, etc.). Although this disclosure describes tracking the dialog state and performing updates to the dialog state in a particular manner, this disclosure contemplates tracking the dialog state and performing updates to the dialog state in any suitable manner.

In particular embodiments, the assistant system may track the dialog state of a message thread. In particular embodiments, the assistant system may receive, from a client system, a first input in a multi-thread message thread. In particular embodiments, the assistant system may parse the first input to identify a first plurality of hypothesis dialog states associated with the first input. In particular embodiments, the assistant system may generate a first plurality of functions corresponding to the first plurality of hypothesis dialog states. In particular embodiments, the assistant system may calculate a first plurality of probability scores for the first plurality of functions, respectively, based on a prior dialog state associated with the message thread and a current user context. Each probability score may represent a likelihood that the respective function is associated with an intended dialog state. In particular embodiments, the assistant system may store the first plurality of functions if each of the probability scores is below a threshold probability score. In particular embodiments, the first plurality of functions may be stored as a hierarchical set of functions that is used as the prior dialog state in response to a next input in the message thread.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
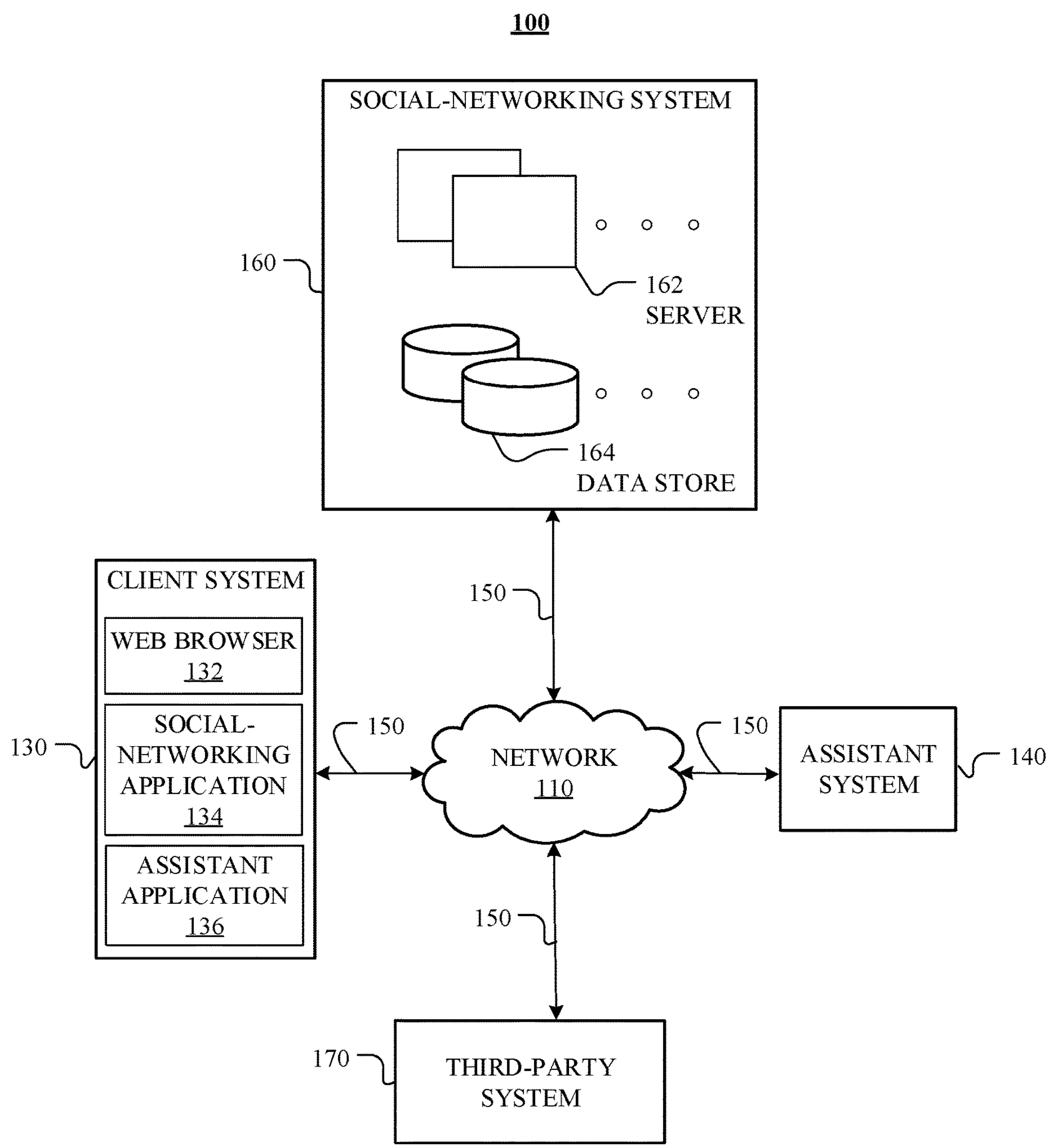
FIG. 1 illustrates an example network environment associated with an assistant system.

FIG. 1 illustrates an example network environment 100 associated with an assistant system. Network environment 100 includes a client system 130, an assistant system 140, a social-networking system 160, and a third-party system 170 connected to each other by a network 110. Although FIG. 1 illustrates a particular arrangement of a client system 130, an assistant system 140, a social-networking system 160, a third-party system 170, and a network 110, this disclosure contemplates any suitable arrangement of a client system 130, an assistant system 140, a social-networking system 160, a third-party system 170, and a network 110. As an example and not by way of limitation, two or more of a client system 130, a social-networking system 160, an assistant system 140, and a third-party system 170 may be connected to each other directly, bypassing a network 110. As another example, two or more of a client system 130, an assistant system 140, a social-networking system 160, and a third-party system 170 may be physically or logically co-located with each other in whole or in part. Moreover, although FIG. 1 illustrates a particular number of client systems 130, assistant systems 140, social-networking systems 160, third-party systems 170, and networks 110, this disclosure contemplates any suitable number of client systems 130, assistant systems 140, social-networking systems 160, third-party systems 170, and networks 110. As an example and not by way of limitation, network environment 100 may include multiple client systems 130, assistant systems 140, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, an assistant system 140, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, smart speaker, virtual reality (VR) headset, augment reality (AR) smart glasses, other suitable electronic device, or any suitable combination thereof. In particular embodiments, the client system 130 may be a smart assistant device. More information on smart assistant devices may be found in U.S. patent application Ser. No. 15/949,011, filed 9 Apr. 2018, U.S. Patent Application No. 62/655,751, filed 10 Apr. 2018, U.S. Design patent application No. 29/631910, filed 3 Jan. 2018, U.S. Design patent application No. 29/631747, filed 2 Jan. 2018, U.S. Design patent application No. 29/631913, filed 3 Jan. 2018, and U.S. Design patent application No. 29/631914, filed 3 Jan. 2018, each of which is incorporated by reference. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, a client system 130 may include a social-networking application 134 installed on the client system 130. A user at a client system 130 may use the social-networking application 134 to access on online social network. The user at the client system 130 may use the social-networking application 134 to communicate with the user's social connections (e.g., friends, followers, followed accounts, contacts, etc.). The user at the client system 130 may also use the social-networking application 134 to interact with a plurality of content objects (e.g., posts, news articles, ephemeral content, etc.) on the online social network. As an example and not by way of limitation, the user may browse trending topics and breaking news using the social-networking application 134.

In particular embodiments, a client system 130 may include an assistant application 136. A user at a client system 130 may use the assistant application 136 to interact with the assistant system 140. In particular embodiments, the assistant application 136 may comprise a stand-alone application. In particular embodiments, the assistant application 136 may be integrated into the social-networking application 134 or another suitable application (e.g., a messaging application). In particular embodiments, the assistant application 136 may be also integrated into the client system 130, an assistant hardware device, or any other suitable hardware devices. In particular embodiments, the assistant application 136 may be accessed via the web browser 132. In particular embodiments, the user may provide input via different modalities. As an example and not by way of limitation, the modalities may include audio, text, image, video, motion, etc. The assistant application 136 may communicate the user input to the assistant system 140. Based on the user input, the assistant system 140 may generate responses. The assistant system 140 may send the generated responses to the assistant application 136. The assistant application 136 may then present the responses to the user at the client system 130. The presented responses may be based on different modalities such as audio, text, image, and video. As an example and not by way of limitation, the user may verbally ask the assistant application 136 about the traffic information (i.e., via an audio modality). The assistant application 136 may then communicate the request to the assistant system 140. The assistant system 140 may accordingly generate the result and send it back to the assistant application 136. The assistant application 136 may further present the result to the user in text.

In particular embodiments, an assistant system 140 may assist users to retrieve information from different sources. The assistant system 140 may also assist user to request services from different service providers. In particular embodiments, the assist system 140 may receive a user request for information or services via the assistant application 136 in the client system 130. The assist system 140 may use natural-language understanding to analyze the user request based on user's profile and other relevant information. The result of the analysis may comprise different entities associated with an online social network. The assistant system 140 may then retrieve information or request services associated with these entities. In particular embodiments, the assistant system 140 may interact with the social-networking system 160 and/or third-party system 170 when retrieving information or requesting services for the user. In particular embodiments, the assistant system 140 may generate a personalized communication content for the user using natural-language generating techniques. The personalized communication content may comprise, for example, the retrieved information or the status of the requested services. In particular embodiments, the assistant system 140 may enable the user to interact with it regarding the information or services in a stateful and multi-turn conversation by using dialog-management techniques. The functionality of the assistant system 140 is described in more detail in the discussion of FIG. 2 below.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Assistant Systems

Figure 2:
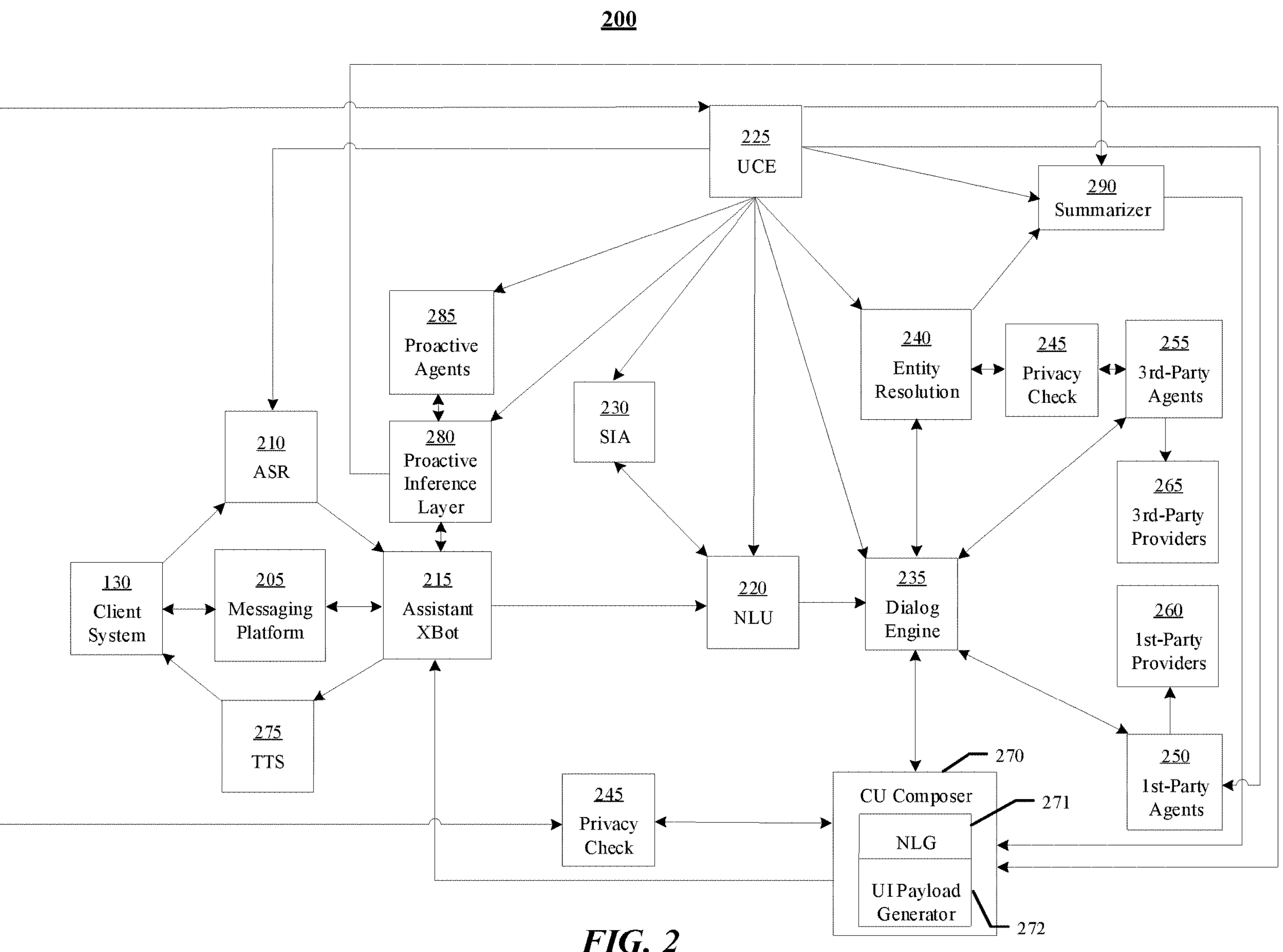
FIG. 2 illustrates an example architecture of the assistant system.

FIG. 2 illustrates an example architecture 200 of the assistant system 140. In particular embodiments, the assistant system 140 may assist a user to obtain information or services. The assistant system 140 may enable the user to interact with it with multi-modal user input (such as voice, text, image, video, motion) in stateful and multi-turn conversations to get assistance. The assistant system 140 may create and store a user profile comprising both personal and contextual information associated with the user. In particular embodiments, the assistant system 140 may analyze the user input using natural-language understanding. The analysis may be based on the user profile for more personalized and context-aware understanding. The assistant system 140 may resolve entities associated with the user input based on the analysis. In particular embodiments, the assistant system 140 may interact with different agents to obtain information or services that are associated with the resolved entities. The assistant system 140 may generate a response for the user regarding the information or services by using natural-language generation. Through the interaction with the user, the assistant system 140 may use dialog management techniques to manage and forward the conversation flow with the user. In particular embodiments, the assistant system 140 may further assist the user to effectively and efficiently digest the obtained information by summarizing the information. The assistant system 140 may also assist the user to be more engaging with an online social network by providing tools that help the user interact with the online social network (e.g., creating posts, comments, messages). The assistant system 140 may additionally assist the user to manage different tasks such as keeping track of events. In particular embodiments, the assistant system 140 may proactively execute pre-authorized tasks that are relevant to user interests and preferences based on the user profile, at a time relevant for the user, without a user input. In particular embodiments, the assistant system 140 may check privacy settings to ensure that accessing a user's profile or other user information and executing different tasks are permitted subject to the user's privacy settings. More information on assisting users subject to privacy settings may be found in U.S. Patent Application No. 62/675,090, filed 22 May 2018, which is incorporated by reference.

In particular embodiments, the assistant system 140 may receive a user input from the assistant application 136 in the client system 130 associated with the user. In particular embodiments, the user input may be a user generated input that is sent to the assistant system 140 in a single turn. If the user input is based on a text modality, the assistant system 140 may receive it at a messaging platform 205. If the user input is based on an audio modality (e.g., the user may speak to the assistant application 136 or send a video including speech to the assistant application 136), the assistant system 140 may process it using an automatic speech recognition (ASR) module 210 to convert the user input into text. If the user input is based on an image or video modality, the assistant system 140 may process it using optical character recognition techniques within the messaging platform 205 to convert the user input into text. The output of the messaging platform 205 or the ASR module 210 may be received at an assistant xbot 215. More information on handling user input based on different modalities may be found in U.S. patent application Ser. No. 16/053,600, filed 2 Aug. 2018, which is incorporated by reference.

In particular embodiments, the assistant xbot 215 may be a type of chat bot. The assistant xbot 215 may comprise a programmable service channel, which may be a software code, logic, or routine that functions as a personal assistant to the user. The assistant xbot 215 may work as the user's portal to the assistant system 140. The assistant xbot 215 may therefore be considered as a type of conversational agent. In particular embodiments, the assistant xbot 215 may send the textual user input to a natural-language understanding (NLU) module 220 to interpret the user input. In particular embodiments, the NLU module 220 may get information from a user context engine 225 and a semantic information aggregator (SIA) 230 to accurately understand the user input. The user context engine 225 may store the user profile of the user. The user profile of the user may comprise user-profile data including demographic information, social information, and contextual information associated with the user. The user-profile data may also include user interests and preferences on a plurality of topics, aggregated through conversations on news feed, search logs, messaging platform 205, etc. The usage of a user profile may be protected behind a privacy check module 245 to ensure that a user's information can be used only for his/her benefit, and not shared with anyone else. More information on user profiles may be found in U.S. patent application Ser. No. 15/967,239, filed 30 Apr. 2018, which is incorporated by reference. The semantic information aggregator 230 may provide ontology data associated with a plurality of predefined domains, intents, and slots to the NLU module 220. In particular embodiments, a domain may denote a social context of interaction, e.g., education. An intent may be an element in a pre-defined taxonomy of semantic intentions, which may indicate a purpose of a user interacting with the assistant system 140. In particular embodiments, an intent may be an output of the NLU module 220 if the user input comprises a text/speech input. The NLU module 220 may classify the text/speech input into a member of the predefined taxonomy, e.g., for the input "Play Beethoven's 5th," the NLU module 220 may classify the input as having the intent [IN:play music]. In particular embodiments, a domain may be conceptually a namespace for a set of intents, e.g., music. A slot may be a named sub-string with the user input, representing a basic semantic entity. For example, a slot for "pizza" may be [SL:dish]. In particular embodiments, a set of valid or expected named slots may be conditioned on the classified intent. As an example and not by way of limitation, for [IN:play music], a slot may be [SL:song_name]. The semantic information aggregator 230 may additionally extract information from a social graph, a knowledge graph, and a concept graph, and retrieve a user's profile from the user context engine 225. The semantic information aggregator 230 may further process information from these different sources by determining what information to aggregate, annotating n-grams of the user input, ranking the n-grams with confidence scores based on the aggregated information, formulating the ranked n-grams into features that can be used by the NLU module 220 for understanding the user input. More information on aggregating semantic information may be found in U.S. patent application Ser. No. 15/967,342, filed 30 Apr. 2018, which is incorporated by reference. Based on the output of the user context engine 225 and the semantic information aggregator 230, the NLU module 220 may identify a domain, an intent, and one or more slots from the user input in a personalized and context-aware manner. As an example and not by way of limitation, a user input may comprise "show me how to get to the Starbucks". The NLU module 220 may identify the particular Starbucks that the user wants to go based on the user's personal information and the associated contextual information. In particular embodiments, the NLU module 220 may comprise a lexicon of language and a parser and grammar rules to partition sentences into an internal representation. The NLU module 220 may also comprise one or more programs that perform naive semantics or stochastic semantic analysis to the use of pragmatics to understand a user input. In particular embodiments, the parser may be based on a deep learning architecture comprising multiple long-short term memory (LSTM) networks. As an example and not by way of limitation, the parser may be based on a recurrent neural network grammar (RNNG) model, which is a type of recurrent and recursive LSTM algorithm. More information on natural-language understanding may be found in U.S. patent application Ser. No. 16/011,062, filed 18 Jun. 2018, U.S. patent application Ser. No. 16/025,317, filed 2 Jul. 2018, and U.S. patent application Ser. No. 16/038,120, filed 17 Jul. 2018, each of which is incorporated by reference.

In particular embodiments, the identified domain, intent, and one or more slots from the NLU module 220 may be sent to a dialog engine 235. In particular embodiments, the dialog engine 235 may manage the dialog state and flow of the conversation between the user and the assistant xbot 215. The dialog engine 235 may additionally store previous conversations between the user and the assistant xbot 215. In particular embodiments, the dialog engine 235 may communicate with an entity resolution module 240 to resolve entities associated with the one or more slots, which supports the dialog engine 235 to forward the flow of the conversation between the user and the assistant xbot 215. In particular embodiments, the entity resolution module 240 may access the social graph, the knowledge graph, and the concept graph when resolving the entities. Entities may include, for example, unique users or concepts, each of which may have a unique identifier (ID). As an example and not by way of limitation, the knowledge graph may comprise a plurality of entities. Each entity may comprise a single record associated with one or more attribute values. The particular record may be associated with a unique entity identifier. Each record may have diverse values for an attribute of the entity. Each attribute value may be associated with a confidence probability. A confidence probability for an attribute value represents a probability that the value is accurate for the given attribute. Each attribute value may be also associated with a semantic weight. A semantic weight for an attribute value may represent how the value semantically appropriate for the given attribute considering all the available information. For example, the knowledge graph may comprise an entity of a movie "The Martian" (2015), which includes information that has been extracted from multiple content sources (e.g., Facebook, Wikipedia, movie review sources, media databases, and entertainment content sources), and then deduped, resolved, and fused to generate the single unique record for the knowledge graph. The entity may be associated with a space attribute value which indicates the genre of the movie "The Martian" (2015). More information on the knowledge graph may be found in U.S. patent application Ser. No. 16/048,049, filed 27 Jul. 2018, and U.S. patent application Ser. No. 16/048,101, filed 27 Jul. 2018, each of which is incorporated by reference. The entity resolution module 240 may additionally request a user profile of the user associated with the user input from the user context engine 225. In particular embodiments, the entity resolution module 240 may communicate with a privacy check module 245 to guarantee that the resolving of the entities does not violate privacy policies. In particular embodiments, the privacy check module 245 may use an authorization/privacy server to enforce privacy policies. As an example and not by way of limitation, an entity to be resolved may be another user who specifies in his/her privacy settings that his/her identity should not be searchable on the online social network, and thus the entity resolution module 240 may not return that user's identifier in response to a request. Based on the information obtained from the social graph, knowledge graph, concept graph, and user profile, and subject to applicable privacy policies, the entity resolution module 240 may therefore accurately resolve the entities associated with the user input in a personalized and context-aware manner. In particular embodiments, each of the resolved entities may be associated with one or more identifiers hosted by the social-networking system 160. As an example and not by way of limitation, an identifier may comprise a unique user identifier (ID). In particular embodiments, each of the resolved entities may be also associated with a confidence score. More information on resolving entities may be found in U.S. patent application Ser. No. 16/048,049, filed 27 Jul. 2018, and U.S. patent application Ser. No. 16/048,072, filed 27 Jul. 2018, each of which is incorporated by reference.

In particular embodiments, the dialog engine 235 may communicate with different agents based on the identified intent and domain, and the resolved entities. In particular embodiments, an agent may be an implementation that serves as a broker across a plurality of content providers for one domain. A content provider may be an entity responsible for carrying out an action associated with an intent or completing a task associated with the intent. As an example and not by way of limitation, multiple device-specific implementations (e.g., real-time calls for a client system 130 or a messaging application on the client system 130) may be handled internally by a single agent. Alternatively, these device-specific implementations may be handled by multiple agents associated with multiple domains. In particular embodiments, the agents may comprise first-party agents 250 and third-party agents 255. In particular embodiments, first-party agents 250 may comprise internal agents that are accessible and controllable by the assistant system 140 (e.g. agents associated with services provided by the online social network (Messenger, Instagram)). In particular embodiments, third-party agents 255 may comprise external agents that the assistant system 140 has no control over (e.g., music streams agents (Spotify), ticket sales agents (Ticketmaster)). The first-party agents 250 may be associated with first-party providers 260 that provide content objects and/or services hosted by the social-networking system 160. The third-party agents 255 may be associated with third-party providers 265 that provide content objects and/or services hosted by the third-party system 170.

In particular embodiments, the communication from the dialog engine 235 to the first-party agents 250 may comprise requesting particular content objects and/or services provided by the first-party providers 260. As a result, the first-party agents 250 may retrieve the requested content objects from the first-party providers 260 and/or execute tasks that command the first-party providers 260 to perform the requested services. In particular embodiments, the communication from the dialog engine 235 to the third-party agents 255 may comprise requesting particular content objects and/or services provided by the third-party providers 265. As a result, the third-party agents 255 may retrieve the requested content objects from the third-party providers 265 and/or execute tasks that command the third-party providers 265 to perform the requested services. The third-party agents 255 may access the privacy check module 245 to guarantee no privacy violations before interacting with the third-party providers 265. As an example and not by way of limitation, the user associated with the user input may specify in his/her privacy settings that his/her profile information is invisible to any third-party content providers. Therefore, when retrieving content objects associated with the user input from the third-party providers 265, the third-party agents 255 may complete the retrieval without revealing to the third-party providers 265 which user is requesting the content objects.

In particular embodiments, each of the first-party agents 250 or third-party agents 255 may be designated for a particular domain. As an example and not by way of limitation, the domain may comprise weather, transportation, music, etc. In particular embodiments, the assistant system 140 may use a plurality of agents collaboratively to respond to a user input. As an example and not by way of limitation, the user input may comprise "direct me to my next meeting." The assistant system 140 may use a calendar agent to retrieve the location of the next meeting. The assistant system 140 may then use a navigation agent to direct the user to the next meeting.

In particular embodiments, each of the first-party agents 250 or third-party agents 255 may retrieve a user profile from the user context engine 225 to execute tasks in a personalized and context-aware manner. As an example and not by way of limitation, a user input may comprise "book me a ride to the airport." A transportation agent may execute the task of booking the ride. The transportation agent may retrieve the user profile of the user from the user context engine 225 before booking the ride. For example, the user profile may indicate that the user prefers taxis, so the transportation agent may book a taxi for the user. As another example, the contextual information associated with the user profile may indicate that the user is in a hurry so the transportation agent may book a ride from a ride-sharing service (e.g., Uber, Lyft) for the user since it may be faster to get a car from a ride-sharing service than a taxi company. In particular embodiment, each of the first-party agents 250 or third-party agents 255 may take into account other factors when executing tasks. As an example and not by way of limitation, other factors may comprise price, rating, efficiency, partnerships with the online social network, etc.

In particular embodiments, the dialog engine 235 may communicate with a conversational understanding composer (CU composer) 270. The dialog engine 235 may send the requested content objects and/or the statuses of the requested services to the CU composer 270. In particular embodiments, the dialog engine 235 may send the requested content objects and/or the statuses of the requested services as a <k, c, u, d> tuple, in which k indicates a knowledge source, c indicates a communicative goal, u indicates a user model, and d indicates a discourse model. In particular embodiments, the CU composer 270 may comprise a natural-language generator (NLG) 271 and a user interface (UI) payload generator 272. The natural-language generator 271 may generate a communication content based on the output of the dialog engine 235. In particular embodiments, the NLG 271 may comprise a content determination component, a sentence planner, and a surface realization component. The content determination component may determine the communication content based on the knowledge source, communicative goal, and the user's expectations. As an example and not by way of limitation, the determining may be based on a description logic. The description logic may comprise, for example, three fundamental notions which are individuals (representing objects in the domain), concepts (describing sets of individuals), and roles (representing binary relations between individuals or concepts). The description logic may be characterized by a set of constructors that allow the natural-language generator 271 to build complex concepts/roles from atomic ones. In particular embodiments, the content determination component may perform the following tasks to determine the communication content. The first task may comprise a translation task, in which the input to the natural-language generator 271 may be translated to concepts. The second task may comprise a selection task, in which relevant concepts may be selected among those resulted from the translation task based on the user model. The third task may comprise a verification task, in which the coherence of the selected concepts may be verified. The fourth task may comprise an instantiation task, in which the verified concepts may be instantiated as an executable file that can be processed by the natural-language generator 271. The sentence planner may determine the organization of the communication content to make it human understandable. The surface realization component may determine specific words to use, the sequence of the sentences, and the style of the communication content. The UI payload generator 272 may determine a preferred modality of the communication content to be presented to the user. In particular embodiments, the CU composer 270 may communicate with the privacy check module 245 to make sure the generation of the communication content follows the privacy policies. In particular embodiments, the CU composer 270 may retrieve a user profile from the user context engine 225 when generating the communication content and determining the modality of the communication content. As a result, the communication content may be more natural, personalized, and context-aware for the user. As an example and not by way of limitation, the user profile may indicate that the user likes short sentences in conversations so the generated communication content may be based on short sentences. As another example and not by way of limitation, the contextual information associated with the user profile may indicated that the user is using a device that only outputs audio signals so the UI payload generator 272 may determine the modality of the communication content as audio. More information on natural-language generation may be found in U.S. patent application Ser. No. 15/967,279, filed 30 Apr. 2018, and U.S. patent application Ser. No. 15/966,455, filed 30 Apr. 2018, each of which is incorporated by reference.

In particular embodiments, the CU composer 270 may send the generated communication content to the assistant xbot 215. In particular embodiments, the assistant xbot 215 may send the communication content to the messaging platform 205. The messaging platform 205 may further send the communication content to the client system 130 via the assistant application 136. In alternative embodiments, the assistant xbot 215 may send the communication content to a text-to-speech (TTS) module 275. The TTS module 275 may convert the communication content to an audio clip. The TTS module 275 may further send the audio clip to the client system 130 via the assistant application 136.

In particular embodiments, the assistant xbot 215 may interact with a proactive inference layer 280 without receiving a user input. The proactive inference layer 280 may infer user interests and preferences based on the user profile that is retrieved from the user context engine 225. In particular embodiments, the proactive inference layer 280 may further communicate with proactive agents 285 regarding the inference. The proactive agents 285 may execute proactive tasks based on the inference. As an example and not by way of limitation, the proactive tasks may comprise sending content objects or providing services to the user. In particular embodiments, each proactive task may be associated with an agenda item. The agenda item may comprise a recurring item such as a daily digest. The agenda item may also comprise a one-time item. In particular embodiments, a proactive agent 285 may retrieve the user profile from the user context engine 225 when executing the proactive task. Therefore, the proactive agent 285 may execute the proactive task in a personalized and context-aware manner. As an example and not by way of limitation, the proactive inference layer may infer that the user likes the band Maroon 5 and the proactive agent 285 may generate a recommendation of Maroon 5's new song/album to the user.

In particular embodiments, the proactive agent 285 may generate candidate entities associated with the proactive task based on a user profile. The generation may be based on a straightforward backend query using deterministic filters to retrieve the candidate entities from a structured data store. The generation may be alternatively based on a machine-learning model that is trained based on the user profile, entity attributes, and relevance between users and entities. As an example and not by way of limitation, the machine-learning model may be based on support vector machines (SVM). As another example and not by way of limitation, the machine-learning model may be based on a regression model. As another example and not by way of limitation, the machine-learning model may be based on a deep convolutional neural network (DCNN). In particular embodiments, the proactive agent 285 may also rank the generated candidate entities based on the user profile and the content associated with the candidate entities. The ranking may be based on the similarities between a user's interests and the candidate entities. As an example and not by way of limitation, the assistant system 140 may generate a feature vector representing a user's interest and feature vectors representing the candidate entities. The assistant system 140 may then calculate similarity scores (e.g., based on cosine similarity) between the feature vector representing the user's interest and the feature vectors representing the candidate entities. The ranking may be alternatively based on a ranking model that is trained based on user feedback data.

In particular embodiments, the proactive task may comprise recommending the candidate entities to a user. The proactive agent 285 may schedule the recommendation, thereby associating a recommendation time with the recommended candidate entities. The recommended candidate entities may be also associated with a priority and an expiration time. In particular embodiments, the recommended candidate entities may be sent to a proactive scheduler. The proactive scheduler may determine an actual time to send the recommended candidate entities to the user based on the priority associated with the task and other relevant factors (e.g., clicks and impressions of the recommended candidate entities). In particular embodiments, the proactive scheduler may then send the recommended candidate entities with the determined actual time to an asynchronous tier. The asynchronous tier may temporarily store the recommended candidate entities as a job. In particular embodiments, the asynchronous tier may send the job to the dialog engine 235 at the determined actual time for execution. In alternative embodiments, the asynchronous tier may execute the job by sending it to other surfaces (e.g., other notification services associated with the social-networking system 160). In particular embodiments, the dialog engine 235 may identify the dialog intent, state, and history associated with the user. Based on the dialog intent, the dialog engine 235 may select some candidate entities among the recommended candidate entities to send to the client system 130. In particular embodiments, the dialog state and history may indicate if the user is engaged in an ongoing conversation with the assistant xbot 215. If the user is engaged in an ongoing conversation and the priority of the task of recommendation is low, the dialog engine 235 may communicate with the proactive scheduler to reschedule a time to send the selected candidate entities to the client system 130. If the user is engaged in an ongoing conversation and the priority of the task of recommendation is high, the dialog engine 235 may initiate a new dialog session with the user in which the selected candidate entities may be presented. As a result, the interruption of the ongoing conversation may be prevented. When it is determined that sending the selected candidate entities is not interruptive to the user, the dialog engine 235 may send the selected candidate entities to the CU composer 270 to generate a personalized and context-aware communication content comprising the selected candidate entities, subject to the user's privacy settings. In particular embodiments, the CU composer 270 may send the communication content to the assistant xbot 215 which may then send it to the client system 130 via the messaging platform 205 or the TTS module 275. More information on proactively assisting users may be found in U.S. patent application Ser. No. 15/967,193, filed 30 Apr. 2018, and U.S. patent application Ser. No. 16/036,827, filed 16 Jul. 2018, each of which is incorporated by reference.

In particular embodiments, the assistant xbot 215 may communicate with a proactive agent 285 in response to a user input. As an example and not by way of limitation, the user may ask the assistant xbot 215 to set up a reminder. The assistant xbot 215 may request a proactive agent 285 to set up such reminder and the proactive agent 285 may proactively execute the task of reminding the user at a later time.

In particular embodiments, the assistant system 140 may comprise a summarizer 290. The summarizer 290 may provide customized news feed summaries to a user. In particular embodiments, the summarizer 290 may comprise a plurality of meta agents. The plurality of meta agents may use the first-party agents 250, third-party agents 255, or proactive agents 285 to generated news feed summaries. In particular embodiments, the summarizer 290 may retrieve user interests and preferences from the proactive inference layer 280. The summarizer 290 may then retrieve entities associated with the user interests and preferences from the entity resolution module 240. The summarizer 290 may further retrieve a user profile from the user context engine 225. Based on the information from the proactive inference layer 280, the entity resolution module 240, and the user context engine 225, the summarizer 290 may generate personalized and context-aware summaries for the user. In particular embodiments, the summarizer 290 may send the summaries to the CU composer 270. The CU composer 270 may process the summaries and send the processing results to the assistant xbot 215. The assistant xbot 215 may then send the processed summaries to the client system 130 via the messaging platform 205 or the TTS module 275. More information on summarization may be found in U.S. patent application Ser. No. 15/967,290, filed 30 Apr. 2018, which is incorporated by reference.

Figure 3:
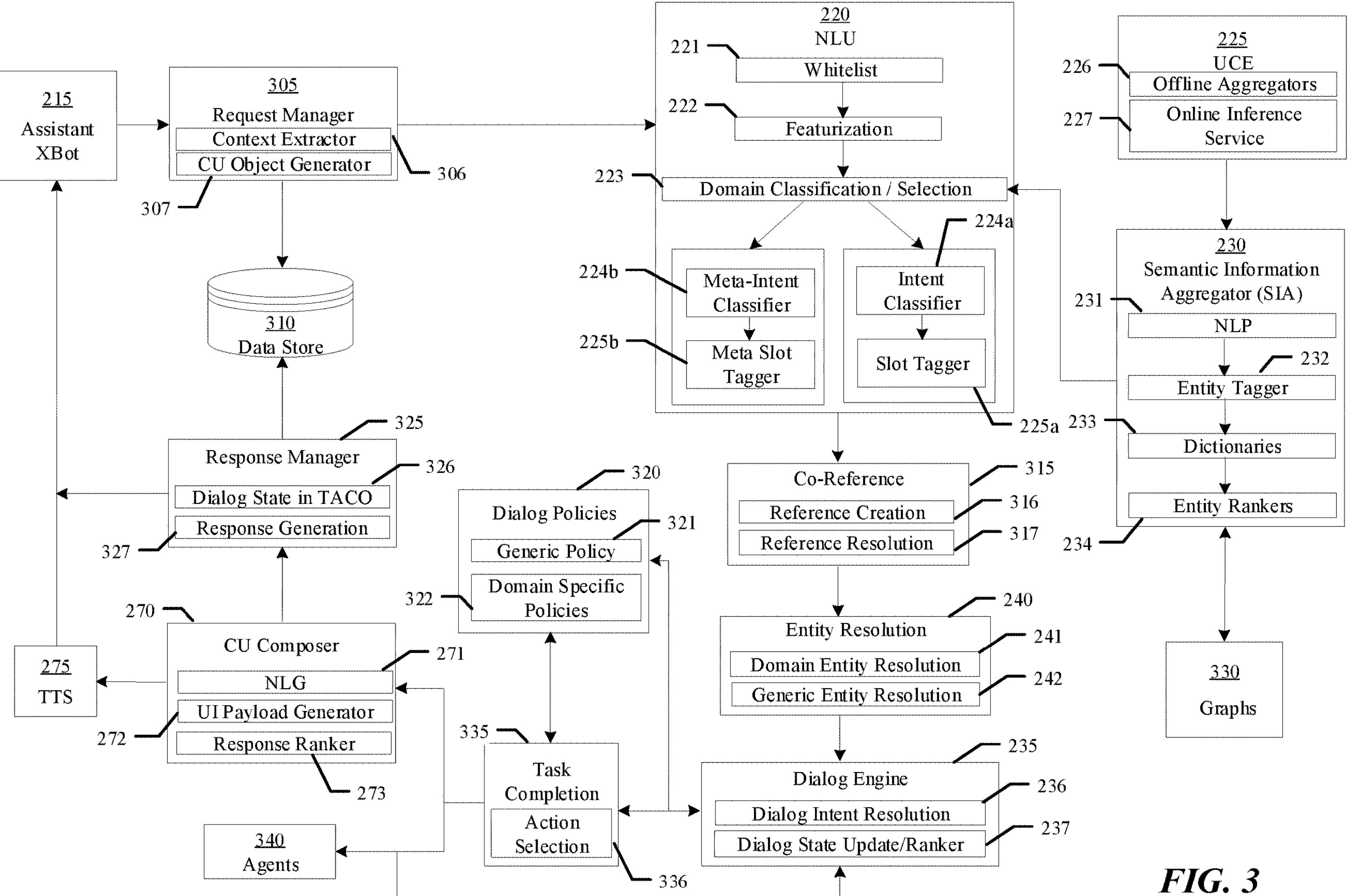
FIG. 3 illustrates an example diagram flow of responding to a user request by the assistant system.

FIG. 3 illustrates an example diagram flow 300 of responding to a user request by the assistant system 140. In particular embodiments, the assistant xbot 215 may access a request manager 305 upon receiving the user request. The request manager 305 may comprise a context extractor 306 and a conversational understanding object generator (CU object generator) 307. The context extractor 306 may extract contextual information associated with the user request. The context extractor 306 may also update contextual information based on the assistant application 136 executing on the client system 130. As an example and not by way of limitation, the update of contextual information may comprise content items are displayed on the client system 130. As another example and not by way of limitation, the update of contextual information may comprise alarm is set on the client system 130. As another example and not by way of limitation, the update of contextual information may comprise a song is playing on the client system 130. The CU object generator 307 may generate particular content objects relevant to the user request. The content objects may comprise dialog-session data and features associated with the user request, which may be shared with all the modules of the assistant system 140. In particular embodiments, the request manager 305 may store the contextual information and the generated content objects in data store 310 which is a particular data store implemented in the assistant system 140.

In particular embodiments, the request manger 305 may send the generated content objects to the NLU module 220. The NLU module 220 may perform a plurality of steps to process the content objects. At step 221, the NLU module 220 may generate a whitelist for the content objects. In particular embodiments, the whitelist may comprise interpretation data matching the user request. At step 222, the NLU module 220 may perform a featurization based on the whitelist. At step 223, the NLU module 220 may perform domain classification/selection on user request based on the features resulted from the featurization to classify the user request into predefined domains. The domain classification/selection results may be further processed based on two related procedures. At step **224*a*, the NLU module 220 may process the domain classification/selection result using an intent classifier. The intent classifier may determine the user's intent associated with the user request. In particular embodiments, there may be one intent classifier for each domain to determine the most possible intents in a given domain. As an example and not by way of limitation, the intent classifier may be based on a machine-learning model that may take the domain classification/selection result as input and calculate a probability of the input being associated with a particular predefined intent. At step 224***b*, the NLU module may process the domain classification/selection result using a meta-intent classifier. The meta-intent classifier may determine categories that describe the user's intent. In particular embodiments, intents that are common to multiple domains may be processed by the meta-intent classifier. As an example and not by way of limitation, the meta-intent classifier may be based on a machine-learning model that may take the domain classification/selection result as input and calculate a probability of the input being associated with a particular predefined meta-intent. At step 225*a*, the NLU module 220 may use a slot tagger to annotate one or more slots associated with the user request. In particular embodiments, the slot tagger may annotate the one or more slots for the n-grams of the user request. At step 225*b*, the NLU module 220 may use a meta slot tagger to annotate one or more slots for the classification result from the meta-intent classifier. In particular embodiments, the meta slot tagger may tag generic slots such as references to items (e.g., the first), the type of slot, the value of the slot, etc. As an example and not by way of limitation, a user request may comprise "change 500 dollars in my account to Japanese yen." The intent classifier may take the user request as input and formulate it into a vector. The intent classifier may then calculate probabilities of the user request being associated with different predefined intents based on a vector comparison between the vector representing the user request and the vectors representing different predefined intents. In a similar manner, the slot tagger may take the user request as input and formulate each word into a vector. The intent classifier may then calculate probabilities of each word being associated with different predefined slots based on a vector comparison between the vector representing the word and the vectors representing different predefined slots. The intent of the user may be classified as "changing money". The slots of the user request may comprise "500", "dollars", "account", and "Japanese yen". The meta-intent of the user may be classified as "financial service". The meta slot may comprise "finance".

In particular embodiments, the NLU module 220 may improve the domain classification/selection of the content objects by extracting semantic information from the semantic information aggregator 230. In particular embodiments, the semantic information aggregator 230 may aggregate semantic information in the following way. The semantic information aggregator 230 may first retrieve information from the user context engine 225. In particular embodiments, the user context engine 225 may comprise offline aggregators 226 and an online inference service 227. The offline aggregators 226 may process a plurality of data associated with the user that are collected from a prior time window. As an example and not by way of limitation, the data may include news feed posts/comments, interactions with news feed posts/comments, Instagram posts/comments, search history, etc. that are collected from a prior 90-day window. The processing result may be stored in the user context engine 225 as part of the user profile. The online inference service 227 may analyze the conversational data associated with the user that are received by the assistant system 140 at a current time. The analysis result may be stored in the user context engine 225 also as part of the user profile. In particular embodiments, both the offline aggregators 226 and online inference service 227 may extract personalization features from the plurality of data. The extracted personalization features may be used by other modules of the assistant system 140 to better understand user input. In particular embodiments, the semantic information aggregator 230 may then process the retrieved information, i.e., a user profile, from the user context engine 225 in the following steps. At step 231, the semantic information aggregator 230 may process the retrieved information from the user context engine 225 based on natural-language processing (NLP). In particular embodiments, the semantic information aggregator 230 may tokenize text by text normalization, extract syntax features from text, and extract semantic features from text based on NLP. The semantic information aggregator 230 may additionally extract features from contextual information, which is accessed from dialog history between a user and the assistant system 140. The semantic information aggregator 230 may further conduct global word embedding, domain-specific embedding, and/or dynamic embedding based on the contextual information. At step 232, the processing result may be annotated with entities by an entity tagger. Based on the annotations, the semantic information aggregator 230 may generate dictionaries for the retrieved information at step 233. In particular embodiments, the dictionaries may comprise global dictionary features which can be updated dynamically offline. At step 234, the semantic information aggregator 230 may rank the entities tagged by the entity tagger. In particular embodiments, the semantic information aggregator 230 may communicate with different graphs 330 including social graph, knowledge graph, and concept graph to extract ontology data that is relevant to the retrieved information from the user context engine 225. In particular embodiments, the semantic information aggregator 230 may aggregate the user profile, the ranked entities, and the information from the graphs 330. The semantic information aggregator 230 may then send the aggregated information to the NLU module 220 to facilitate the domain classification/selection.

In particular embodiments, the output of the NLU module 220 may be sent to a co-reference module 315 to interpret references of the content objects associated with the user request. In particular embodiments, the co-reference module 315 may be used to identify an item to which the user request refers. The co-reference module 315 may comprise reference creation 316 and reference resolution 317. In particular embodiments, the reference creation 316 may create references for entities determined by the NLU module 220. The reference resolution 317 may resolve these references accurately. As an example and not by way of limitation, a user request may comprise "find me the nearest Walmart and direct me there". The co-reference module 315 may interpret "there" as "the nearest Walmart". In particular embodiments, the co-reference module 315 may access the user context engine 225 and the dialog engine 235 when necessary to interpret references with improved accuracy.

In particular embodiments, the identified domains, intents, meta-intents, slots, and meta slots, along with the resolved references may be sent to the entity resolution module 240 to resolve relevant entities. The entity resolution module 240 may execute generic and domain-specific entity resolution. In particular embodiments, the entity resolution module 240 may comprise domain entity resolution 241 and generic entity resolution 242. The domain entity resolution 241 may resolve the entities by categorizing the slots and meta slots into different domains. In particular embodiments, entities may be resolved based on the ontology data extracted from the graphs 330. The ontology data may comprise the structural relationship between different slots/ meta-slots and domains. The ontology may also comprise information of how the slots/meta-slots may be grouped, related within a hierarchy where the higher level comprises the domain, and subdivided according to similarities and differences. The generic entity resolution 242 may resolve the entities by categorizing the slots and meta slots into different generic topics. In particular embodiments, the resolving may be also based on the ontology data extracted from the graphs 330. The ontology data may comprise the structural relationship between different slots/meta-slots and generic topics. The ontology may also comprise information of how the slots/meta-slots may be grouped, related within a hierarchy where the higher level comprises the topic, and subdivided according to similarities and differences. As an example and not by way of limitation, in response to the input of an inquiry of the advantages of a Tesla car, the generic entity resolution 242 may resolve a Tesla car as vehicle and the domain entity resolution 241 may resolve the Tesla car as electric car.

In particular embodiments, the output of the entity resolution module 240 may be sent to the dialog engine 235 to forward the flow of the conversation with the user. The dialog engine 235 may comprise dialog intent resolution 236 and dialog state update/ranker 237. In particular embodiments, the dialog intent resolution 236 may resolve the user intent associated with the current dialog session based on dialog history between the user and the assistant system 140. The dialog intent resolution 236 may map intents determined by the NLU module 220 to different dialog intents. The dialog intent resolution 236 may further rank dialog intents based on signals from the NLU module 220, the entity resolution module 240, and dialog history between the user and the assistant system 140. In particular embodiments, the dialog state update/ranker 237 may update/rank the dialog state of the current dialog session. As an example and not by way of limitation, the dialog state update/ranker 237 may update the dialog state as "completed" if the dialog session is over. As another example and not by way of limitation, the dialog state update/ranker 237 may rank the dialog state based on a priority associated with it.

In particular embodiments, the dialog engine 235 may communicate with a task completion module 335 about the dialog intent and associated content objects. In particular embodiments, the task completion module 335 may rank different dialog hypotheses for different dialog intents. The task completion module 335 may comprise an action selection component 336. In particular embodiments, the dialog engine 235 may additionally check against dialog policies 320 regarding the dialog state. In particular embodiments, a dialog policy 320 may comprise a data structure that describes an execution plan of an action by an agent 340. An agent 340 may select among registered content providers to complete the action. The data structure may be constructed by the dialog engine 235 based on an intent and one or more slots associated with the intent. A dialog policy 320 may further comprise multiple goals related to each other through logical operators. In particular embodiments, a goal may be an outcome of a portion of the dialog policy and it may be constructed by the dialog engine 235. A goal may be represented by an identifier (e.g., string) with one or more named arguments, which parameterize the goal. As an example and not by way of limitation, a goal with its associated goal argument may be represented as {confirm artist, args:{artist: "Madonna"}}. In particular embodiments, a dialog policy may be based on a tree-structured representation, in which goals are mapped to leaves of the tree. In particular embodiments, the dialog engine 235 may execute a dialog policy 320 to determine the next action to carry out. The dialog policies 320 may comprise generic policy 321 and domain specific policies 322, both of which may guide how to select the next system action based on the dialog state. In particular embodiments, the task completion module 335 may communicate with dialog policies 320 to obtain the guidance of the next system action. In particular embodiments, the action selection component 336 may therefore select an action based on the dialog intent, the associated content objects, and the guidance from dialog policies 320.

In particular embodiments, the output of the task completion module 335 may be sent to the CU composer 270. In alternative embodiments, the selected action may require one or more agents 340 to be involved. As a result, the task completion module 335 may inform the agents 340 about the selected action. Meanwhile, the dialog engine 235 may receive an instruction to update the dialog state. As an example and not by way of limitation, the update may comprise awaiting agents' response. In particular embodiments, the CU composer 270 may generate a communication content for the user using the NLG 271 based on the output of the task completion module 335. In particular embodiments, the NLG 271 may use different language models and/or language templates to generate natural language outputs. The generation of natural language outputs may be application specific. The generation of natural language outputs may be also personalized for each user. The CU composer 270 may also determine a modality of the generated communication content using the UI payload generator 272. Since the generated communication content may be considered as a response to the user request, the CU composer 270 may additionally rank the generated communication content using a response ranker 273. As an example and not by way of limitation, the ranking may indicate the priority of the response.

In particular embodiments, the output of the CU composer 270 may be sent to a response manager 325. The response manager 325 may perform different tasks including storing/updating the dialog state 326 retrieved from data store 310 and generating responses 327. In particular embodiments, the output of CU composer 270 may comprise one or more of natural-language strings, speech, actions with parameters, or rendered images or videos that can be displayed in a VR headset or AR smart glass or on an assistant device. As a result, the response manager 325 may determine what tasks to perform based on the output of CU composer 270. In particular embodiments, the generated response and the communication content may be sent to the assistant xbot 215. In alternative embodiments, the output of the CU composer 270 may be additionally sent to the TTS module 275 if the determined modality of the communication content is audio. The speech generated by the TTS module 275 and the response generated by the response manager 325 may be then sent to the assistant xbot 215.

Dialog State Tracking for Assistant Systems

In particular embodiments, the assistant system 140 may track the dialog state and perform updates to the dialog state through the application of functions that encode the update to the dialog states. During typical interactions (e.g., conversations), either between (i) a person and the assistant system 140 or (ii) multiple people with the assistant system 140 as a bystander or active participant, the assistant system 140 may track the interactions using dialog states. In particular embodiments, the dialog state may comprise one or more intents and one or more slots. As an example and not by way of limitation, during a conversation between a user and the assistant system 140, if a user asks "What is the weather today?" the assistant system 140 may determine the dialog state as comprising the intent [IN:get_weather("location")] and slot [SL:location("current location")]. After determining these as the most likely intended intents and slots, a query may be generated and executed by the assistant system 140 with respect to the current dialog state (i.e., querying weather information for a current geographic location associated with the querying user). Prior to executing a query, there may be ambiguity and uncertainty that may be due to input errors and natural uncertainty inherent in language and other input modalities. As an example and not by way of limitation, a user input may include noise (e.g., typos in a text input, background noise in an audio input), the input may include grammatical errors or colloquialisms, or the input may reference unknown or ambiguous terms. These errors and uncertainties may cause the the assistant system 140 to misinterpret or misidentify what was said in an input. In particular embodiments, the assistant architecture may comprise a dialog state tracking module and an action selector that are coupled together in such a way that the dialog manager may be retrained from scratch to test alternative uncertainty representations. In addition, in particular embodiments, the assistant architecture may make switching between alternative dialog state tracking implementations technologically challenging at runtime. As such, in particular embodiments, an improved assistant architecture may help improve the assistant system's 140 ability to handle ambiguity and uncertainty. In particular embodiments, to handle the ambiguity and uncertainty associated with the user input, the assistant system 140 may generate multiple dialog state frames to contain different dialog states (e.g., different combinations of intents and slots) that may be applied to the current dialog state. In particular embodiments, the dialog state frames may correspond to various hypothesis dialog states. In particular embodiments, the assistant system 140 may also generate a various functions to change or update the dialog states. After generation of these functions, the assistant system 140 may continue to track the dialog state and generate a subsequent set of functions to be applied to the previous round of generated functions, thus creating a hierarchical set of functions from an initial dialog state. In particular embodiments, the hierarchical set of functions may be a function tree. In particular embodiments, after determining when to apply one or more generated functions, the assistant system 140 may apply the functions and perform a system action (e.g., execute query, perform an action, etc.). Although this disclosure describes tracking the dialog state and performing updates to the dialog state in a particular manner, this disclosure contemplates tracking the dialog state and performing updates to the dialog state in any suitable manner.

In particular embodiments, the assistant system 140 may receive an input from a message thread. The assistant system 140 may be a participant in a message thread. In particular embodiments, the message thread may be a multi-turn message thread. The message thread may be a single user conversing with the assistant system 140 or a group message where the assistant system 140 may be a participant or bystander. In particular embodiments, the assistant system 140 may track the dialog state of the conversation as the message thread receives further inputs. As an example and not by way of limitation, the assistant system 140 may update the dialog state when a new input is received from the message thread. In particular embodiments, the input may be received from different modalities. As an example and not by way of limitation, the input may be a text input into a group message in a messaging service. As another example and not by way of limitation, the input may be an audio input received from a group call between multiple users. In particular embodiments, the reception of inputs may be based on privacy settings of users in the message thread/conversation. As an example and not by way of limitation, the reception of inputs may require each user to allow the assistant system 140 to participant in the message thread/conversation. Although this disclosure describes receiving an input from a message thread in a particular manner, this disclosure contemplates receiving an input from a message thread in any suitable manner.

In particular embodiments, the assistant system 140 may parse the input to identify a plurality of hypothesis dialog states associated with the input. As an example and not by way of limitation, if the assistant system 140 receives the input, "News on Giants" in message thread between the user and the assistant system 140, then the assistant system 140 may parse the input to identify that a user may have requested latest headlines on Giants or the score of the latest game with the Giants. In particular embodiments, the assistant system 140 may parse the input to identify one or more intents and one or more slots that are associated with a hypothesis dialog state. As an example and not by way of limitation, the input "News on Giants" may have the intent [IN:query ("news")] and slot [SL:entity("Giants")] associated with one hypothesis dialog state and the intent [IN:query("latest score")] and slot [SL:entity("Giants")] for another hypothesis dialog state. In particular embodiments, the assistant system 140 may identify any number of intents and slots associated with a hypothesis dialog state. In particular embodiments, the assistant system 140 may identify multiple intents and/or slots associated with a received input and the combinations of the multiple intents and/or slots may be used to identify the plurality of hypothesis dialog states. Although this disclosure describes parsing an input to identify a plurality of hypothesis dialog states in a particular manner, this disclosure contemplates parsing an input to identify a plurality of hypothesis dialog states in any suitable manner.

In particular embodiments, the assistant system 140 may generate a plurality of functions that correspond to the plurality of hypothesis dialog states. In particular embodiments, the assistant system 140 may begin with a prior dialog state. The prior dialog state may correspond to the last received input in the message thread. The last received input may or may not correspond to the current dialog state. In particular embodiments, the generated functions may be applied to the prior dialog state to approach the current dialog state. In particular embodiments, each function may comprise code to manipulate the dialog state. In particular embodiments, each function may be an operator to change or confirm a particular dialog state.

In particular embodiments, the functions may comprise one of (i) creating a dialog state representing a new task or skill, (ii) providing or updating the value of a task slot, (iii) mark a piece of information or slot grounded, (iv) repeat a previous action, or (v) clear the current dialog state to start a new task or skill. In particular embodiments, the assistant system 140 may use the identified intents and slots associated with hypothesis dialog states to generate the functions to apply to the prior dialog state. As an example and not by way of limitation, if an identified intent is [IN:get_weather ("location")] and an identified slot is [SL:location("current location")], the assistant system 140 may generate a function to create a new task representing a query of the weather in a current location for one hypothesis dialog state. In particular embodiments, the assistant system 140 may generate multiple functions for a received input. As an example and not by way of limitation, a function that provides or updates a value of a task slot may be a function that updates the location of a weather query to a user's work place location (e.g., if the user works far away from his or her work). As another example and not by way of limitation, a function to update a task value may be to change any ambiguous slots. For instance, if an input is "News on Giants" the assistant system 140 may generate one update function to update the value "Giants" to "San Francisco Giants" and generate another update function to update the value "Giants" to "New York Giants." As an example and not by way of limitation, a function to mark a piece of information or slot grounded may be generated to resolve any ambiguity. For instance, for the "Giants" example, once the assistant system 140 receives sufficient information that the user means "San Francisco Giants" then the assistant system 140 may generate a function to mark the information or slot as grounded so the information or slot does not change. As an example and not by way of limitation, a function to repeat a previous action may be generated if an input is the same as the previous input or if performing the previous action would yield different results at a later time. For instance, if a previous action was to query scores of a game in progress (e.g., football game, basketball game, etc.) then the assistant system 140 may generate a function to repeat the previous action to provide an updated value of the score. As an example and not by way of limitation, a function to clear the current dialog state may be used to restart the dialog state. For instance, if the assistant system 140 detects a complete change in subject in a conversation, a function to clear the dialog state may be created. Although this disclosure describes generating functions in a particular manner, this disclosure contemplates generating functions in any suitable manner.

In particular embodiments, the assistant system 140 may calculate a first plurality of probability scores for the first plurality of functions. In particular embodiments, the assistant system 140 may calculate the probability scores based on a prior dialog state associated with the message thread and a current user context. In particular embodiments, the probability score may represent a likelihood that the respective function is associated with an intended dialog state. As an example and not by way of limitation, the assistant system 140 may calculate a probability score based on a previous input from a message thread. This may be relevant for instance when the current dialog state relates to the previous dialog state. For example, if the previous dialog state relates to traveling to Ohio but the user lives in Indiana, then a query generated for weather in Columbus, Ohio may have a higher probability score than a query generated for weather in Columbus, Ind. Additionally, the assistant system 140 may use the current user context to calculate the probability score for a function, such as the user's location when an input was received. In particular embodiments, the user context may include one or more of date, time, location, and the like. In particular embodiments, the probability scores of each function may represent a probability space. Although this disclosure describes calculating a probability score in a particular manner, this disclosure contemplates calculating a probability score in any suitable manner.

In particular embodiments, the assistant system 140 may store the first plurality of functions if each of the probability scores is below a threshold probability score. In particular embodiments, the assistant system 140 may determine whether each function exceeds a threshold probability score. In particular embodiments, the assistant system 140 may store the first plurality of functions as a hierarchical set of function. In particular embodiments, the hierarchical set may be a function tree. The branches of the function tree may represent different pathways of hypothesis dialog states. As an example and not by way of limitation, if an input related to querying movie times, the assistant system 140 may generate function branches directed to different movies as the conversation (e.g., in a message thread) progresses and new details emerge. In particular embodiments, the assistant system 140 may use the hierarchical set of functions as a prior dialog state in the next input of a message thread. Since the assistant system 140 may be tracking the dialog state of a conversation (e.g., a group message, message thread), and each of the functions may represent a hypothesis dialog state, the assistant system may use the hierarchical set of functions as an input to generating further functions. Although this disclosure describes storing a plurality of functions in a particular manner, this disclosure contemplates storing a plurality of functions in any suitable manner.

In particular embodiments, the assistant system 140 may continue to track a conversation (e.g., a message thread) as further inputs are received in a message thread. The assistant system 140 may similarly parse and generate a second plurality of functions for each received input. In addition, the assistant system 140 may continue to generate further plurality of functions with each received subsequent input. In particular embodiments, the assistant system 140 may determine not to generate any functions for a received input if it does not change the dialog state. In particular embodiments, the second plurality of functions may be associated with one of the first plurality of functions. The association may be the functions are a part of a function branch. As an example and not by way of limitation, a hierarchical set of functions may have branches of functions. In particular embodiments, the assistant system 140 may determine to not generate a subsequent function for a function branch. As an example and not by way of limitation, if a function to update a slot does not make sense for one of the generated functions, the assistant system 140 may decide to not generate a function for that function branch. In particular embodiments, the assistant system 140 may also calculate probability scores for each of the generated functions. In particular embodiments, the probability scores may be based on the hierarchical set of functions and the current user context. The hierarchical set of functions may be used as an input. In particular embodiments, the assistant system 140 may store the second plurality of functions with the hierarchical set of functions as a new hierarchical set. As an example and not by way of limitation, if a hierarchical set is used as an input into function generation, the new functions may be attached to the function branches of the hierarchical set and the new hierarchical set may be stored. In particular embodiments, the assistant system 140 may continue to generate further functions to attach to the new hierarchical set. In particular embodiments, if a probability score of a function is below a threshold probability score, the assistant system 140 may discard the function. In particular embodiments, the assistant system 140 may apply any of the generated function to generate a current dialog state. The applied generated function may have a probability score above a threshold probability score. In particular embodiments, the assistant system 140 may rank any of the functions if their respective calculated probability scores exceed the threshold probability score. In particular embodiments, the assistant system 140 may select the function branch associated with the ranked functions based on their rankings to generate an action to be performed. As an example and not by way of limitation, if a first function in the function branch is to generate a query to search for "news on Giants" and the second function in the function branch is to update the slot value of "Giants" to "New York Giants," and the function branch scores above a threshold probability score and is ranked the highest, then the assistant system 140 may perform the query "news on New York Giants." The assistant system 140 may send the results of the query to the message thread. In particular embodiments, the assistant system 140 may resolve an entity related to a slot associated with a hypothesis dialog state. As an example and not by way of limitation, if an assistant system 140 generated multiple functions with an entity slot, the assistant system 140 may resolve the entity related to the slot when enough information is received. For instance, if a conversation discusses the "Giants" and further inputs contain "San Francisco Giants" then the assistant system 140 may resolve the entity as the "San Francisco Giants." In particular embodiments, the assistant system 140 may remove one or more functions as the conversation in a message thread progresses. In particular embodiments, the assistant system 140 may update probability scores for each function branch after subsequent inputs and collapse/remove function branches that fall below a threshold probability score.

FIGS. 4A-4E illustrate example diagram flows of a dialog manager 400 tracking a dialog state. In particular embodiments, the diagram flows shown in FIGS. 4A-4E may be variations of the diagram flow of FIG. 3. As an example and not by way of limitation, the diagram flow represented in FIGS. 4A-4E may represent one or more processes shown in FIG. 3. In particular embodiments, the dialog manager 400 may replace one or more of the components in FIG. 3. In particular embodiments, the dialog manager 400 may be embodied as the dialog engine 235 and task completion 335. As an example and not by way of limitation, the dialog manager 400 may perform the same processes as the dialog engine 235 and task completion 335 and receive the same inputs as the dialog engine 235.

Figure 4A:
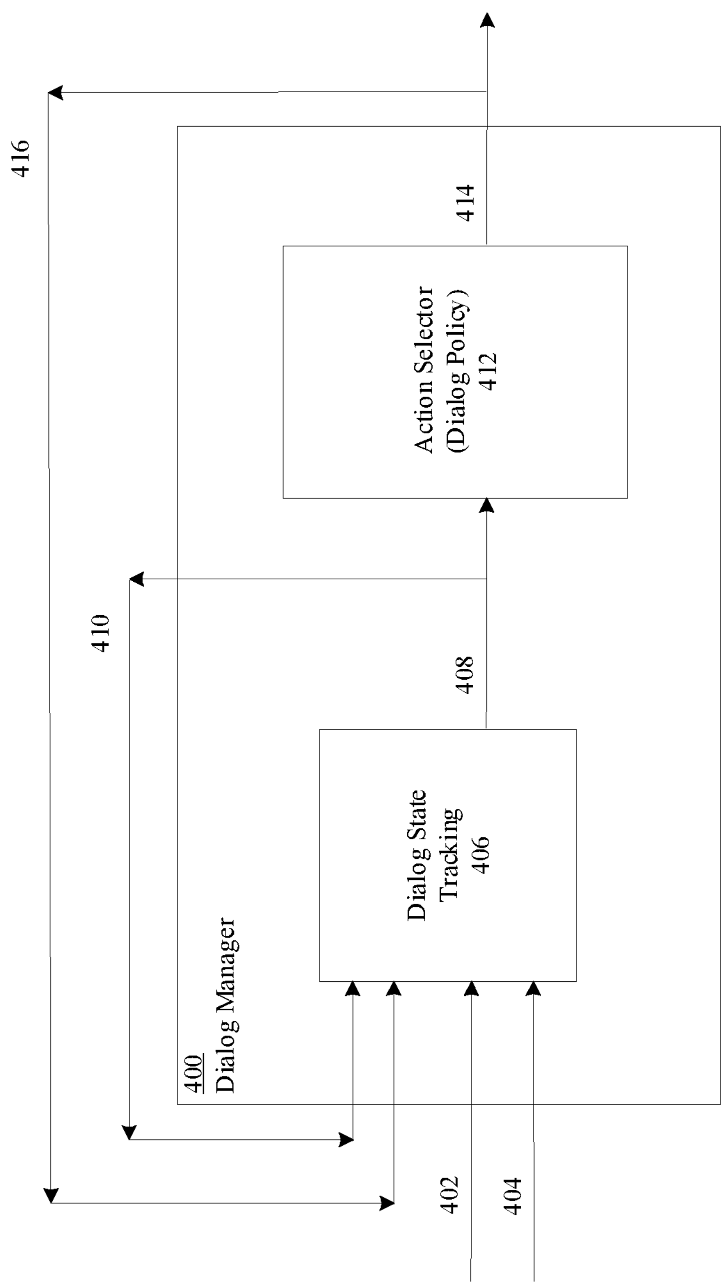
FIG. 4A illustrates an example diagram flow of a dialog manager tracking a dialog state.

Referring to FIG. 4A, an example diagram flow of a dialog manager 400 tracking a dialog state is shown. In particular embodiments, the dialog manager 400 may comprise a dialog state tracking module 406 and an action selector (dialog policy) 412. In particular embodiments, the dialog manager 400 may receive a recent user input or event 402. As an example and not by way of limitation, the recent user input 402 may be from a message thread the assistant system 140 is a participant in. As another example and not by way of limitation, there may be an event 402, such as a certain time of the day that may trigger a response (e.g., the user has set a reminder). In particular embodiments, the dialog manager 400 may receive context 404 from the environment or client system 130. As an example and not by way of limitation, the assistant system 140 may receive the current geographic location of the user. The inputs 402, 404 may be sent to dialog state tracking module 406, which may be processed and apply an update to the dialog state based on the received inputs 402, 404 and sends the updated dialog state 408 as a feedback of the previous turn dialog state 410 into the dialog state tracking module 406 as an input for future dialog state tracking and also to the action selector 412. In particular embodiments, the action selector 412 may generate an action 414 based on the updated dialog state 408 and send the previous turn system action 416 to the dialog state tracking module 406 as an input for future dialog state tracking. In particular embodiments, the generated action 414 may be sent on to other parts of the assistant system 140 to process and perform the action 414.

Figure 4B:
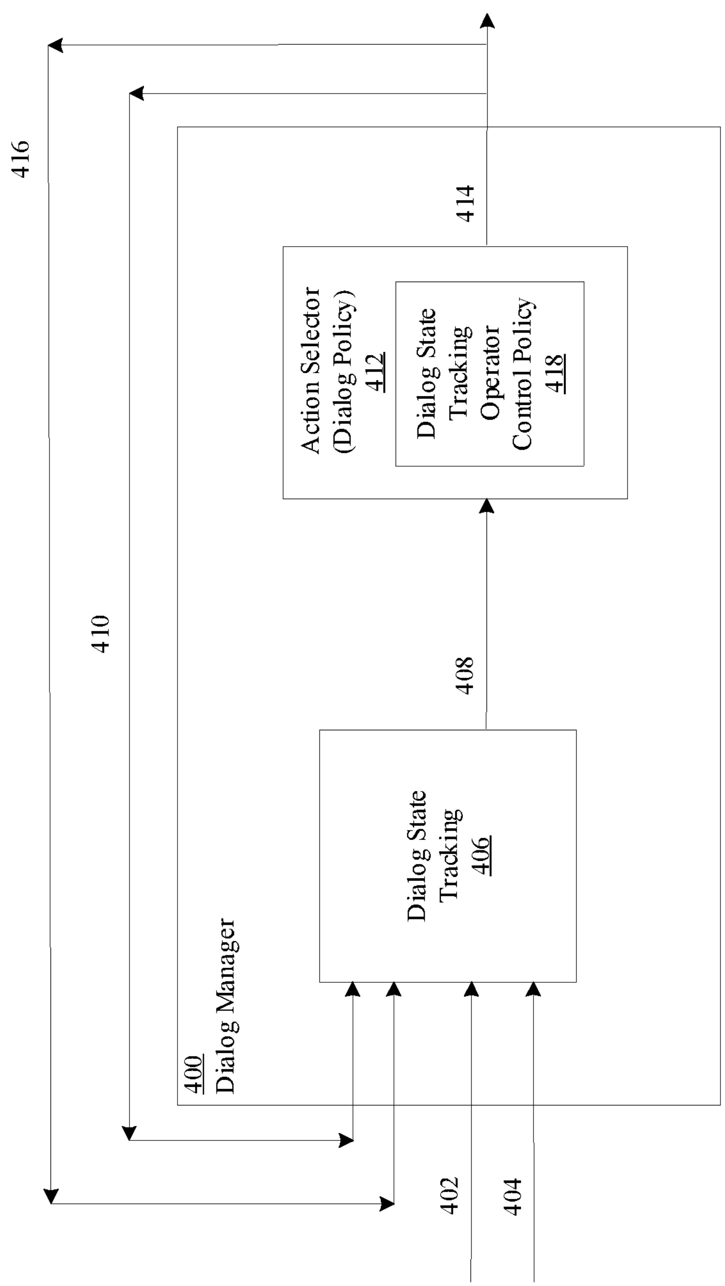
FIGS. 4B-4E illustrate another example diagram flow of a dialog manager tracking a dialog state.

FIG. 4B illustrates another example diagram flow of a dialog manager 400 tracking a dialog state. Similarly to FIG. 4B, the dialog manager 400 may receive the inputs 402, 404 into dialog state tracking module 406. In particular embodiments, the dialog state tracking module 406 may parse the input 402 to identify hypothesis dialog states and generate functions 408 or operators to apply to the dialog state to change or update the dialog state. In particular embodiments, the dialog state tracking module 406 may send the functions 408 to the action selector 412. In particular embodiments, the action selector 412 may comprise a dialog state tracking operator control policy 418. In particular embodiments, the dialog state tracking operator control policy 418 may decide when to apply any of the functions 408. In particular embodiments, the action selector 412 may generate an action 414 based on one of the functions 408 and send it to other parts of the assistant system 140 to process and perform the action 414. In particular embodiments, the action selector 412 may send the previous turn dialog state 410 to the dialog state tracking module 406. In particular embodiments, the previous turn dialog state 410 may comprise the last updated state and the unapplied functions. That is, the generated functions 408 that have not been applied are passed back to the dialog state tracking module 406. In particular embodiments, the action selector 412 may pass the previous turn system action 416 back to the dialog state tracking module 406. By receiving the previous turn system action 416 and the previous turn dialog state 410, the dialog state tracking module 406 may accurately track the dialog state in the event an action has been performed or the dialog state has not changed. In particular embodiments, the action selector 412 may calculate probability scores for each of the functions 408. In particular embodiments, the action selector 412 may determine whether one of the functions 408 exceeds a threshold probability score. If one of the functions 408 exceeds a threshold probability score, then the action selector 412 may generate the action 414. If none of the functions 408 exceed the threshold probability score, then the action selector 412 may send the previous turn dialog state to the dialog state tracking module 406.

Figure 4C:
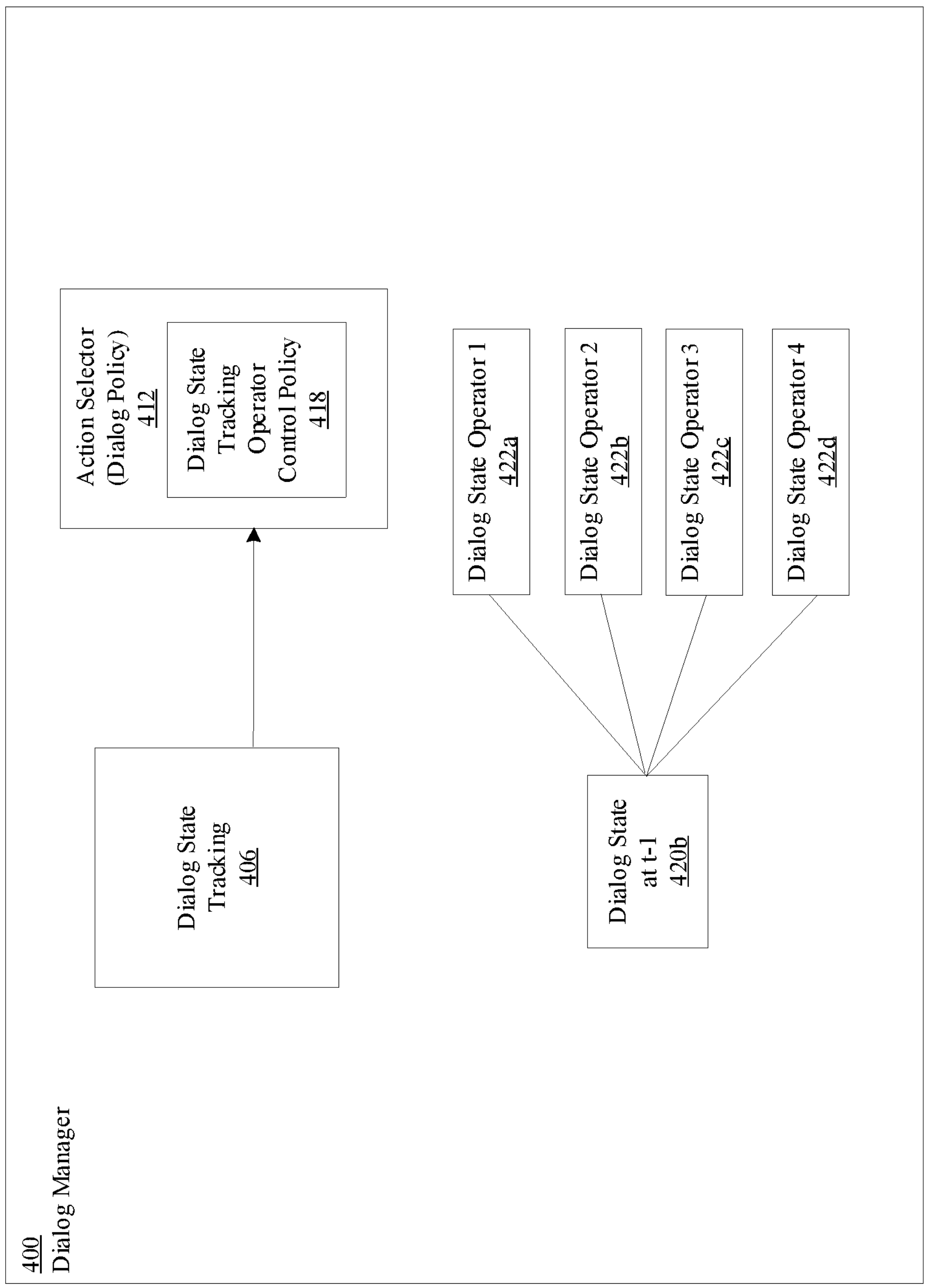

FIG. 4C illustrates an example diagram flow of generating operators 422 or functions during a dialog state tracking process. In particular embodiments, the dialog manager 400 may comprise the dialog state tracking module 406 and the action selector 412. In particular embodiments, the action selector 412 may comprise a dialog state tracking operator control policy 418. In particular embodiments, the dialog manager 400 may begin with the previous dialog state 420*b*, which is represented by dialog state at $t^{-1}$ 420*b*. As an example and not by way of limitation, the dialog state at $t^{-1}$ 420*b* may represent a previous input prior to the latest input in a conversation (e.g., a message thread or voice conversation). In particular embodiments, when the dialog manger 400 receives an input 402, the dialog state tracking module 406 may generate dialog state operators or functions 422 that correspond to hypothesis dialog states. In particular embodiments, the dialog state tracking module 406 may pass the operators 422 to the action selector 412. In particular embodiments, the dialog state tracking module 406 may generate a predetermined amount of dialog state operators 422. In particular embodiments, the dialog state tracking module 406 may generate any number of dialog state operators 422.

Figure 4D:
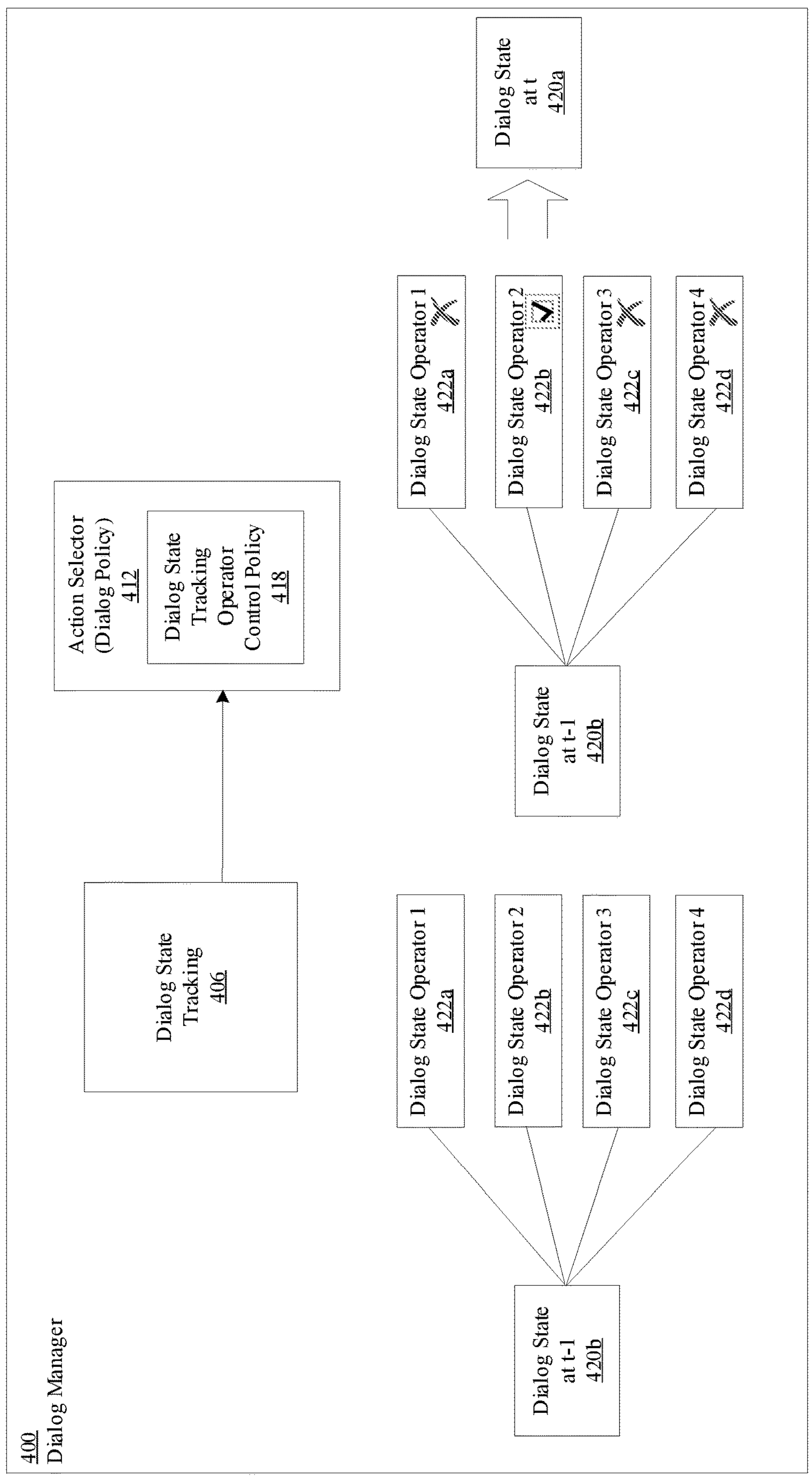

FIG. 4D illustrates an example diagram flow of applying operators 422 during a dialog state tracking process. In particular embodiments, after sending the operators 422 to action selector 412, the action selector 412 may calculate probability scores for each of the operators 422. The action selector 412 may calculate the probability scores using the dialog state tracking operator control policy 418 based on the previous dialog state and the current user context. In particular embodiments, if an operator 422 scores above a threshold probability score, the action selector 412 may apply the operator 422 to achieve the current dialog state 420*a*. In particular embodiments, the action selector 412 identified dialog state operator 2 422*b* as having a probability score above a threshold probability score and the other operators 422 having below the threshold probability score. As such, the action selector 412 applies operator 2 422*b* to obtain the dialog state at t 420*a*. In particular embodiments, the action selector 412 may generate an action 414 in response to the operator 422*b* having a probability score exceeding the threshold probability score.

Figure 4E:
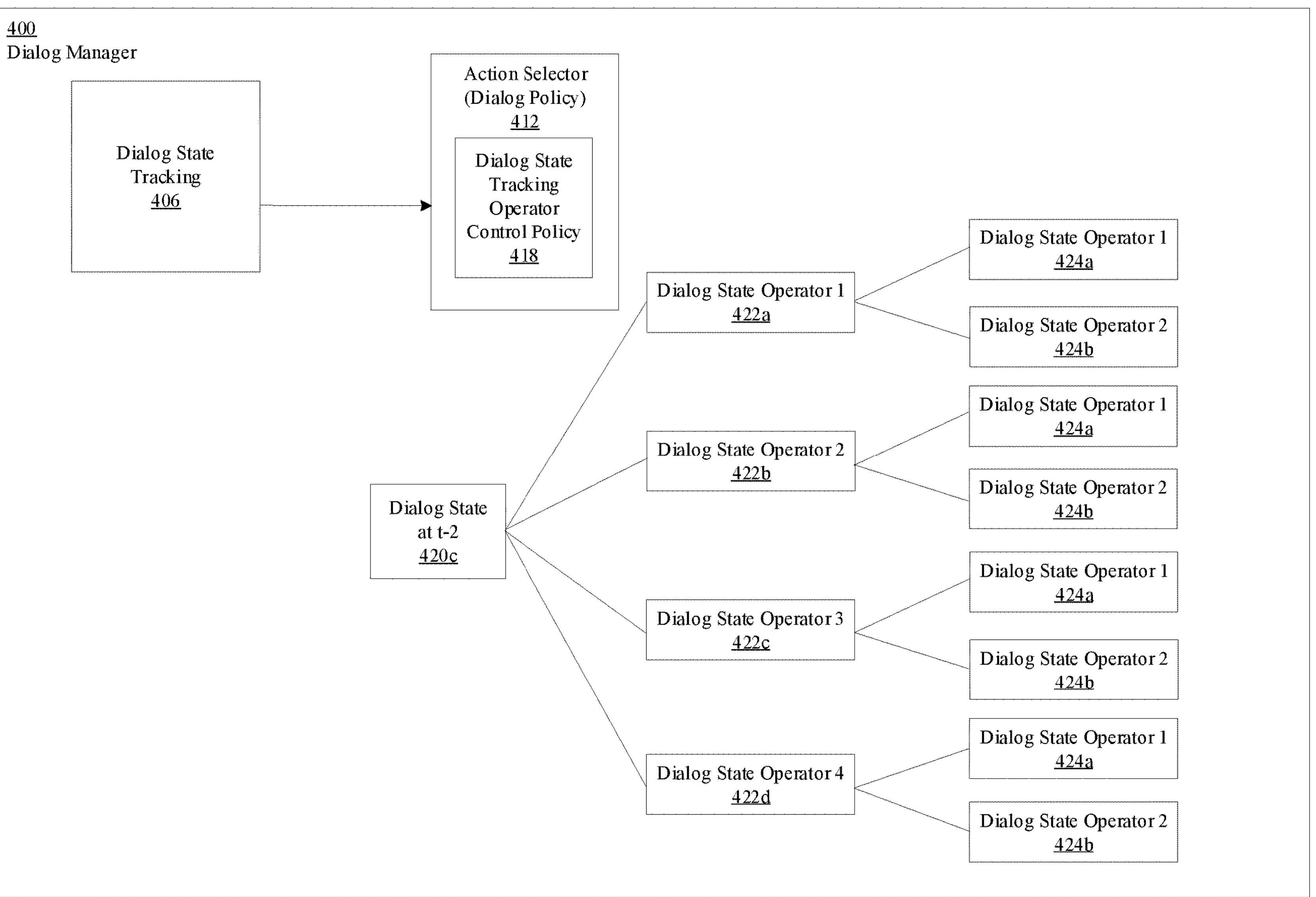

FIG. 4E illustrates an example diagram flow of tracking a dialog state. In particular embodiments, the dialog state tracking module 406 may previously have passed the operators 422 to the action selector 412. In particular embodiments, the dialog state tracking operator control policy 418 may determine that none of the operators 422 have above a threshold probability score. As such, the action selector 412 may pass the operators 422 back to the dialog state tracking module 406 to continue tracking the dialog state. When the dialog manager 400 receives a subsequent input, the dialog state tracking module 406 may use the previous operators 422 as an input to generate further operators 424. As an example and not by way of limitation, the dialog state operator 424 may be an update function to update a slot value for one of the dialog state operators 422. In particular embodiments, the dialog state tracking operator control policy 418 may calculate new probability scores based on the previous dialog state (which may include the operators 422) and the current context. In particular embodiments, any number of iterations of receiving an input and generating further functions may occur.

Figure 4F:
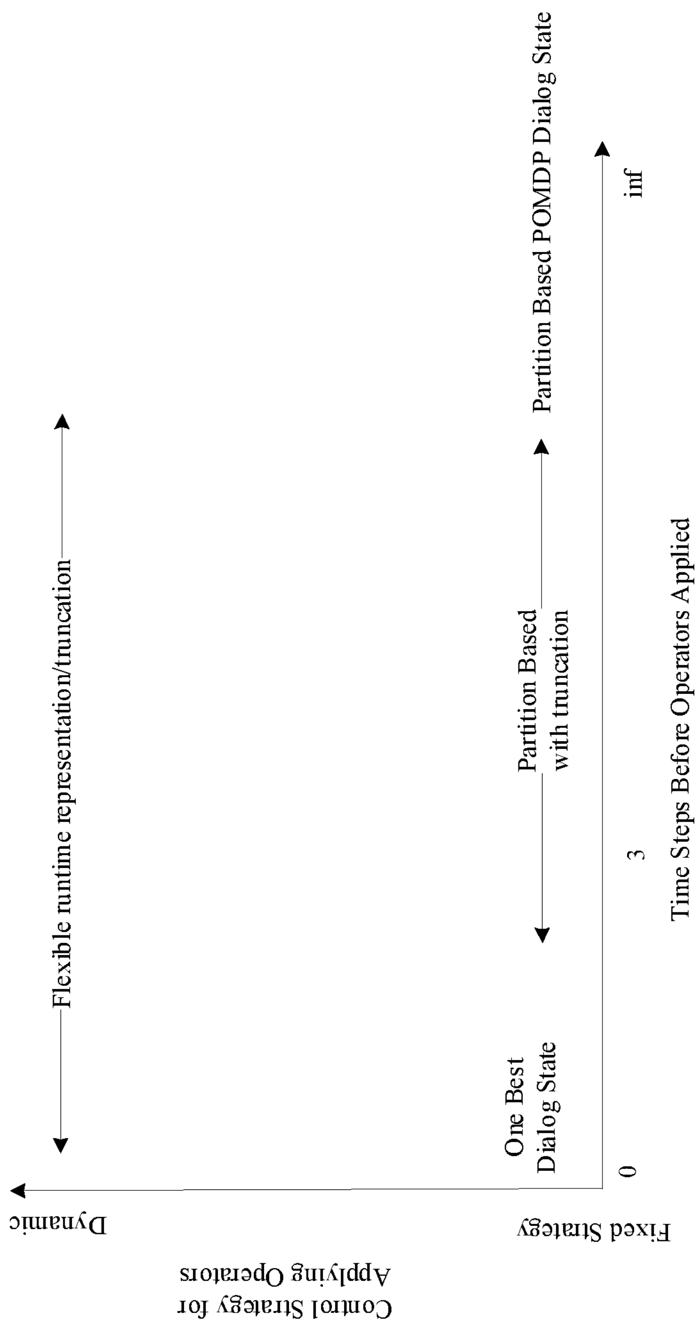
FIG. 4F illustrates an example chart of amount of generated dialog state tracking operators for dynamic uncertainty representation.

FIG. 4F is an example chart of different modes of dialog state tracking illustrating the possibility of dynamically changing the uncertainty representation through the use of operators. In particular embodiments, the chart may represent the amount of uncertainty in received inputs that the assistant system 140 tracks. As an example and not by way of limitation, the assistant system 140 may receive a user input, but the user may have mispronounced something or the assistant system 140 may not have accurately received the user input due to noise (e.g. loud sounds and the like). In order to reflect that uncertainty, the chart may show that with less time steps before operators are applied, the assistant system may commit sooner to a particular dialog state with a higher chance that it has excluded the intended dialog state. In particular embodiments, the assistant system 140 may dynamically adjust its control strategy (e.g., the number of generated operators before application). In particular embodiments, the reduction in time steps before operators are applied may improve the processing load of the assistant system 140 to reduce the number of operators carried to the next dialog state. In particular embodiments, by passing operators to the next round, the assistant system 140 may increase the likelihood that one of the function branches include the intended dialog state. In particular embodiments, the assistant system 140 may achieve a partition-based strategy presentation with uncertainty being truncated after a fixed period for a fixed strategy or retained for a flexible period with a dynamic strategy. In a particular embodiment, by varying the dialog state tracker control policy 418 strategy and types of operators, different approaches to dialog state tracking may be emulated. In a particular embodiment these different approaches to dialog state tracking may be switched between dynamically, for example, and not as a limiting example, in the midst of tracking a conversation with a user or multiple users.

Figure 5A:
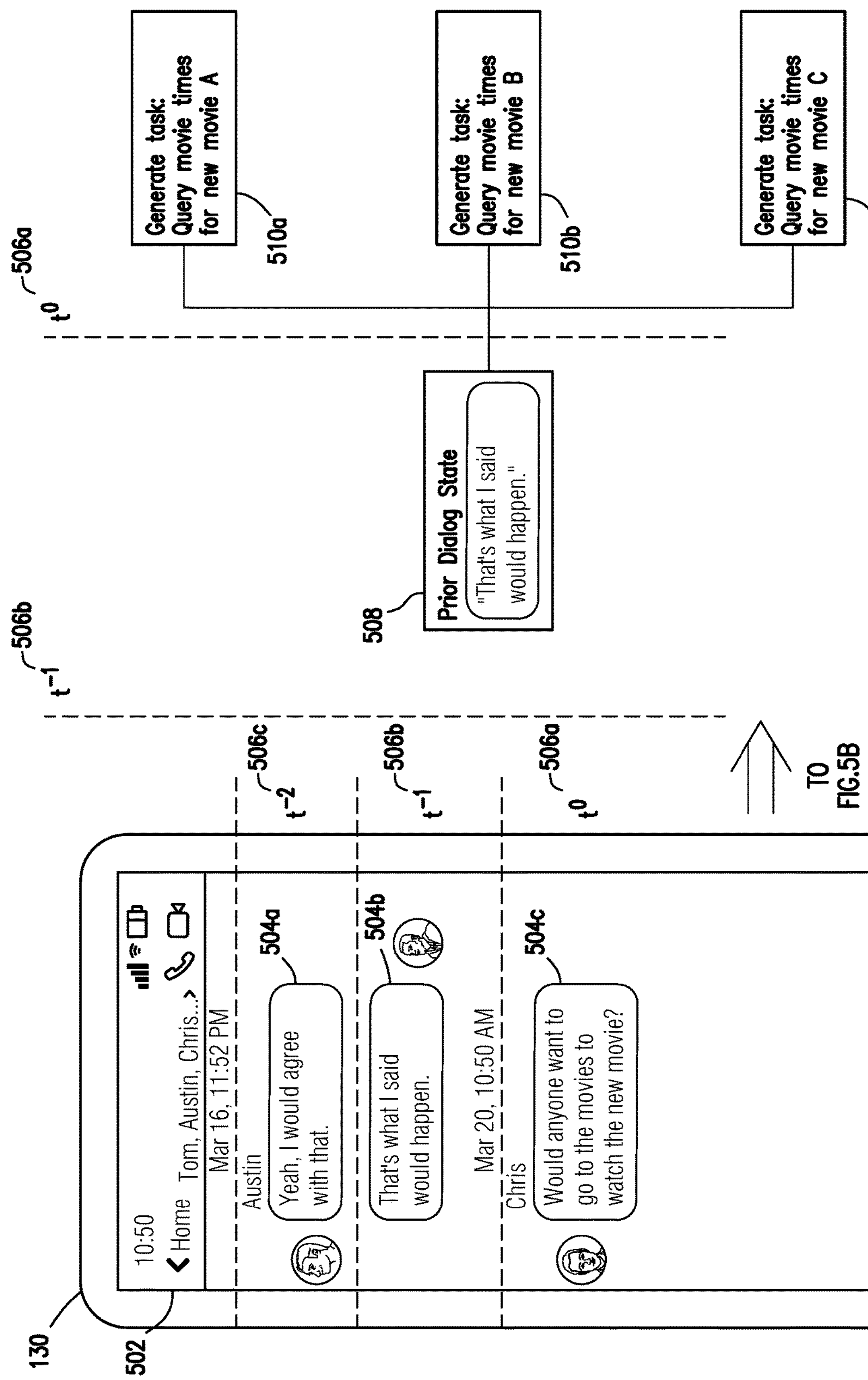
FIGS. 5A-5D illustrate example user interfaces and hierarchical set of function management during dialog state tracking.

FIGS. 5A-5D illustrate example user interfaces and hierarchical set of function management during dialog state tracking. Referring to FIG. 5A, a client system 130 may display a messaging interface 502 where a message thread is shown. In particular embodiments, the messaging interface 502 may be a group message between a plurality of users that comprise a plurality of user inputs 504. Although not shown, the messaging interface 502 may comprise a composer for a user of client system 130 to input text into or an activatable button to activate voice recognition for an audio input and the like. In particular embodiments, the messaging interface 502 may comprise a button to invoke the assistant system 140. In particular embodiments, the inputs 504 may be segmented into different dialog states 506. In particular embodiments, the dialog state 506 may represent a state of the conversation. In particular embodiments, $t^0$ 506*a* may represent the current dialog state 506*a*, $t^{-1}$ 506*b* may represent the previous dialog state 506*b*, and so on. The assistant system 140 may track the dialog state 506 through each received input within the messaging interface 502. In particular embodiments, the dialog state tracking may be subject to privacy settings of users participating in the message thread. As an example and not by way of limitation, the dialog state tracking may occur only if all users have accepted the assistant system 140 as a participant in the message thread or added the assistant system 140 into their respective messaging interfaces 502. In particular embodiments, the assistant system 140 may begin tracking the dialog state from the previous dialog state 506*b* by generating a starting prior dialog state 508. This may correspond to the previously received input 504*b*. In particular embodiments, the previous received input 504*b* may not relate to the current dialog state 506*a* or the intended dialog state. In particular embodiments, when a new input 504*c* is received, the assistant system 140 may generate one or more functions 510 based on the received input that correspond to the current dialog state 506*a*. In particular embodiments, the assistant system 140 may parse the input 504*c* and identify a request to go to the movies to watch the new movie. In particular embodiments, the assistant system 140 may perform a query and identify newest movies out in theaters and generate functions 510*a*-510*c* that correspond to generating tasks to perform queries for movie times for movies A, B, and C, respectively. In particular embodiments, the assistant system 140 may generate other tasks that correspond to movie requests. In particular embodiments, the assistant system 140 may calculate probability scores for each of the generated functions to determine whether any of the generated functions may pertain to the intended dialog state (e.g., the user meant to ask "Would anyone want to go to the downtown movie theater to watch the new scary movie?"). In particular embodiments, the assistant system 140 may generate hypothesis dialog states, which may be guesses by the assistant system 140 of what is the intended dialog state. Based on the received inputs 504*a*-504*c*, the assistant system 140 may not have enough information to determine an intended dialog state. As such, the assistant system 140 may determine the functions 510 have a probability score that fall below a threshold probability score and pass the functions 510 as a hierarchical set of functions 510 as an input into a dialog state tracking module.

Figure 5B:
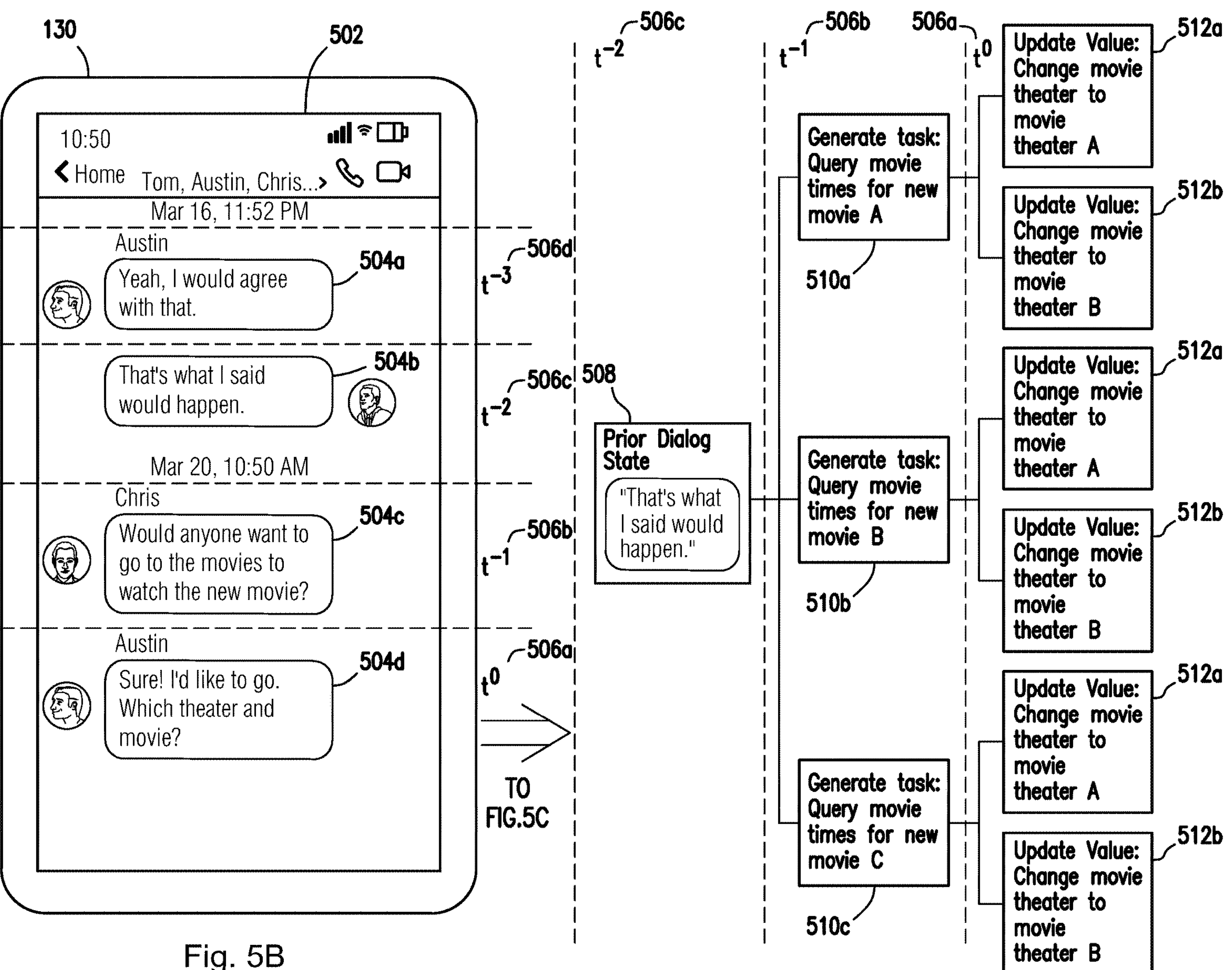

FIG. 5B illustrates the messaging interface 502 receiving a further input 504*d* from another user. In particular embodiments, the assistant system 140 may parse the input 504*d* and identify confirmation of the previous input 504*c* and identify the user requested clarification of the movie and the movie theater. Since the assistant system 140 generated functions 510 directed to movie times of different new movies, the assistant system 140 may generate further functions 512 that specify the movie theater. The movie time query functions 510 may have been a general movie time query based on the location (e.g., list of movie times from several theaters are results). The functions 512 may update the slot to either movie theater A or movie theater B based on further input 504 from users. In particular embodiments, the current dialog state 506*a* may be updated to the latest input 504*d* requesting a theater and movie. In particular embodiments, the functions 510 may correspond to the previous dialog state 506*b*. In this way, the assistant system 140 may keep track of the current dialog state 506*a*. In particular embodiments, the assistant system 140 may calculate probability scores for the functions 512. In particular embodiments, the assistant system 140 may collapse the tree by removing function branches if any of the probability scores fall below a threshold probability score. Additionally, the assistant system 140 may apply any of the functions to generate the current dialog state 506*a*. In particular embodiments, the assistant system 140 may determine that the probability scores of the function 512 fall below a threshold probability score and pass the hierarchical set of functions 510, 512 as an input into the dialog state tracking module. The hierarchical set of functions 510, 512 may be used to generate further functions.

Figure 5C:
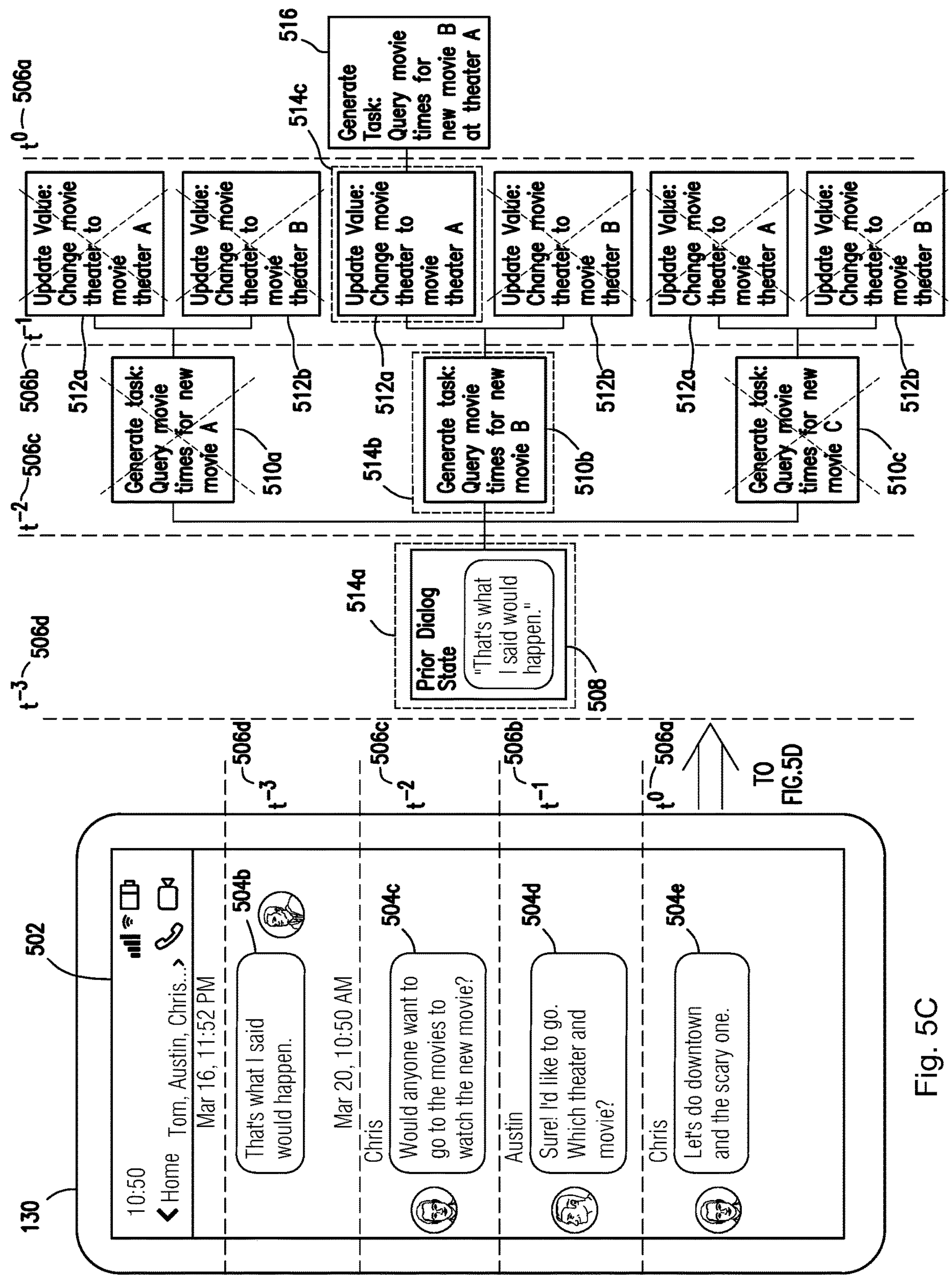

FIG. 5C illustrates the messaging interface 502 receiving a further input 504*e* from a user, which is now the current dialog state 506*a*. In particular embodiments, the assistant system 140 may parse the input 504*e* and identify information to generate a further function 516. That is, the assistant system 140 may identify that movie B is the only scary movie out in theaters and the downtown theater nearby the users correspond to movie theater A. In particular embodiments, the assistant system 140 may use the user context of one or more users to determine the information. In particular embodiments, the assistant system 140 may perform a selection 514 of the prior dialog state 508, function 510*b*, and function 512*a* to generate the function 516, which corresponds to an application of the previous functions 510*b*, 512*a*. In particular embodiments, the assistant system 140 may collapse the hierarchical set of functions 510, 512 down to the function branch including the generated function 516. In particular embodiments, the assistant system 140 may maintain the hierarchical set of functions 510, 512 in case the dialog state changes. For instance, if another user disagrees with the current suggestion, the assistant system 140 may return back to a previous hypothesis dialog state. In particular embodiments, the assistant system 140 may calculate a probability score of each of the functions 512 based on the current context and the user input 504*e* to determine which functions to select to generate function 516. With the new input 504*e*, the assistant system 140 may have sufficient information to calculate a probability score that exceeds the threshold probability score for a particular function branch. As such, the assistant system 140 may generate the function 516. In particular embodiments, the assistant system 140 may calculate a probability score to determine whether or not to generate an action based on the function 516. The assistant system 140 may generate the query and perform the query to send the results to the users. In particular embodiments, the current dialog state 506*a* may correspond to the generated function 516.

Figure 5D:
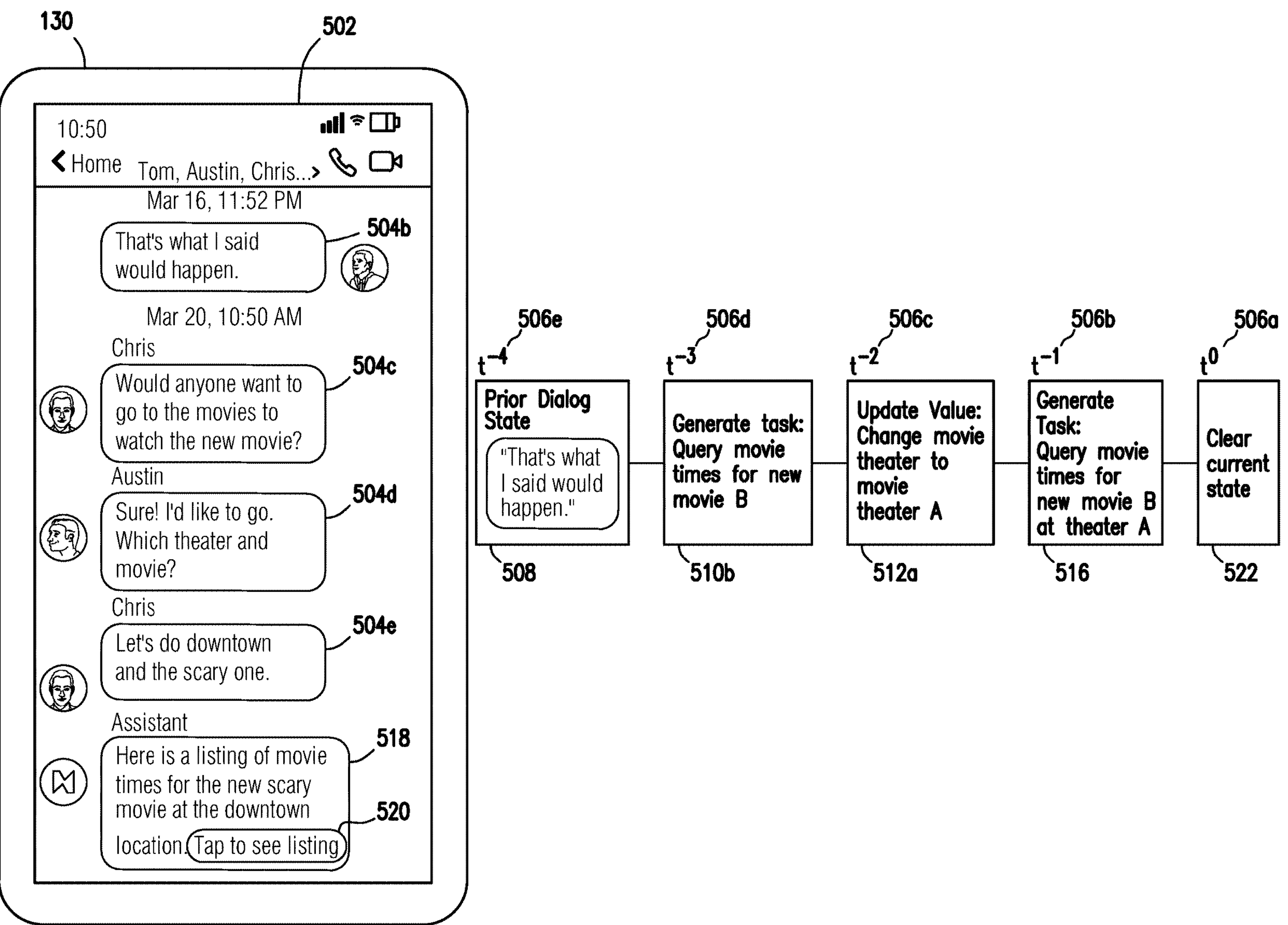

FIG. 5D illustrates the result of generating the function 516 and performing the function 516. In particular embodiments, the assistant system 140 may present results of the query from the generated function 516 through the output 518, which may comprise an activatable link 520 that may present the results. In particular embodiments, the activatable link 520 may be a link to a website to present the information. In particular embodiments, the activatable link 520 may be a summarization by the assistant system 140 of the search results in a separate window of the messaging interface 502. In particular embodiments, the assistant system 140 may collapse the hierarchical set of functions down to the functions that lead to the current dialog state. In particular embodiments, the assistant system 140 may collapse the hierarchical set of functions early in the conversation at the risk of removing the intent final dialog state. In particular embodiments, the decision by the assistant system 140 to collapse the hierarchical set of functions may be dynamic, for example based on some learned strategy of the dialog state tracking operator control policy 418. In particular embodiments, the collapsing of the hierarchical set of functions may help reduce the processing load of the assistant system 140. In particular embodiments, after generating the query, the assistant system 140 may generate a clear current state function 522 to restart dialog state tracking from a new point. In particular embodiments, the assistant system 140 may wait to receive further inputs 504 before collapsing the hierarchical set of functions. In particular embodiments, the assistant system 140 may wait until certain conditions are met prior to generating the function 516. As an example and not by way of limitation, the assistant system 140 may identify interested parties in the event (e.g., going to movies) by seeing who responded to the request. The assistant system 140 may require a predetermined amount of people to confirm the details prior to generating function 516. For example, the majority of identified interested users must confirm that they would like to watch the same mentioned movie. Alternatively, the assistant system 140 may require all of the identified interested users confirm that they would like to watch the same mentioned movie. In particular embodiments, the assistant system 140 may wait until confirmation is received through the inputs 504 before generating and executing the function 516. As discussed above, the assistant system 140 may ground certain information if the information has become available. As an example and not by way of limitation, if the users decided to go to movie theater A because it is the closest to everyone, then the assistant system 140 may generate a function to ground the information so it does not change. The grounding of information may help reduce the processing load of the assistant system 140 so the assistant system 140 does not have to generate further functions and extend function branches that do not apply to the intended dialog state.

Figure 6:
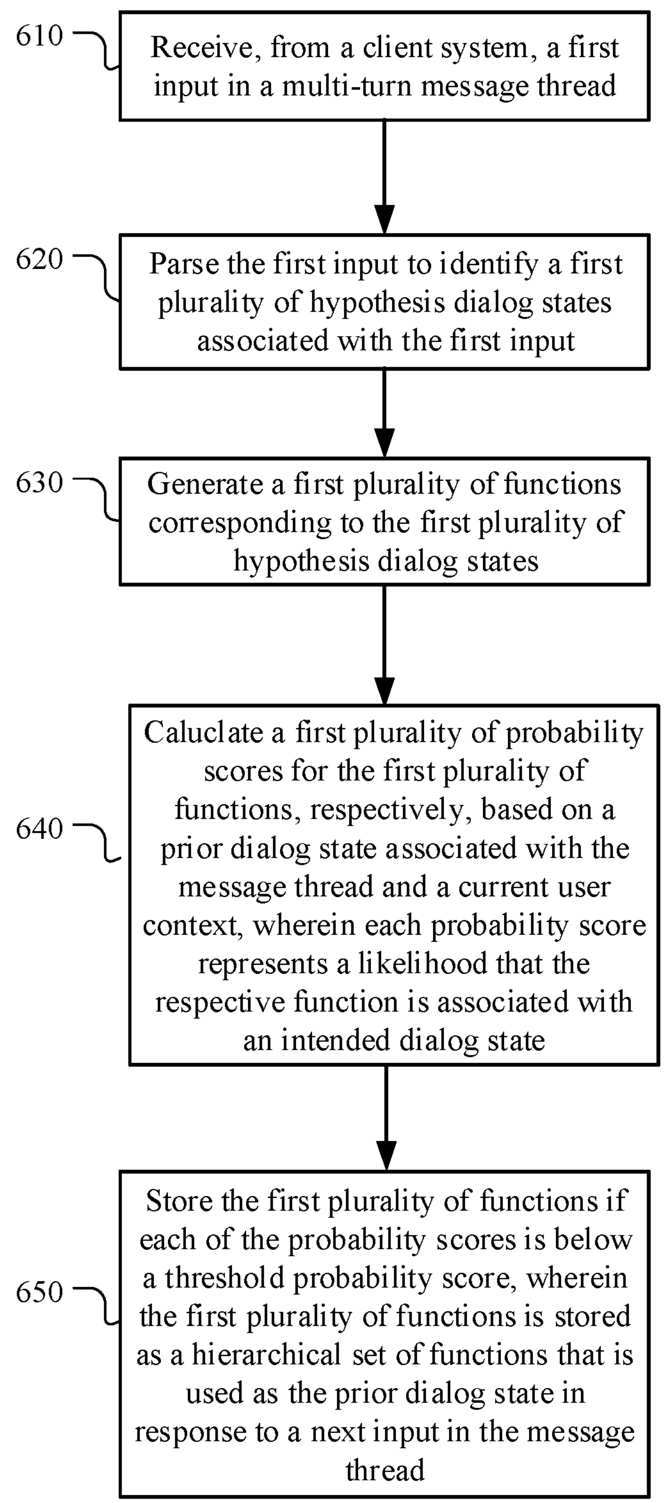
FIG. 6 illustrates an example method for tracking a dialog state of a message thread.

FIG. 6 illustrates an example method 600 for tracking the dialog state of a message thread. The method may begin at step 610, where the assistant system 140 may receive, from a client system, a first input in a multi-thread message thread. At step 620, the assistant system 140 may parse the first input to identify a first plurality of hypothesis dialog states associated with the first input. At step 630, the assistant system 140 may generate a first plurality of functions corresponding to the first plurality of hypothesis dialog states. At step 640, the assistant system 140 may calculate a first plurality of probability scores for the first plurality of functions, respectively, based on a prior dialog state associated with the message thread and a current user context. In particular embodiments, each probability score may represent a likelihood that the respective function is associated with an intended dialog state. In particular embodiments, the assistant system 140 may choose between alternative dialog state tracking operator control policy 418 strategies. In particular embodiments, the chosen dialog state tracking operator control policy 418 strategy selects, rejects or applies individual functions or hierarchical sets of functions. In particular embodiments, the choice of dialog state tracking operator control policy 418 strategy is fixed. In particular embodiments, the choice of dialog state tracking operator control policy 418 strategy is dynamic. In particular embodiments, the choice of dialog state tracking operator control policy 418 strategy is made to optimize between accuracy and processing load. In particular embodiments, the choice of dialog state tracking operator control policy 418 strategy is determined by a trained machine learning model, for example an artificial neural network ("ANN") 900. At step 650, the assistant system 140 may store the first plurality of functions if each of the probability scores is below a threshold probability score. In particular embodiments, the first plurality of functions may be stored as a hierarchical set of functions that is used as the prior dialog state in response to a next input in the message thread. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for tracking the dialog state of a message thread including the particular steps of the method of FIG. 6, this disclosure contemplates any suitable method for tracking the dialog state of a message thread including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Social Graphs

Figure 7:
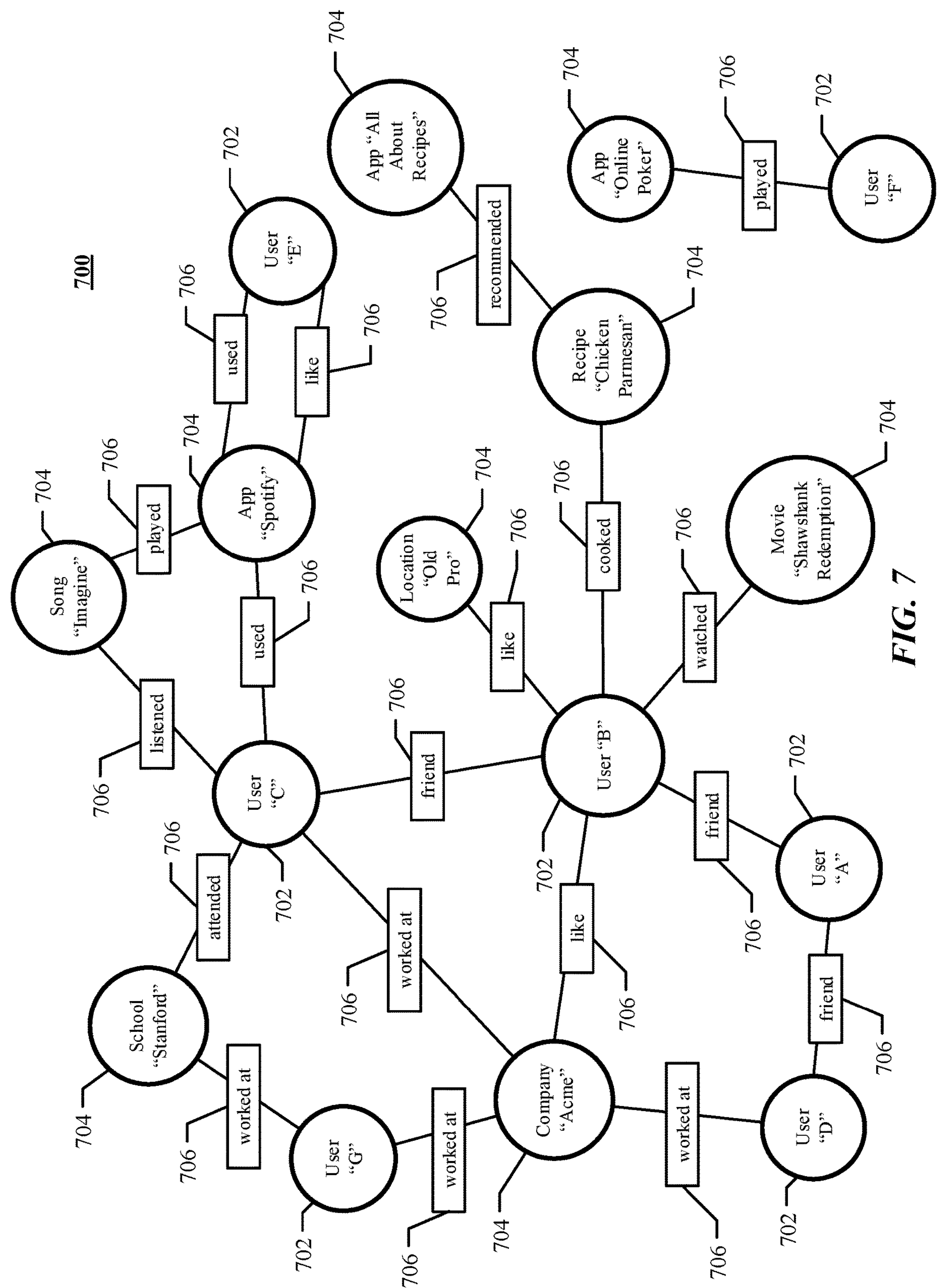
FIG. 7 illustrates an example social graph.

FIG. 7 illustrates an example social graph 700. In particular embodiments, the social-networking system 160 may store one or more social graphs 700 in one or more data stores. In particular embodiments, the social graph 700 may include multiple nodes—which may include multiple user nodes 702 or multiple concept nodes 704—and multiple edges 706 connecting the nodes. Each node may be associated with a unique entity (i.e., user or concept), each of which may have a unique identifier (ID), such as a unique number or username. The example social graph 700 illustrated in FIG. 7 is shown, for didactic purposes, in a two-dimensional visual map representation. In particular embodiments, a social-networking system 160, a client system 130, an assistant system 140, or a third-party system 170 may access the social graph 700 and related social-graph information for suitable applications. The nodes and edges of the social graph 700 may be stored as data objects, for example, in a data store (such as a social-graph database). Such a data store may include one or more searchable or queryable indexes of nodes or edges of the social graph 700.

In particular embodiments, a user node 702 may correspond to a user of the social-networking system 160 or the assistant system 140. As an example and not by way of limitation, a user may be an individual (human user), an entity (e.g., an enterprise, business, or third-party application), or a group (e.g., of individuals or entities) that interacts or communicates with or over the social-networking system 160 or the assistant system 140. In particular embodiments, when a user registers for an account with the social-networking system 160, the social-networking system 160 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with the social-networking system 160. In particular embodiments, a user node 702 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 702 may be associated with one or more data objects corresponding to information associated with a user. In particular embodiments, a user node 702 may correspond to one or more web interfaces.

In particular embodiments, a concept node 704 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 704 may be associated with information of a concept provided by a user or information gathered by various systems, including the social-networking system 160 and the assistant system 140. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 704 may be associated with one or more data objects corresponding to information associated with concept node 704. In particular embodiments, a concept node 704 may correspond to one or more web interfaces.

In particular embodiments, a node in the social graph 700 may represent or be represented by a web interface (which may be referred to as a "profile interface"). Profile interfaces may be hosted by or accessible to the social-networking system 160 or the assistant system 140. Profile interfaces may also be hosted on third-party websites associated with a third-party system 170. As an example and not by way of limitation, a profile interface corresponding to a particular external web interface may be the particular external web interface and the profile interface may correspond to a particular concept node 704. Profile interfaces may be viewable by all or a selected subset of other users. As an example and not by way of limitation, a user node 702 may have a corresponding user-profile interface in which the corresponding user may add content, make declarations, or otherwise express himself or herself. As another example and not by way of limitation, a concept node 704 may have a corresponding concept-profile interface in which one or more users may add content, make declarations, or express themselves, particularly in relation to the concept corresponding to concept node 704.

In particular embodiments, a concept node 704 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 702 corresponding to the user and a concept node 704 corresponding to the third-party web interface or resource and store edge 706 in one or more data stores.

In particular embodiments, a pair of nodes in the social graph 700 may be connected to each other by one or more edges 706. An edge 706 connecting a pair of nodes may represent a relationship between the pair of nodes. In particular embodiments, an edge 706 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 706 connecting the first user's user node 702 to the second user's user node 702 in the social graph 700 and store edge 706 as social-graph information in one or more of data stores 164. In the example of FIG. 7, the social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 700 by one or more edges 706.

In particular embodiments, an edge 706 between a user node 702 and a concept node 704 may represent a particular action or activity performed by a user associated with user node 702 toward a concept associated with a concept node 704. As an example and not by way of limitation, as illustrated in FIG. 7, a user may "like," "attended," "played," "listened," "cooked," "worked at," or "watched" a concept, each of which may correspond to an edge type or subtype. A concept-profile interface corresponding to a concept node 704 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 706 and a "used" edge (as illustrated in FIG. 7) between user nodes 702 corresponding to the user and concept nodes 704 corresponding to the song and application to indicate that the user listened to the song and used the application. Moreover, the social-networking system 160 may create a "played" edge 706 (as illustrated in FIG. 7) between concept nodes 704 corresponding to the song and the application to indicate that the particular song was played by the particular application. In this case, "played" edge 706 corresponds to an action performed by an external application (SPOTIFY) on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 7 between user node 702 for user "E" and concept node 704 for "SPOTIFY").

In particular embodiments, the social-networking system 160 may create an edge 706 between a user node 702 and a concept node 704 in the social graph 700. As an example and not by way of limitation, a user viewing a concept-profile interface (such as, for example, by using a web browser or a special-purpose application hosted by the user's client system 130) may indicate that he or she likes the concept represented by the concept node 704 by clicking or selecting a "Like" icon, which may cause the user's client system 130 to send to the social-networking system 160 a message indicating the user's liking of the concept associated with the concept-profile interface. In response to the message, the social-networking system 160 may create an edge 706 between user node 702 associated with the user and concept node 704, as illustrated by "like" edge 706 between the user and concept node 704. In particular embodiments, the social-networking system 160 may store an edge 706 in one or more data stores. In particular embodiments, an edge 706 may be automatically formed by the social-networking system 160 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

Vector Spaces and Embeddings

Figure 8:
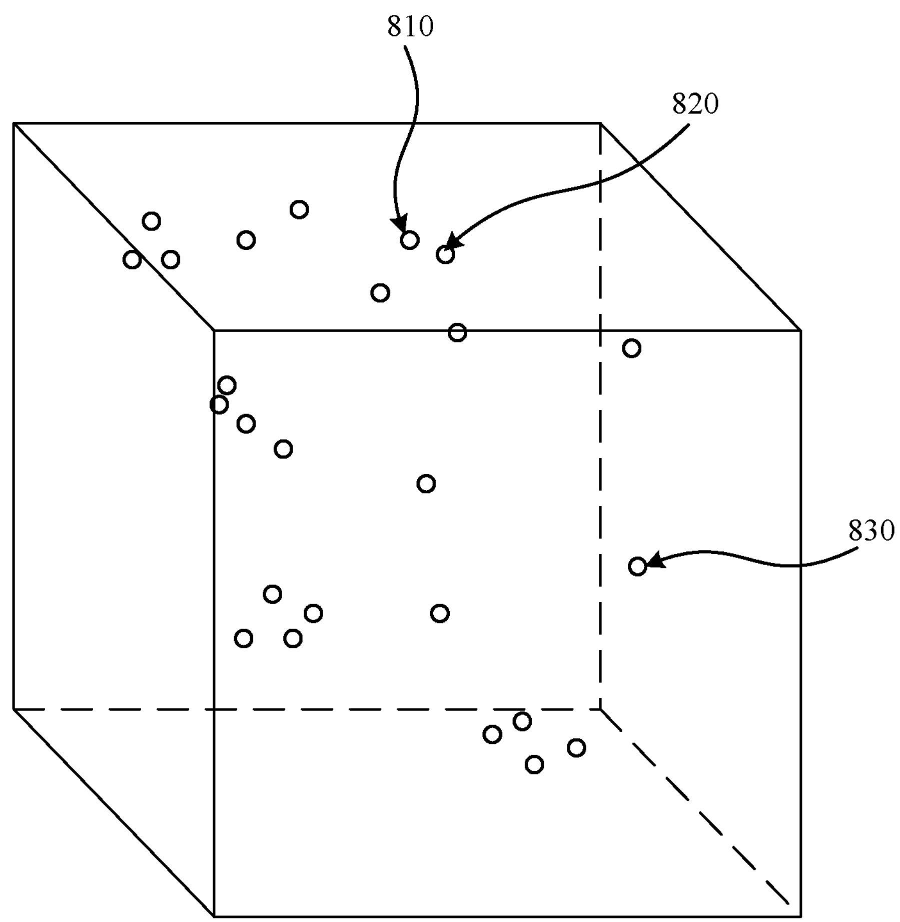
FIG. 8 illustrates an example view of an embedding space.

FIG. 8 illustrates an example view of a vector space 800. In particular embodiments, an object or an n-gram may be represented in a d-dimensional vector space, where d denotes any suitable number of dimensions. Although the vector space 800 is illustrated as a three-dimensional space, this is for illustrative purposes only, as the vector space 800 may be of any suitable dimension. In particular embodiments, an n-gram may be represented in the vector space 800 as a vector referred to as a term embedding. Each vector may comprise coordinates corresponding to a particular point in the vector space 800 (i.e., the terminal point of the vector). As an example and not by way of limitation, vectors 810, 820, and 830 may be represented as points in the vector space 800, as illustrated in FIG. 8. An n-gram may be mapped to a respective vector representation. As an example and not by way of limitation, n-grams $t_1$ and $t_2$ may be mapped to vectors $\vec{v_1}$ and $\vec{v_2}$ in the vector space 800, respectively, by applying a function $\vec{\pi}$ defined by a dictionary, such that $\vec{v_1}=\vec{\pi}(t_1)$ and $\vec{v_2}=\vec{\pi}(t_2)$. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 800. In particular embodiments, an n-gram may be mapped to a vector representation in the vector space 800 by using a machine leaning model (e.g., a neural network). The machine learning model may have been trained using a sequence of training data (e.g., a corpus of objects each comprising n-grams).

In particular embodiments, an object may be represented in the vector space 800 as a vector referred to as a feature vector or an object embedding. As an example and not by way of limitation, objects $e_1$ and $e_2$ may be mapped to vectors $\vec{v_1}$ and $\vec{v_2}$ in the vector space 800, respectively, by applying a function $\vec{\pi}$, such that $\vec{v_1}=\vec{\pi}(e_1)$ and $\vec{v_2}=\vec{\pi}(e_2)$. In particular embodiments, an object may be mapped to a vector based on one or more properties, attributes, or features of the object, relationships of the object with other objects, or any other suitable information associated with the object. As an example and not by way of limitation, a function may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 800. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $\vec{v_1}\cdot\vec{v_2}/\|\vec{v_1}\|\|\vec{v_2}\|$. As another example and not by way of limitation, a similarity metric of $\vec{v_1}$ and $\vec{v_2}$ may be a Euclidean distance $\|\vec{v_1}-\vec{v_2}\|$. A similarity metric of two vectors may represent how similar the two objects or n-grams corresponding to the two vectors, respectively, are to one another, as measured by the distance between the two vectors in the vector space 800. As an example and not by way of limitation, vector 810 and vector 820 may correspond to objects that are more similar to one another than the objects corresponding to vector 810 and vector 830, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 9:
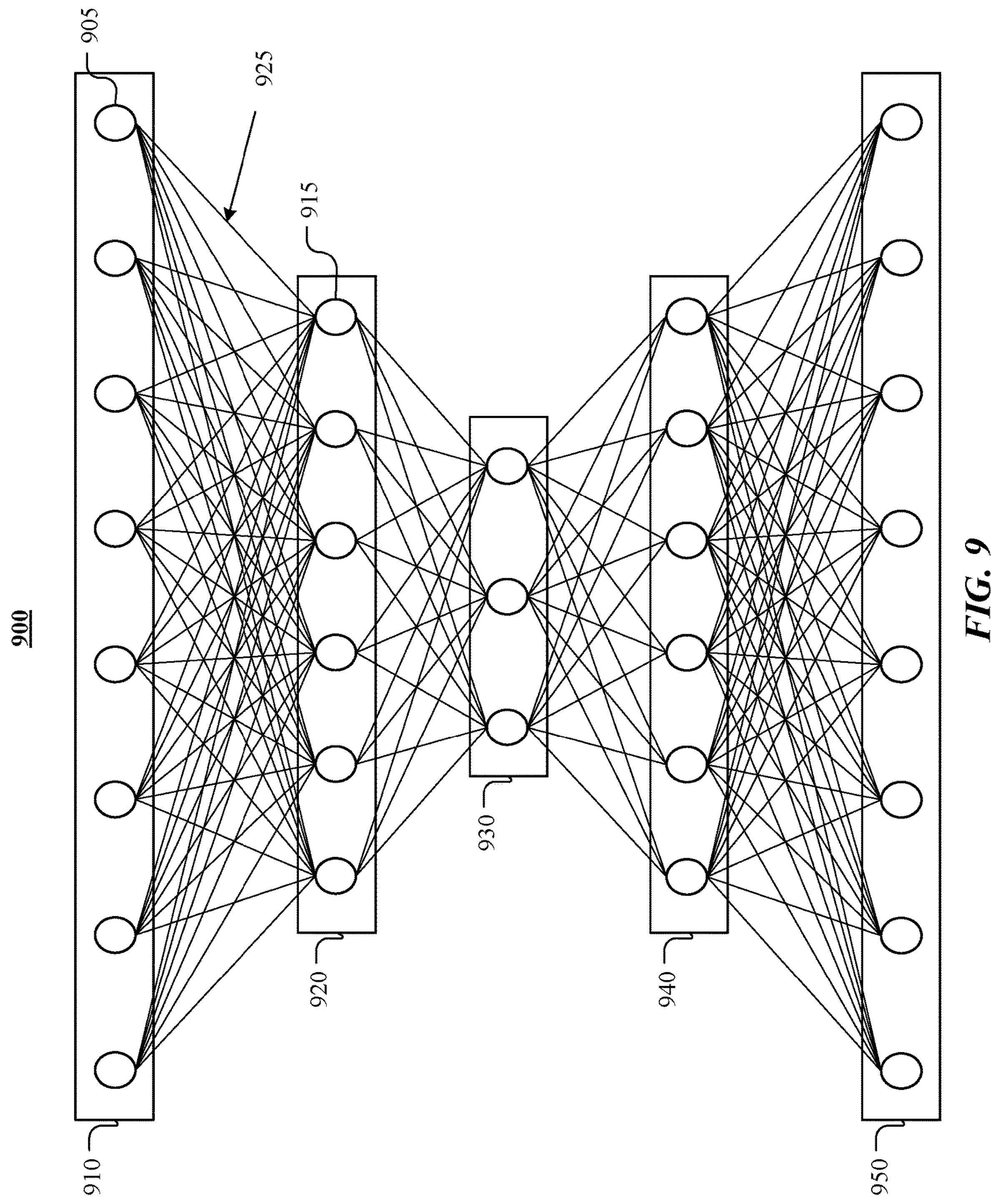
FIG. 9 illustrates an example artificial neural network.

FIG. 9 illustrates an example artificial neural network ("ANN") 900. In particular embodiments, an ANN may refer to a computational model comprising one or more nodes. Example ANN 900 may comprise an input layer 910, hidden layers 920, 930, 940, and an output layer 950. Each layer of the ANN 900 may comprise one or more nodes, such as a node 905 or a node 915. In particular embodiments, each node of an ANN may be connected to another node of the ANN. As an example and not by way of limitation, each node of the input layer 910 may be connected to one of more nodes of the hidden layer 920. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 9 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 9 depicts a connection between each node of the input layer 910 and each node of the hidden layer 920, one or more nodes of the input layer 910 may not be connected to one or more nodes of the hidden layer 920.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 920 may comprise the output of one or more nodes of the input layer 910. As another example and not by way of limitation, the input to each node of the output layer 950 may comprise the output of one or more nodes of the hidden layer 940. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 925 between the node 905 and the node 915 may have a weighting coefficient of 0.4, which may indicate that 0.4 multiplied by the output of the node 905 is used as an input to the node 915. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 900 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, an assistant system 140, a third-party system 170, a social-networking application, an assistant application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 704 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or assistant system 140 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 700. A privacy setting may be specified for one or more edges 706 or edge-types of the social graph 700, or with respect to one or more nodes 702, 704 or node-types of the social graph 700. The privacy settings applied to a particular edge 706 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 704 connected to a user node 702 of the first user by an edge 706. The first user may specify privacy settings that apply to a particular edge 706 connecting to the concept node 704 of the object, or may specify privacy settings that apply to all edges 706 connecting to the concept node 704. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 160 or assistant system 140 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 or assistant system 140 may access such information in order to provide a particular function or service to the first user, without the social-networking system 160 or assistant system 140 having access to that information for any other purposes. Before accessing, storing, or using such objects or information, the social-networking system 160 or assistant system 140 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160 or assistant system 140.

In particular embodiments, a user may specify whether particular types of objects or information associated with the first user may be accessed, stored, or used by the social-networking system 160 or assistant system 140. As an example and not by way of limitation, the first user may specify that images sent by the first user through the social-networking system 160 or assistant system 140 may not be stored by the social-networking system 160 or assistant system 140. As another example and not by way of limitation, a first user may specify that messages sent from the first user to a particular second user may not be stored by the social-networking system 160 or assistant system 140. As yet another example and not by way of limitation, a first user may specify that all objects sent via a particular application may be saved by the social-networking system 160 or assistant system 140.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 or assistant system 140 may provide default privacy settings with respect to each device, system, or application, and/or the first user may be prompted to specify a particular privacy setting for each context. As an example and not by way of limitation, the first user may utilize a location-services feature of the social-networking system 160 or assistant system 140 to provide recommendations for restaurants or other places in proximity to the user. The first user's default privacy settings may specify that the social-networking system 160 or assistant system 140 may use location information provided from a client device 130 of the first user to provide the location-based services, but that the social-networking system 160 or assistant system 140 may not store the location information of the first user or provide it to any third-party system 170. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, the social-networking system 160 or assistant system 140 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 160 or assistant system 140. The user's privacy settings may specify that such information may be used only for particular processes, such as authentication, and further specify that such information may not be shared with any third-party system 170 or used for other processes or applications associated with the social-networking system 160 or assistant system 140. As another example and not by way of limitation, the social-networking system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the social-networking system 160. As another example and not by way of limitation, the social-networking system 160 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third-party system 170 or used by other processes or applications associated with the social-networking system 160.

Systems and Methods

Figure 10:
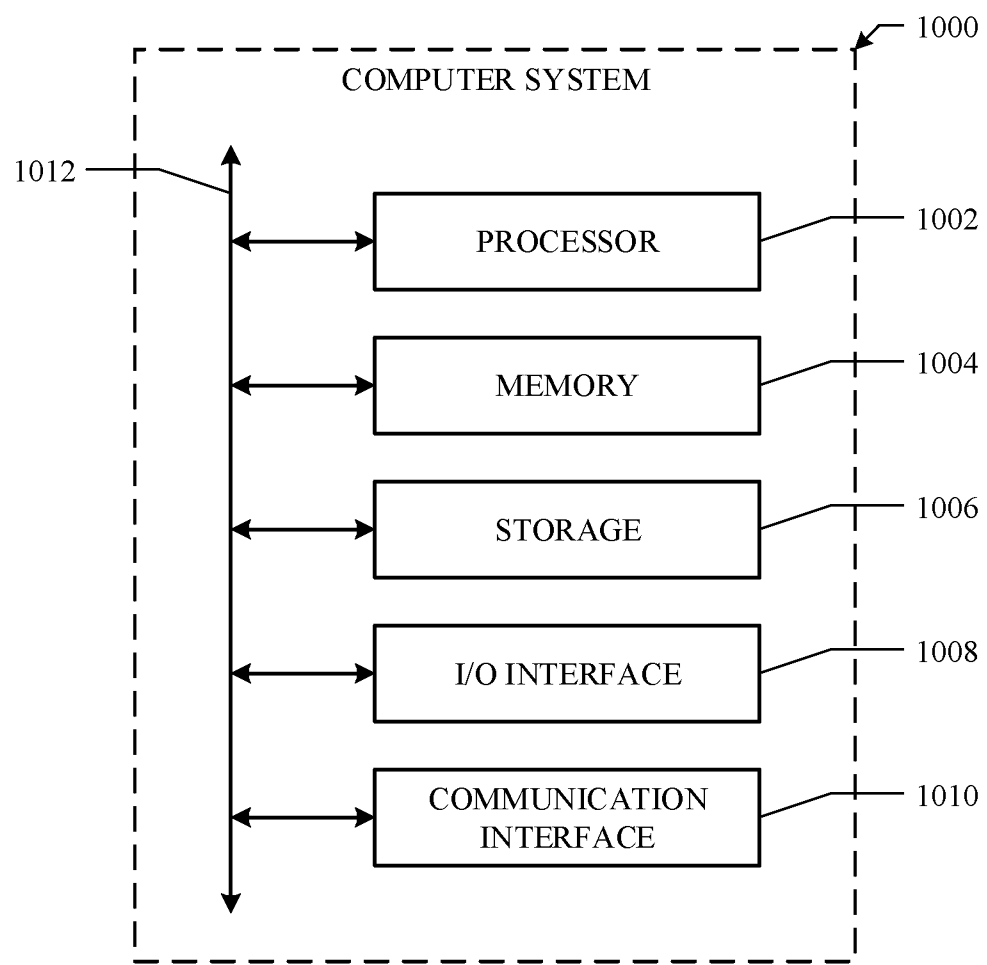
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:

receiving, from an assistant xbot associated with a client system, a first input in a multi-turn message thread between a plurality of users, wherein the assistant xbot is given access to the multi-turn message thread from each of the plurality of users;

parsing the first input to identify a first plurality of hypothesis dialog states associated with the first input of the multi-turn message thread between the plurality of users, wherein each of the first plurality of hypothesis dialog states is a prediction of a final dialog state;

generating a first plurality of functions corresponding to the first plurality of hypothesis dialog states;

calculating a first plurality of probability scores for the first plurality of functions, respectively, based on a prior dialog state associated with the multi-turn message thread between the plurality of users and a current user context of each of the plurality of users, wherein each probability score represents a likelihood that the respective function is associated with an intended dialog state of the multi-turn message thread between the plurality of users;

storing the first plurality of functions as a hierarchical set of functions if each of the probability scores is below a threshold probability score, wherein the first plurality of functions is stored as the hierarchical set of functions that is used as the prior dialog state in response to a next input in the multi-turn message thread, wherein each function of the first plurality of functions stored as the hierarchical set is used as an input to generate one or more functions of a second plurality of functions;

receiving, from the assistant xbot associated with the client system, a subsequent input in the multi-turn message thread between the plurality of users;

generating the second plurality of functions based on the subsequent input and the hierarchical set, where each function of the second plurality of functions is associated with a respective function of the first plurality of functions;

calculating a second plurality of probability scores for the second plurality of functions, respectively;

generating one or more results corresponding to an action associated with a first function of the second plurality of functions that has a probability score above the threshold probability score; and sending, to the client system, instructions to present the one or more results in the multi-turn message thread by the assistant xbot.

2. The method of claim 1, further comprising:

receiving, from the client system prior to the subsequent input, a third input in the multi-turn message thread, wherein the third input is the next input after the first input;

parsing the third input to identify a third plurality of hypothesis dialog states associated with the third input;

generating a third plurality of functions corresponding to the third plurality of hypothesis dialog states; and calculating a third plurality of probability scores for the third plurality of functions, respectively, based on the hierarchical set of functions and the current user context.

3. The method of claim 2, further comprising:

attaching the third plurality of functions to the hierarchical set of functions to store as a third hierarchical set of functions if each of the third plurality of probability scores is below the threshold probability score, wherein the third hierarchical set of functions comprises a plurality of function branches, wherein each function branch comprises one of the first plurality of functions and at least one of the third plurality of functions.

4. The method of claim 3, further comprising:

parsing the subsequent input to identify a second plurality of hypothesis dialog states associated with the subsequent input, wherein generating the second plurality of functions is based on the second plurality of hypothesis dialog states, and wherein calculating the second plurality of probability scores for the second plurality of functions is based on the third hierarchical set of functions and the current user context.

5. The method of claim 2, further comprising:

applying one or more of the third plurality of functions to generate a current dialog state, wherein the applied functions each have a probability score above the threshold probability score.

6. The method of claim 2, further comprising:

determining that one or more of the third plurality of probability scores of the third plurality of functions exceeds the threshold probability score.

7. The method of claim 6, further comprising:

ranking, responsive to the determination that one or more of the third plurality of probability scores exceeds the threshold probability score, the third plurality of functions based on their respective probability scores;

selecting one of the third plurality of functions and a corresponding function of the first plurality of functions based on the ranking of the third plurality of functions; and generating an action to be performed based on the selected one of the third plurality of functions and the corresponding function of the first plurality of functions.

8. The method of claim 1, wherein parsing the first input comprises identifying one or more intents and one or more slots that are associated with the first plurality of hypothesis dialog states.

9. The method of claim 8, further comprising:

resolving an entity related to a slot associated with a hypothesis dialog state corresponding to a function of the first plurality of functions; and removing one or more other functions from the first plurality of functions.

10. The method of claim 1, further comprising:

removing one or more functions from the first plurality of functions having probability scores more than a specified amount below the threshold probability score.

11. The method of claim 1, wherein the first plurality of functions comprises one or more of:

a function to generate a new task to be performed by the one or more computing systems, a function to provide or update a slot associated with a hypothesis dialog state, a function to repeat a previous action, or a function to clear a current dialog state.

12. The method of claim 11, wherein the function to generate a new task comprises a function to generate a query to be executed by the one or more computing systems.

13. The method of claim 1, wherein each function is an operator to change or confirm a particular dialog state.

14. The method of claim 1, wherein the hierarchical set of functions is a function tree.

15. The method of claim 1, further comprising:

parsing the subsequent input to identify a second plurality of hypothesis dialog states associated with the subsequent input of the multi-turn message thread between the plurality of users, wherein calculating the second plurality of probability scores is based on the hierarchical set and the current user context of each of the plurality of users;

generating, responsive to determining that the probability score of the first function exceeds the threshold probability score, the action to be performed; and executing, by the client system, the action to be performed to generate the one or more results.

16. The method of claim 1, further comprising:

calculating updated probability scores to the first plurality of functions in response to receiving the subsequent input; and updating the hierarchical set based on the updated probably scores to the first plurality of functions.

17. One or more computer-readable non-transitory storage media embodying software that is configured when executed to:

receive, from an assistant xbot associated with a client system, a first input in a multi-turn message thread between a plurality of users, wherein the assistant xbot is given access to the multi-turn message thread from each of the plurality of users;

parse the first input to identify a first plurality of hypothesis dialog states associated with the first input of the multi-turn message thread between the plurality of users, wherein each of the first plurality of hypothesis dialog states is a prediction of a final dialog state;

generate a first plurality of functions corresponding to the first plurality of hypothesis dialog states;

calculate a first plurality of probability scores for the first plurality of functions, respectively, based on a prior dialog state associated with the multi-turn message thread between the plurality of users and a current user context of each of the plurality of users, wherein each probability score represents a likelihood that the respective function is associated with an intended dialog state of the multi-turn message thread between the plurality of users;

store the first plurality of functions as a hierarchical set of functions if each of the probability scores is below a threshold probability score, wherein the first plurality of functions is stored as the hierarchical set of functions that is used as the prior dialog state in response to a next input in the multi-turn message thread, wherein each function of the first plurality of functions stored as the hierarchical set is used as an input to generate one or more functions of a second plurality of functions;

receive, from the assistant xbot associated with the client system, a subsequent input in the multi-turn message thread between the plurality of users;

generate the second plurality of functions based on the subsequent input and the hierarchical set, where each function of the second plurality of functions is associated with a respective function of the first plurality of functions;

calculate a second plurality of probability scores for the second plurality of functions, respectively;

generate one or more results corresponding to an action associated with a first function of the second plurality of functions that has a probability score above the threshold probability score; and send, to the client system, instructions to present the one or more results in the multi-turn message thread by the assistant xbot.

18. A system comprising: one or more processors; and a non-transitory memory coupled to the processors comprising instructions executable by the processors, the processors configured when executing the instructions to:

receive, from an assistant xbot associated with a client system, a first input in a multi-turn message thread between a plurality of users, wherein the assistant xbot is given access to the multi-turn message thread from each of the plurality of users;

parse the first input to identify a first plurality of hypothesis dialog states associated with the first input of the multi-turn message thread between the plurality of users, wherein each of the first plurality of hypothesis dialog states is a prediction of a final dialog state;

generate a first plurality of functions corresponding to the first plurality of hypothesis dialog states;

calculate a first plurality of probability scores for the first plurality of functions, respectively, based on a prior dialog state associated with the multi-turn message thread between the plurality of users and a current user context of each of the plurality of users, wherein each probability score represents a likelihood that the respective function is associated with an intended dialog state of the multi-turn message thread between the plurality of users;

store the first plurality of functions as a hierarchical set of functions if each of the probability scores is below a threshold probability score, wherein the first plurality of functions is stored as the hierarchical set of functions that is used as the prior dialog state in response to a next input in the multi-turn message thread, wherein each function of the first plurality of functions stored as the hierarchical set is used as an input to generate one or more functions of a second plurality of functions;

receive, from the assistant xbot associated with the client system, a subsequent input in the multi-turn message thread between the plurality of users;

generate the second plurality of functions based on the subsequent input and the hierarchical set, where each function of the second plurality of functions is associated with a respective function of the first plurality of functions;

calculate a second plurality of probability scores for the second plurality of functions, respectively;

generate one or more results corresponding to an action associated with a first function of the second plurality of functions that has a probability score above the threshold probability score; and send, to the client system, instructions to present the one or more results in the multi-turn message thread by the assistant xbot.

* * * * *